US012743103B2

(12) United States Patent
Miyashita et al.

(10) Patent No.: US 12,743,103 B2

(45) Date of Patent: Sep. 22, 2026

(54) PATH PLANNING SYSTEM AND PATH PLANNING METHOD FOR AGRICULTURAL MACHINE PERFORMING SELF-TRAVELING

(71) Applicant: Kubota Corporation, Osaka (JP)

(72) Inventors: Shunsuke Miyashita, Sakai (JP); Yusuke Murata, Sakai (JP)

(73) Assignee: KUBOTA CORPORATION, Osaka (JP)

(*) Notice: Subject to any disclaimer, the term of this patent is extended or adjusted under 35 U.S.C. 154(b) by 131 days.

(21) Appl. No.: 18/749,205

(22) Filed: Jun. 20, 2024

(65) Prior Publication Data

US 2024/0338037 A1 Oct. 10, 2024

Related U.S. Application Data

(63) Continuation of application No. PCT/JP2022/040395, filed on Oct. 28, 2022.

(30) Foreign Application Priority Data

Dec. 24, 2021 (JP) ................................ 2021-210461

(51) Int. Cl.

*G05D 1/646* (2024.01)
*G05D 1/224* (2024.01)
(Continued)

(52) U.S. Cl.

CPC ........... *G05D 1/646* (2024.01); *G05D 1/2246* (2024.01); *G05D 1/246* (2024.01); *G05D 1/248* (2024.01);
(Continued)

(58) Field of Classification Search

CPC .... A01B 69/008; G05D 1/2246; G05D 1/229; G05D 1/246; G05D 1/248; G05D 1/622;
(Continued)

(56) References Cited

U.S. PATENT DOCUMENTS 9,014,960 B2 * 4/2015 Bresnahan ......... G01C 21/3407 701/426
10,310,499 B1 * 6/2019 Brady .................. G05B 19/042
(Continued)

FOREIGN PATENT DOCUMENTS

JP 2020-103092 A 7/2020
JP 2021-029218 A 3/2021
(Continued)

OTHER PUBLICATIONS

English Machine Translation of JP2020103092A, Accessed Dec. 18, 2025 (Year: 2020).*
(Continued)

*Primary Examiner* — Blake A Wood
(74) *Attorney, Agent, or Firm* — Keating & Bennett, LLP

(57) ABSTRACT

A path planning system for an agricultural machine to automatically travel inside and outside a field includes a storage to store a map of a region including fields and roads, and a processor to generate a path for the agricultural machine on the map. The map includes attribute information representing, for each of the roads, at least one of whether the road is an agricultural road, whether the road is a road along a specific feature, or whether the road is a road where satellite signals from GNSS satellites are receivable. The processor is configured or programmed to generate at least one of a path including an agricultural road with priority, a path including a road along the specific feature with priority, or a path including, with priority, a road where the satellite signals are receivable, as the path for the agricultural machine based on the attribute information.

11 Claims, 26 Drawing Sheets

(51) Int. Cl.

| | |
|---|---|
| ***G05D 1/246*** | (2024.01) |
| ***G05D 1/248*** | (2024.01) |
| ***G05D 1/622*** | (2024.01) |
| ***G05D 1/644*** | (2024.01) |
| ***G05D 105/15*** | (2024.01) |
| ***G05D 107/20*** | (2024.01) |
| ***G05D 111/10*** | (2024.01) |

(52) U.S. Cl.
CPC ............. *G05D 1/622* (2024.01); *G05D 1/644* (2024.01); *G05D 2105/15* (2024.01); *G05D 2107/21* (2024.01); *G05D 2111/17* (2024.01)

(58) Field of Classification Search
CPC ...... G05D 1/644; G05D 1/646; G05D 1/6482; G05D 1/6897; G05D 2105/15; G05D 2107/21; G05D 2109/10; G05D 2111/17
See application file for complete search history.

(56) References Cited

U.S. PATENT DOCUMENTS

| | | | | |
|---|---|---|---|---|
| 2019/0088148 | A1* | 3/2019 | Jacobus ................ | B60W 10/18 |
| 2020/0151611 | A1* | 5/2020 | McGavran ........... | G01C 21/367 |
| 2021/0000005 | A1* | 1/2021 | Robinson ............. | G05D 1/0278 |

FOREIGN PATENT DOCUMENTS

| | | | |
|---|---|---|---|
| JP | 2021-035381 | A | 3/2021 |
| JP | 2021-073602 | A | 5/2021 |
| JP | 2021-094030 | A | 6/2021 |

OTHER PUBLICATIONS

English Machine Translation of JP2021035381A, Accessed Dec. 18, 2025 (Year: 2021).*
Official Communication issued in International Patent Application No. PCT/JP2022/040395, mailed on Jan. 17, 2023.

* cited by examiner

*FIG. 3*

| AGRICULTURAL MACHINE | DATE/TIME | FIELD | TASK | IMPLEMENT |
| --- | --- | --- | --- | --- |
| AGRICULTURAL MACHINE A | JUNE 21, 2021, 8:00 – 11:00 | FIELD A | SPRAYING AGRICULTURAL CHEMICALS | IMPLEMENT A |
| AGRICULTURAL MACHINE A | JUNE 21, 2021, 12:00 – 14:00 | FIELD B | SPRAYING AGRICULTURAL CHEMICALS | IMPLEMENT A |
| AGRICULTURAL MACHINE A | JUNE 21, 2021, 15:00 – 18:00 | FIELD C | TILLING | IMPLEMENT B |
| AGRICULTURAL MACHINE A | JUNE 22, 2021, 8:00 – 12:00 | FIELD D | TILLING | IMPLEMENT B |
| ⋮ | ⋮ | ⋮ | ⋮ | ⋮ |

*FIG. 25*

| FIELD | WAITING AREA |
|---|---|
| FIELD #1 | |
| FIELD #2 | |
| FIELD #3 | |
| ⋮ | WAITING ARE A |
| FIELD #30 | |
| FIELD #31 | |
| FIELD #32 | |
| FIELD #33 | |
| ⋮ | WAITING ARE B |
| FIELD #60 | |
| FIELD #61 | |
| FIELD #62 | |
| FIELD #63 | |
| ⋮ | WAITING ARE C |
| FIELD #100 | |

PATH PLANNING SYSTEM AND PATH PLANNING METHOD FOR AGRICULTURAL MACHINE PERFORMING SELF-TRAVELING

CROSS REFERENCE TO RELATED APPLICATIONS

This application claims the benefit of priority to Japanese Patent Application No. 2021-210461 filed on Dec. 24, 2021 and is a Continuation Application of PCT Application No. PCT/JP2022/040395 filed on Oct. 28, 2022. The entire contents of each application are hereby incorporated herein by reference.

BACKGROUND OF THE INVENTION

1. Field of the Invention

The present disclosure relates to path planning systems and path planning methods for agricultural machines performing self-traveling.

2. Description of the Related Art

Research and development has been directed to the automation of agricultural machines to be used in agricultural fields. For example, work vehicles, such as tractors, combines, and rice transplanters, which automatically travel within fields by utilizing a positioning system, e.g., a GNSS (Global Navigation Satellite System), are coming into practical use. Research and development is also under way for work vehicles which automatically travel not only within fields, but also outside the fields.

Japanese Laid-Open Patent Publications No. 2021-073602 and Japanese Laid-Open Patent Publications No. 2021-029218 each disclose an example of system to cause an unmanned work vehicle to automatically travel between two fields separated from each other with a road being sandwiched therebetween.

SUMMARY OF THE INVENTION

Example embodiments of the present invention provide systems and methods to generate preferred paths for agricultural machines performing self-traveling.

A path planning system according to an illustrative example embodiment of the present disclosure is for an agricultural machine to automatically travel inside and outside a field. The path planning system includes a storage to store a map of a region including a plurality of fields and roads around the plurality of fields, and a processor configured or programmed to generate a path for the agricultural machine on the map. The map includes attribute information representing, for each of the roads, at least one of whether the road is an agricultural road, whether the road is a road along a specific feature, or whether the road is a road where satellite signals from GNSS satellites can be properly received. For generation of a path toward a field or a path from a field toward another site, the processor is configured or programmed to generate at least one of a path including an agricultural road with priority, a path including a road along the specific feature with priority, and a path including, with priority, a road where the satellite signals can be properly received, as the path for the agricultural machine based on the attribute information.

General or specific aspects of the present disclosure may be implemented using a device, a system, a method, an integrated circuit, a computer program, a non-transitory computer-readable storage medium, or any combination thereof. The computer-readable storage medium may be inclusive of a volatile storage medium or a non-volatile storage medium. The device may include a plurality of devices. In the case where the device includes two or more devices, the two or more devices may be disposed within a single apparatus, or divided over two or more separate apparatuses.

According to example embodiments of the present disclosure, it is possible to provide systems and methods to generate preferred paths for agricultural machines performing self-traveling.

The above and other elements, features, steps, characteristics and advantages of the present invention will become more apparent from the following detailed description of the example embodiments with reference to the attached drawings.

BRIEF DESCRIPTION OF THE DRAWINGS

FIG. 3 is a block diagram showing an example configuration of the work vehicle and the implement.

FIG. 25 is a table showing an example of correspondence between waiting areas and fields.

DETAILED DESCRIPTION OF THE EXAMPLE EMBODIMENTS

Figure 1:
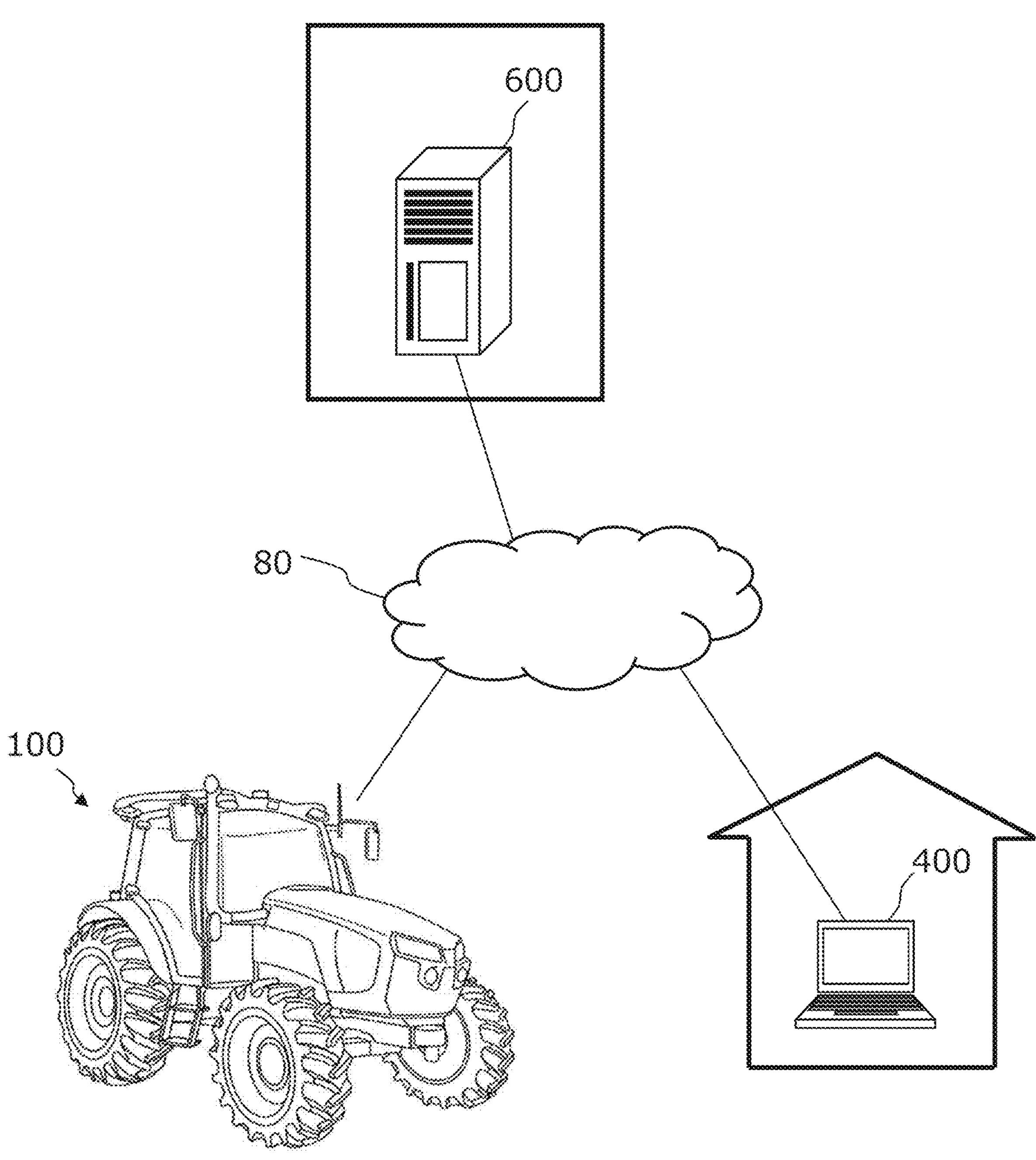
FIG. 1 is a diagram providing an overview of an agriculture management system according to an illustrative example embodiment of the present invention.

In the present disclosure, an "agricultural machine" refers to a machine for agricultural applications. Examples of agricultural machines include tractors, harvesters, rice transplanters, vehicles for crop management, vegetable transplanters, mowers, seeders, spreaders, and mobile robots for agriculture. Not only may a work vehicle such as a tractor function as an "agricultural machine" alone by itself, but also a combination of a work vehicle and an implement that is attached to, or towed by, the work vehicle may function as an "agricultural machine". For the ground surface inside a field, the agricultural machine performs agricultural work such as tilling, seeding, preventive pest control, manure spreading, planting of crops, or harvesting. Such agricultural work or tasks may be referred to as "groundwork", or simply as "work" or "tasks". Travel of a vehicle-type agricultural machine performed while the agricultural machine also performs agricultural work may be referred to as "tasked travel".

"Self-driving" refers to controlling the movement of an agricultural machine by the action of a controller, rather than through manual operations of a driver. An agricultural machine that performs self-driving may be referred to as a "self-driving agricultural machine" or a "robotic agricultural machine". During self-driving, not only the movement of the agricultural machine, but also the operation of agricultural work (e.g., the operation of the implement) may be controlled automatically. In the case where the agricultural machine is a vehicle-type machine, travel of the agricultural machine via self-driving will be referred to as "self-traveling". The controller may be configured or programmed to control at least one of steering that is required in the movement of the agricultural machine, adjustment of the moving speed, or beginning and ending of a move. In the case of controlling a work vehicle having an implement attached thereto, the controller may be configured or programmed to control raising or lowering of the implement, beginning and ending of an operation of the implement, and so on. A move based on self-driving may include not only moving of an agricultural machine that goes along a predetermined path toward a destination, but also moving of an agricultural machine that follows a target of tracking. An agricultural machine that performs self-driving may also move partly based on the user's instructions. Moreover, an agricultural machine that performs self-driving may operate not only in a self-driving mode but also in a manual driving mode, where the agricultural machine moves through manual operations of the driver. When performed not manually but through the action of a controller, the steering of an agricultural machine will be referred to as "automatic steering". A portion of, or the entirety of, the controller may reside outside the agricultural machine. Control signals, commands, data, etc., may be communicated between the agricultural machine and a controller residing outside the agricultural machine. An agricultural machine that performs self-driving may move autonomously while sensing the surrounding environment, without any person being involved in the controlling of the movement of the agricultural machine. An agricultural machine that is capable of autonomous movement is able to travel inside the field or outside the field (e.g., on roads) in an unmanned manner. During an autonomous move, operations of detecting and avoiding obstacles may be performed.

A "work plan" is data defining a plan of one or more tasks of agricultural work to be performed by an agricultural machine. The work plan may include, for example, information representing the order of the tasks of agricultural work to be performed by an agricultural machine or the field where each of the tasks of agricultural work is to be performed. The work plan may include information representing the time and the date when each of the tasks of agricultural work is to be performed. In particular, the work plan including information representing the time and the date when each of the tasks of agricultural work is to be performed is referred to as a "work schedule" or simply as a "schedule". The work schedule may include information representing the time when each task of agricultural work is to be begun and/or ended on each of working days. The work plan or the work schedule may include information representing, for each task of agricultural work, the contents of the task, the implement to be used, and/or the types and amounts of agricultural supplies to be used. As used herein, the term "agricultural supplies" refers to goods used for agricultural work to be performed by an agricultural machine. The agricultural supplies may also be referred to simply as "supplies". The agricultural supplies may include goods consumed by agricultural work such as, for example, agricultural chemicals, fertilizers, seeds, or seedlings. The work plan may be created by a processor communicating with the agricultural machine to manage the agricultural machine or a processor mounted on the agricultural machine. The processor can create a work plan based on, for example, information input by the user (agricultural business executive, agricultural worker, etc.) manipulating a terminal device. In this specification, the processor communicating with the agricultural machine to manage the agricultural machine will be referred to as a "management device". The management device may manage agricultural work of a plurality agricultural machines. In this case, the management device may create a work plan including information on each task of agricultural work to be performed by each of the plurality of agricultural machines. The work plan may be downloaded to each of the agricultural machines and stored in a storage in each of the agricultural machines. In order to perform the scheduled agricultural work in accordance with the work plan, each agricultural machine can automatically move to a field and perform the agricultural work.

An "environment map" is data representing, with a predetermined coordinate system, the position or the region of an object existing in the environment where the agricultural machine moves. The environment map may be referred to simply as a "map" or "map data". The coordinate system defining the environment map is, for example, a world coordinate system such as a geographic coordinate system fixed to the globe. Regarding the object existing in the environment, the environment map may include information other than the position (e.g., attribute information or other types of information). The "environment map" encompasses various type of maps such as a point cloud map and a lattice map. Data on a local map or a partial map that is generated or processed in a process of constructing the environment map is also referred to as a "map" or "map data".

An "agricultural road" is a road used mainly for agriculture. An "agricultural road" is not limited to a road paved with asphalt, and encompasses unpaved roads covered with soil, gravel or the like. An "agricultural road" encompasses roads (including private roads) on which only vehicle-type agricultural machines (e.g., work vehicles such as tractors, etc.) are allowed to travel and roads on which general vehicles (automobiles, trucks, buses, etc.) are also allowed to travel. The work vehicles may automatically travel on a general road in addition to an agricultural road. The "general road" is a road maintained for traffic of general vehicles.

A "feature" refers to an object existing on the earth. Examples of features include waterways, grass, trees, roads, fields, ditches, rivers, bridges, forests, mountains, rocks, buildings, railroad tracks, and the like. Borders, names of places, names of buildings, names of fields, names of railroad lines and the like, which do not exist in the real world, are not encompassed in the "feature" according to the present disclosure.

A "GNSS satellite" refers to an artificial satellite in the Global Navigation Satellite System (GNSS). GNSS is the general term for satellite positioning systems such as GPS (Global Positioning System), QZSS (Quasi-Zenith Satellite System), GLONASS, Galileo, and BeiDou. A GNSS satellite is a satellite in such a positioning system. A signal transmitted from a GNSS satellite is referred to as a "satellite signal". A "GNSS receiver" is a device to receive radio waves transmitted from a plurality of satellites in the GNSS and perform positioning based on a signal superposed on the radio waves. "GNSS data" is data output from the GNSS receiver. The GNSS data may be generated in a predetermined format such as, for example, the NMEA-0183 format. The GNSS data may include, for example, information representing a receiving state of the satellite signal received from each of the satellites. The GNSS data may include, for example, the identification number, the angle of elevation, the azimuth angle, and a value representing the reception strength of each of the satellites from which the satellite signals are received. The reception strength is a numerical value representing the strength of each received satellite signal. The reception strength may be expressed by a value such as, for example, the carrier to noise density ratio (C/NO). The GNSS data may include positional information on the GNSS receiver or the agricultural machine, the positional information being calculated based on a plurality of received satellite signals. The positional information may be expressed by, for example, the latitude, the longitude and the altitude from the mean sea level. The GNSS data may further include information representing the reliability of the positional information.

The expression "satellite signals can be properly received" indicates that the satellite signals can be received stably such that the reliability of the positioning is not significantly lowered. A state where satellite signals cannot be received in a normal state may be expressed as a "reception failure of satellite signals" occurring. The "reception failure of satellite signals" is a state where the reliability of the positioning is lowered as compared with the normal receiving state, due to deterioration in the receiving state of the satellite signals. A reception failure may occur in the case where, for example, the number of detected satellites is small (e.g., three or less), the reception strength of each satellite signal is low, or multi-path is occurring. Whether or not a reception failure is occurring may be determined based on, for example, information on the satellites that is included in the GNSS data. It can be determined whether a reception failure is occurring based on, for example, the value of the reception strength of each of the satellites included in the GNSS data or the value of DOP (Dilution of Precision) representing the state of positional arrangement of the satellites.

A "global path" is data on a path connecting a departure point to a target point of an automatic movement of the agricultural machine, and is generated by a processor performing path planning. Generation of such a global path is referred to as "global path planning". In the following description, the global path will be referred to also as a "target path" or simply as a "path". The global path may be defined by, for example, coordinate values of a plurality of points which the agricultural machine is to pass. Such a point that the agricultural machine is to pass is referred as a "waypoint", and a line segment connecting waypoints adjacent to each other is referred to as a "link".

A "local path" is a path by which the agricultural machine can avoid an obstacle, and is consecutively generated while the agricultural machine is automatically moving along the global path. Generation of such a local path is referred to as "local path planning". The local path is consecutively generated based on data acquired by one or more sensing devices included in the agricultural machine, during a movement of the agricultural machine. The local path may be defined by a plurality of waypoints along a portion of the global path. Note that in the case where there is an obstacle in the vicinity of the global path, the waypoints may be set so as to detour around the obstacle. The length of a link between the waypoints on the local path is shorter than the length of a link between the waypoints on the global path. The device generating the local path may be the same as, or different from, the device generating the global path. For example, the management device managing the agricultural work to be performed by the agricultural machine may generate the global path, whereas the controller mounted on the agricultural machine may generate the local path. In this case, a combination of the management device and the controller functions as a "processor" performing the path planning. The controller of the agricultural machine may be configured or programmed to function as a processor performing both of global path planning and local path planning.

A "repository" is a site provided for storage of an agricultural machine. The repository may be, for example, a site managed by a user of an agricultural machine or a site run jointly by a plurality of users of agricultural machines. The repository may be, for example, a site saved for storage of an agricultural machine, such as a warehouse, a barn or a parking area at a house or an office of the user (agricultural worker, etc.). The position of the repository may be previously registered and recorded in a storage.

A "waiting area" is a site provided for an agricultural machine to wait while the agricultural machine does not perform agricultural work. One or more waiting areas may be provided in an environment where an agricultural machine performs self-driving. The above-described repository is an example of the waiting area. The waiting area may be managed or used jointly by a plurality of users. The waiting area may be, for example, a warehouse, a garage, a barn, a parking area, or any other facilities. The waiting area may be a warehouse, a barn, a garage or a parking area at a house or an office of an agricultural worker different from the user of the agricultural machine. A plurality of waiting areas may be scattered in the environment where an agricultural machine moves. In the waiting area, work such as replacement or maintenance of a portion or an implement of the agricultural machine, or supplement of supplies, may be performed. In this case, parts, tools or supplies necessary for the work may be provided in the waiting area.

Hereinafter, example embodiments of the present disclosure will be described. Note, however, that unnecessarily detailed descriptions may be omitted. For example, detailed descriptions on what is well known in the art or redundant descriptions on what is substantially the same configuration may be omitted. This is to avoid lengthy description, and facilitate the understanding of those skilled in the art. The accompanying drawings and the following description, which are provided by the present inventors so that those skilled in the art can sufficiently understand the present disclosure, are not intended to limit the scope of the claims. In the following description, elements having identical or similar functions are denoted by identical reference numerals.

The following example embodiments are only exemplary, and the techniques according to the present disclosure are not limited to the following example embodiments. For example, numerical values, shapes, materials, steps, orders of steps, layout of a display screen, etc., which are indicated in the following example embodiments are only exemplary, and admit of various modifications so long as it makes technological sense. Any one implementation may be combined with another so long as it makes technological sense to do so.

Hereinafter, example embodiments in which techniques according to the present disclosure are applied to a work vehicle, such as a tractor, which is an example of agricultural machine, will be mainly described. The techniques according to the present disclosure are also applicable to other types of agricultural machines in addition to the work vehicle such as a tractor.

FIG. 1 is a diagram providing an overview of an agriculture management system according to an illustrative example embodiment of the present disclosure. The agriculture management system shown in FIG. 1 includes a work vehicle 100, a terminal device 400, and a management device 600. The terminal device 400 includes a computer used by a user performing remote monitoring of the work vehicle 100. The management device 600 includes a computer managed by a business operator running the agriculture management system. The work vehicle 100, the terminal device 400 and the management device 600 can communicate with each other via the network 80. FIG. 1 shows one work vehicle 100, but the agriculture management system may include a plurality of the work vehicles or any other agricultural machine.

The work vehicle 100 according to the present example embodiment is a tractor. The work vehicle 100 can have an implement attached to its rear and/or its front. While performing agricultural work in accordance with a particular type of implement, the work vehicle 100 is able to travel inside a field. The work vehicle 100 may travel inside the field or outside the field with no implement being attached thereto.

The work vehicle 100 has a self-driving function. In other words, the work vehicle 100 can travel by the action of a controller, rather than manually. The controller according to the present example embodiment is provided inside the work vehicle 100, and is able to control both the speed and steering of the work vehicle 100. The work vehicle 100 can perform self-traveling outside the field (e.g., on roads) as well as inside the field.

The work vehicle 100 includes a device usable for positioning or localization, such as a GNSS receiver or an LiDAR sensor. Based on the position of the work vehicle 100 and information on a target path generated by the management device 600, the controller of the work vehicle 100 causes the work vehicle 100 to automatically travel. In addition to controlling the travel of the work vehicle 100, the controller also controls the operation of the implement. As a result, while automatically traveling inside the field, the work vehicle 100 is able to perform agricultural work by using the implement. In addition, the work vehicle 100 is able to automatically travel along the target path on a road outside the field (e.g., an agricultural road or a general road). In the case of performing self-traveling on a road outside the field, the work vehicle 100 travels while generating, along the target path, a local path along which the work vehicle 100 can avoid an obstacle, based on data output from a sensing device such as a camera or a LiDAR sensor. Inside the field, the work vehicle 100 may travel while generating a local path in substantially the same manner as described above, or may perform an operation of traveling along the target path without generating a local path and halting when an obstacle is detected.

The management device 600 includes a computer to manage the agricultural work performed by the work vehicle 100. The management device 600 may include, for example, a server computer that performs centralized management on information regarding the field on the cloud and supports agriculture by use of the data on the cloud. The management device 600 can, for example, create a work plan for the work vehicle 100 and generate a target path for the work vehicle 100 in accordance with the work plan. Alternatively, the management device 600 may generate a target path for the work vehicle 100 in response to a manipulation performed by the user by use of the terminal device 400. Hereinafter, unless otherwise specified, the target path (i.e., global path) for the work vehicle 100 to be generated by the management device 600 will be referred to simply as a "path".

The management device 600 includes a storage and a processor. The storage stores a map of a region including a plurality of fields and roads around the fields. The processor is configured or programmed to generate a path for the work vehicle 100 on the map. The map includes attribute information representing, for each of the roads, at least one of whether the road is an agricultural road, whether the road is a road along a specific feature such as a waterway or a river, or whether the road is a road where satellite signals from GNSS satellites can be properly received. For generation of a path toward a field or a path from a field toward another site, the processor generates at least one of a path including an agricultural road with priority, a path including a road along a specific feature with priority, or a path including, with priority, a road where satellite signals from GNSS satellites can be properly received. The processor generates at least one of these paths as the path for the work vehicle 100 based on the attribute information. As a result of such a process, a preferred path for self-traveling of the work vehicle 100 can be generated as described below in detail.

The management device 600 generates a target path inside the field and a target path outside the field by different methods from each other. The management device 600 generates a target path inside the field based on information regarding the field. For example, the management device 600 can generate a target path inside the field based on various types of previously registered information such as the outer shape of the field, the area size of the field, the position of the entrance/exit of the field, the width of the work vehicle 100, the width of the implement, the contents of the work, the types of crops to be grown, the region where the crops are to be grown, the growing states of the crops, and the interval between rows or ridges of the crops. The management device 600 generates a target path inside the field based on, for example, information input by the user by use of the terminal device 400 or any other device. The management device 600 generates a path inside the field such that the path covers, for example, the entirety of a work area where the work is to be performed. Meanwhile, the management device 600 generates a path outside the field in accordance with the work plan or the user's instructions. For example, the management device 600 can generate a target path outside the field based on various types of information such as the order of tasks of agricultural work indicated by the work plan, the position of the field where each task of agricultural work is to be performed, the position of the entrance/exit of the field, the time when each task of agricultural work is to begin and/or end, the attribute information on each road recorded on the map, the state of the road surface, the state of weather or the traffic state. The management device 600 may generate a target path based on information representing the path or the waypoints specified by the user manipulating the terminal device 400, without relying on the work plan.

The management device 600 may be configured or programmed to generate a path including a specific type of road with priority, in accordance with a priority item selected by the user by manipulation of the terminal device 400. The specific type of road may be, for example, an agricultural road, a road along a specific feature such as a waterway, a road where satellite signals from GNSS satellites can be properly received, or a road by which the destination site can be reached within a shortest time period. A method for generating a path with such a specific type of road being prioritized will be described below in detail.

In addition, the management device 600 may generate or edit an environment map based on data collected by the work vehicle 100 or any other movable body by use of the sensing device such as a LiDAR sensor. The management device 600 transmits data on the work plan, the target path and the environment map thus generated to the work vehicle 100. The work vehicle 100 automatically moves and performs agricultural work based on the data.

The global path planning and the generation (or editing) of the environment map may be performed by any other device than the management device 600. For example, the controller of the work vehicle 100 may perform global path planning, or the generation or editing of the environment map.

The terminal device 400 includes a computer that is used by a user who is at a remote place from the work vehicle 100. The terminal device 400 shown in FIG. 1 includes a laptop computer, but the terminal device 400 is not limited to this. The terminal device 400 may include a stationary computer such as a desktop PC (personal computer), or a mobile terminal such as a smartphone or a tablet computer. The terminal device 400 may be used to perform remote monitoring of the work vehicle 100 or remote-manipulate the work vehicle 100. For example, the terminal device 400 can display, on a display screen thereof, a video captured by one or more cameras included in the work vehicle 100. The user can watch the video to check the state of the surroundings of the work vehicle 100 and instruct the work vehicle 100 to halt or begin traveling. The terminal device 400 can also display, on the display screen thereof, a setting screen allowing the user to input information necessary to create a work plan (e.g., a schedule of each task of agricultural work) for the work vehicle 100. When the user inputs necessary information to the setting screen and performs a manipulation to transmit the information, the terminal device 400 transmits the input information to the management device 600. The management device 600 creates a work plan based on the information. The terminal device 400 may also be used to register one or more fields where the work vehicle 100 is to perform the agricultural work, the repository for the work vehicle 100, and one or more waiting areas where the work vehicle 100 is to temporarily wait. The terminal device 400 may further have a function of displaying, on a display screen thereof, a setting screen allowing the user to input information necessary to set a target path.

Hereinafter, a configuration and an operation of the system according to the present example embodiment will be described in more detail.

Figure 2:
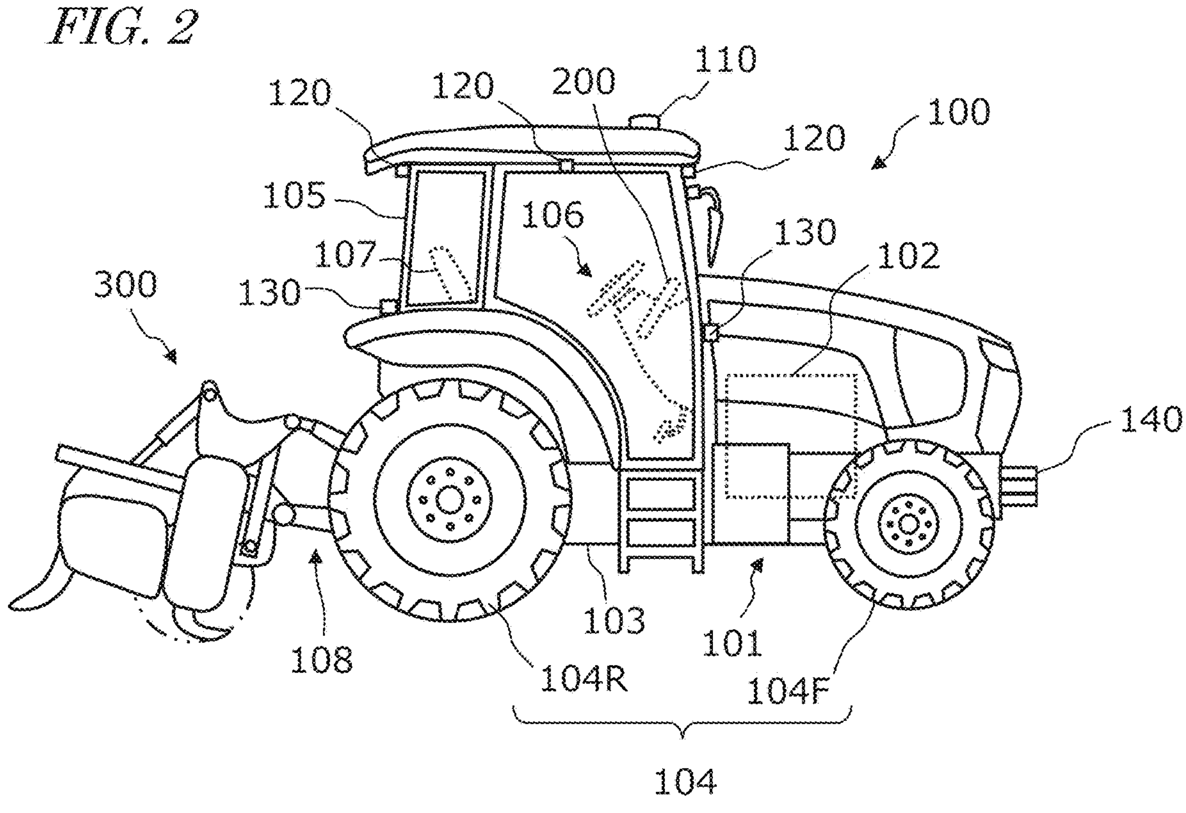
FIG. 2 is a side view schematically showing an example of work vehicle and an example of implement that is linked to the work vehicle.

FIG. 2 is a side view schematically showing an example of the work vehicle 100 and an example of implement 300 linked to the work vehicle 100. The work vehicle 100 according to the present example embodiment can operate both in a manual driving mode and a self-driving mode. In the self-driving mode, the work vehicle 100 is able to perform unmanned travel. The work vehicle 100 can perform self-driving both inside a field and outside the field.

As shown in FIG. 2, the work vehicle 100 includes a vehicle body 101, a prime mover (engine) 102, and a transmission 103. On the vehicle body 101, wheels 104 with tires and a cabin 105 are provided. The wheels 104 include a pair of front wheels 104F and a pair of rear wheels 104R. Inside the cabin 105, a driver's seat 107, a steering device 106, an operational terminal 200, and switches for manipulation are provided. In the case where the work vehicle 100 performs tasked travel inside the field, the front wheels 104F and/or the rear wheels 104R may be replaced with wheels (crawlers) provided with continuous tracks, instead of being wheels provided with tires.

The work vehicle 100 includes a plurality of sensing devices sensing the surroundings of the work vehicle 100. In the example shown in FIG. 2, the sensing devices include a plurality of cameras 120, a LiDAR sensor 140, and a plurality of obstacle sensors 130.

The cameras 120 may be provided at the front/rear/right/left of the work vehicle 100, for example. The cameras 120 image the surrounding environment of the work vehicle 100 and generate image data. The images acquired by the cameras 120 may be transmitted to the terminal device 400, which is responsible for remote monitoring. The images may be used to monitor the work vehicle 100 during unmanned driving. The cameras 120 may also be used to generate images to allow the work vehicle 100, traveling on a road outside the field (an agricultural road or a general road), to recognize objects, obstacles, white lines, road signs, traffic signs or the like in the surroundings of the work vehicle 100.

The LiDAR sensor 140 in the example shown in FIG. 2 is disposed on a bottom portion of a front surface of the vehicle body 101. The LiDAR sensor 140 may be disposed at any other position. While the work vehicle 100 is traveling mainly outside the field, the LiDAR sensor 140 repeatedly outputs sensor data representing the distance and the direction between an object existing in the surrounding environment thereof and each of measurement points, or a two-dimensional or three-dimensional coordinate values of each of the measurement points. The sensor data output from the LiDAR sensor 140 is processed by the controller of the work vehicle 100. The controller can perform localization of the work vehicle 100 by matching the sensor data against the environment map. The controller can further detect an object such as an obstacle existing in the surroundings of the work vehicle 100 based on the sensor data, and generate, along the global path, a local path along which the work vehicle 100 needs to actually proceed. The controller can utilize an algorithm such as, for example, SLAM (Simultaneous Localization and Mapping) to generate or edit an environment map. The work vehicle 100 may include a plurality of LiDAR sensors disposed at different positions with different orientations.

The plurality of obstacle sensors 130 shown in FIG. 2 are provided at the front and the rear of the cabin 105. The obstacle sensors 130 may be disposed at other positions. For example, one or more obstacle sensors 130 may be disposed at any position at the sides, the front or the rear of the vehicle body 101. The obstacle sensors 130 may include, for example, a laser scanner or an ultrasonic sonar. The obstacle sensors 130 may be used to detect obstacles in the surroundings of the work vehicle 100 during self-traveling to cause the work vehicle 100 to halt or detour around the obstacles. The LiDAR sensor 140 may be used as one of the obstacle sensors 130.

The work vehicle 100 further includes a GNSS unit 110. The GNSS unit 110 includes a GNSS receiver. The GNSS receiver may include an antenna to receive a signal(s) from a GNSS satellite(s) and a processor to calculate the position of the work vehicle 100 based on the signal(s) received by the antenna. The GNSS unit 110 receives satellite signals transmitted from the plurality of GNSS satellites, and performs positioning based on the satellite signals. Although the GNSS unit 110 according to the present example embodiment is disposed above the cabin 105, it may be disposed at any other position.

The GNSS unit 110 may include an inertial measurement unit (IMU). Signals from the IMU can be used to complement position data. The IMU can measure a tilt or a small motion of the work vehicle 100. The data acquired by the IMU can be used to complement the position data based on the satellite signals, so as to improve the performance of positioning.

The controller of the work vehicle 100 may utilize, for positioning, the sensing data acquired by the sensing devices such as the cameras 120 or the LIDAR sensor 140, in addition to the positioning results provided by the GNSS unit 110. In the case where objects serving as characteristic points exist in the environment that is traveled by the work vehicle 100, as in the case of an agricultural road, a forest road, a general road or an orchard, the position and the orientation of the work vehicle 100 can be estimated with a high accuracy based on data that is acquired by the cameras 120 or the LiDAR sensor 140 and on an environment map that is previously stored in the storage. By correcting or complementing position data based on the satellite signals using the data acquired by the cameras 120 or the LiDAR sensor 140, it becomes possible to identify the position of the work vehicle 100 with a higher accuracy.

The prime mover 102 may be a diesel engine, for example. Instead of a diesel engine, an electric motor may be used. The transmission 103 can change the propulsion and the moving speed of the work vehicle 100 through a speed changing mechanism. The transmission 103 can also switch between forward travel and backward travel of the work vehicle 100.

The steering device 106 includes a steering wheel, a steering shaft connected to the steering wheel, and a power steering device to assist in the steering by the steering wheel. The front wheels 104F are the steered wheels, such that changing their angle of turn (also referred to as "steering angle") can cause a change in the traveling direction of the work vehicle 100. The steering angle of the front wheels 104F can be changed by manipulating the steering wheel. The power steering device includes a hydraulic device or an electric motor to supply an assisting force to change the steering angle of the front wheels 104F. When automatic steering is performed, under the control of the controller disposed in the work vehicle 100, the steering angle may be automatically adjusted by the power of the hydraulic device or the electric motor.

A linkage device 108 is provided at the rear of the vehicle body 101. The linkage device 108 includes, e.g., a three-point linkage (also referred to as a "three-point link" or a "three-point hitch"), a PTO (Power Take Off) shaft, a universal joint, and a communication cable. The linkage device 108 allows the implement 300 to be attached to, or detached from, the work vehicle 100. The linkage device 108 is able to raise or lower the three-point link with a hydraulic device, for example, thus changing the position and/or attitude of the implement 300. Moreover, motive power can be sent from the work vehicle 100 to the implement 300 via the universal joint. While towing the implement 300, the work vehicle 100 allows the implement 300 to perform a predetermined task. The linkage device may be provided frontward of the vehicle body 101. In that case, the implement can be connected frontward of the work vehicle 100.

Although the implement 300 shown in FIG. 2 is a rotary tiller, the implement 300 is not limited to a rotary tiller. For example, any arbitrary implement such as a seeder, a spreader, a transplanter, a mower, a rake implement, a baler, a harvester, a sprayer, or a harrow, can be connected to the work vehicle 100 for use.

The work vehicle 100 shown in FIG. 2 can be driven by human driving; alternatively, it may only support unmanned driving. In that case, component elements which are only required for human driving, e.g., the cabin 105, the steering device 106, and the driver's seat 107 do not need to be provided in the work vehicle 100. An unmanned work vehicle 100 can travel via autonomous driving, or by remote operation by a user.

Figure 3:
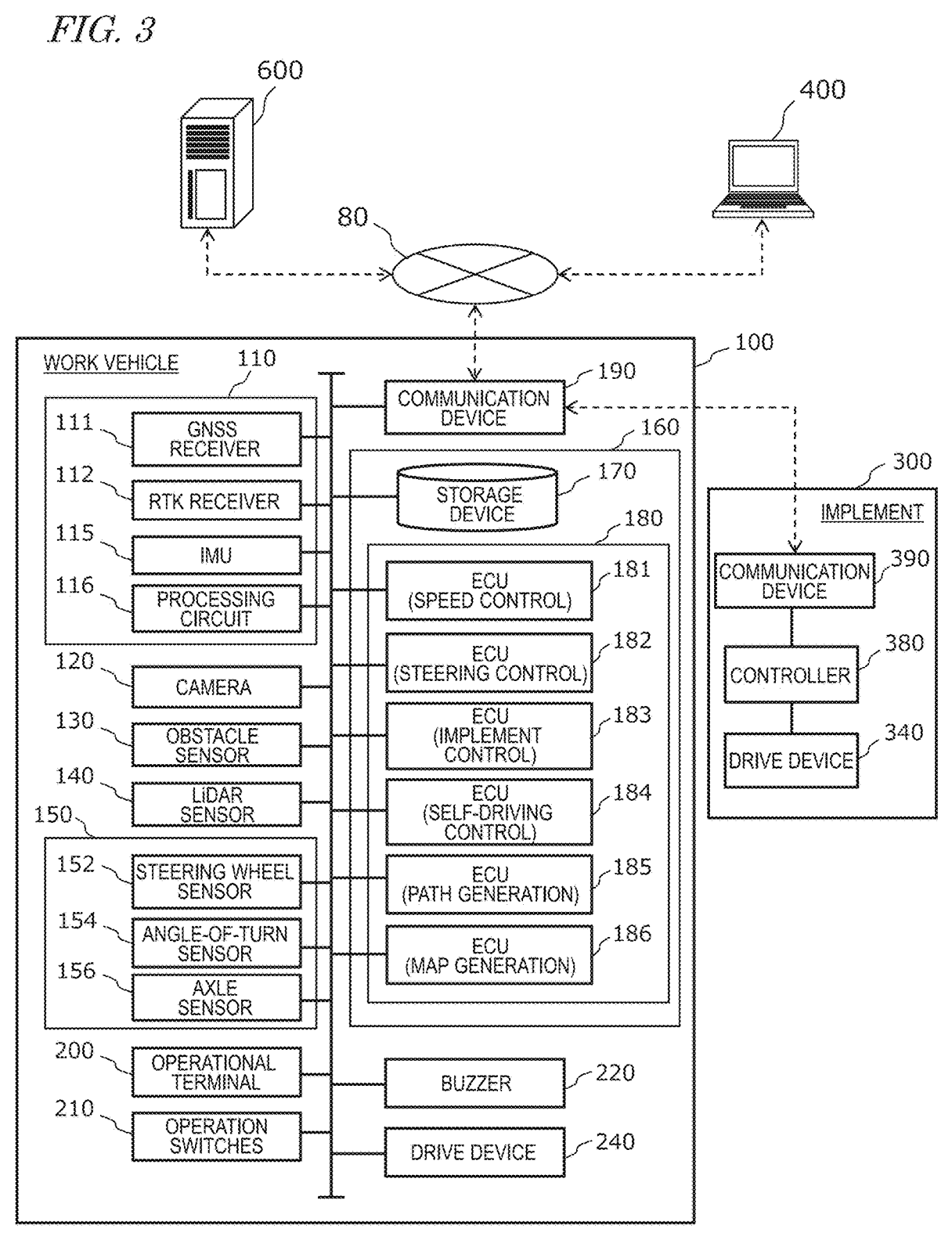

FIG. 3 is a block diagram showing an example configuration of the work vehicle 100 and the implement 300. The work vehicle 100 and the implement 300 can communicate with each other via a communication cable that is included in the linkage device 108. The work vehicle 100 is able to communicate with the terminal device 400 and the management device 600 via the network 80.

In addition to the GNSS unit 110, the cameras 120, the obstacle sensors 130, the LiDAR sensor 140 and the operational terminal 200, the work vehicle 100 in the example of FIG. 3 includes sensors 150 to detect the operating status of the work vehicle 100, a control system 160, a communication device 190, operation switches 210, a buzzer 220, and a drive device 240. These component elements are communicably connected to each other via a bus. The GNSS unit 110 includes a GNSS receiver 111, an RTK receiver 112, an inertial measurement unit (IMU) 115, and a processing circuit 116. The sensors 150 include a steering wheel sensor 152, an angle-of-turn sensor 154, and an axle sensor 156. The control system 160 includes a storage 170 and a controller 180. The controller 180 includes a plurality of electronic control units (ECU) 181 to 186. The implement 300 includes a drive device 340, a controller 380, and a communication device 390. Note that FIG. 3 shows component elements which are relatively closely related to the operations of self-driving by the work vehicle 100, while other components are omitted from illustration.

The GNSS receiver 111 in the GNSS unit 110 receives satellite signals transmitted from the plurality of GNSS satellites and generates GNSS data based on the satellite signals. The GNSS data is generated in a predetermined format such as, for example, the NMEA-0183 format. The GNSS data may include, for example, the identification number, the angle of elevation, the azimuth angle, and a value representing the reception strength of each of the satellites from which the satellite signals are received. The reception strength may be expressed by a value of, for example, the carrier to noise density ratio (C/NO). The GNSS data may also include positional information on the work vehicle 100 calculated based on a plurality of received satellite signals, and information representing the reliability of the positional information. The positional information may be expressed by, for example, the latitude, the longitude and the altitude from the mean sea level. The reliability of the positional information may be expressed by, for example, the DOP value representing the state of positional arrangement of the satellites.

Figure 4:
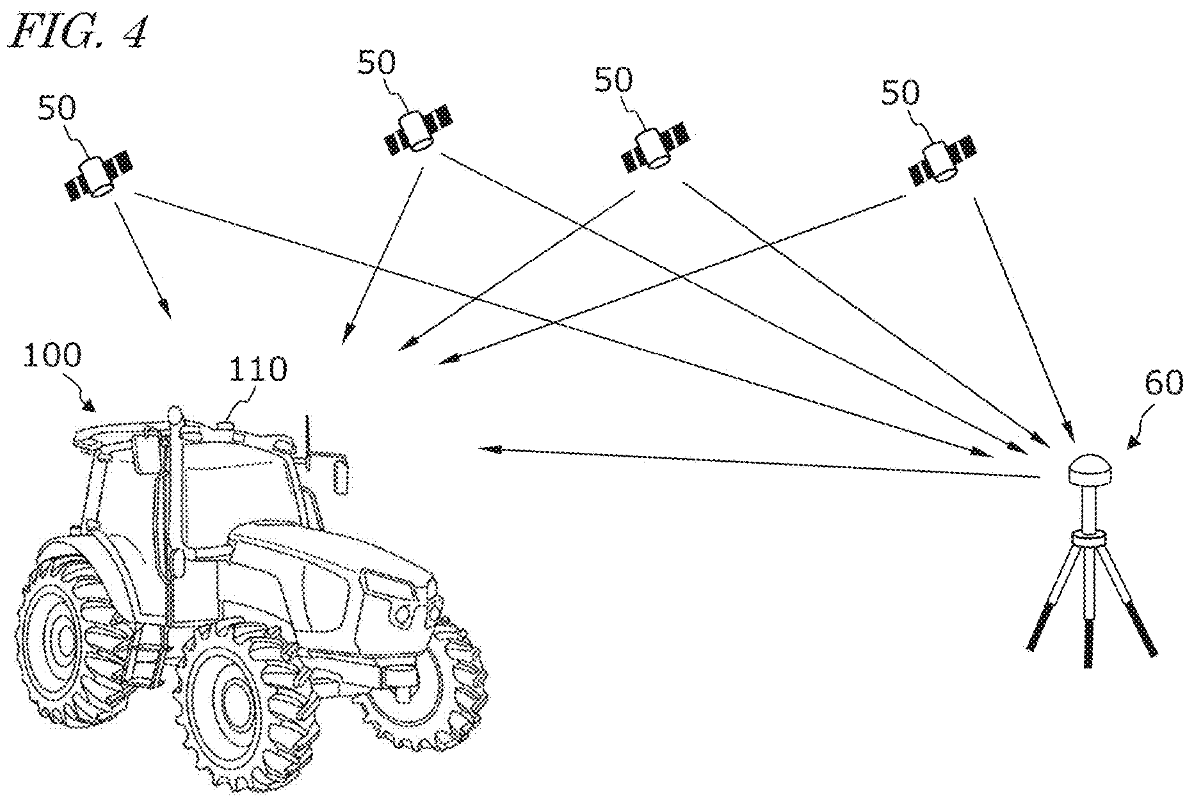
FIG. 4 is a conceptual diagram showing an example of the work vehicle performing positioning based on an RTK-GNSS.

The GNSS unit 110 shown in FIG. 3 performs positioning of the work vehicle 100 by utilizing an RTK (Real Time Kinematic)-GNSS. FIG. 4 is a conceptual diagram showing an example of the work vehicle 100 performing positioning based on the RTK-GNSS. In the positioning based on the RTK-GNSS, not only satellite signals transmitted from a plurality of GNSS satellites 50, but also a correction signal that is transmitted from a reference station 60 is used. The reference station 60 may be disposed near the field where the work vehicle 100 performs tasked travel (e.g., at a position within about 10 km of the work vehicle 100). The reference station 60 generates a correction signal of, for example, an RTCM format based on the satellite signals received from the plurality of GNSS satellites 50, and transmits the correction signal to the GNSS unit 110. The RTK receiver 112, which includes an antenna and a modem, receives the correction signal transmitted from the reference station 60. Based on the correction signal, the processing circuit 116 of the GNSS unit 110 corrects the results of the positioning performed by use of the GNSS receiver 111. Use of the RTK-GNSS enables positioning with an accuracy on the order of several centimeters of errors, for example. Positional information including latitude, longitude, and altitude information is acquired through the highly accurate positioning by the RTK-GNSS. The GNSS unit 110 calculates the position of the work vehicle 100 as frequently as, for example, one to ten times per second.

Note that the positioning method is not limited to being performed by use of an RTK-GNSS; any arbitrary positioning method (e.g., an interferometric positioning method or a relative positioning method) that provides positional information with the necessary accuracy can be used. For example, positioning may be performed by utilizing a VRS (Virtual Reference Station) or a DGPS (Differential Global Positioning System). In the case where positional information with the necessary accuracy can be obtained without the use of the correction signal transmitted from the reference station 60, positional information may be generated without using the correction signal. In that case, the GNSS unit 110 does not need to include the RTK receiver 112.

Even in the case where the RTK-GNSS is used, at a site where the correction signal from the reference station 60 cannot be acquired (e.g., on a road far from the field), the position of the work vehicle 100 is estimated by another method with no use of the signal from the RTK receiver 112. For example, the position of the work vehicle 100 may be estimated by matching the data output from the LiDAR sensor 140 and/or the cameras 120 against a highly accurate environment map.

The GNSS unit 110 according to the present example embodiment further includes the IMU 115. The IMU 115 may include a 3-axis accelerometer and a 3-axis gyroscope. The IMU 115 may include a direction sensor such as a 3-axis geomagnetic sensor. The IMU 115 functions as a motion sensor which can output signals representing parameters such as acceleration, velocity, displacement, and attitude of the work vehicle 100. Based not only on the satellite signals and the correction signal but also on a signal that is output from the IMU 115, the processing circuit 116 can estimate the position and orientation of the work vehicle 100 with a higher accuracy. The signal that is output from the IMU 115 may be used for the correction or complementation of the position that is calculated based on the satellite signals and the correction signal. The IMU 115 outputs a signal more frequently than the GNSS receiver 111. Utilizing this signal that is output highly frequently, the processing circuit 116 allows the position and orientation of the work vehicle 100 to be measured more frequently (e.g., about 10 Hz or above). Instead of the IMU 115, a 3-axis accelerometer and a 3-axis gyroscope may be separately provided. The IMU 115 may be provided as a separate device from the GNSS unit 110.

The cameras 120 are imagers that image the surrounding environment of the work vehicle 100. Each of the cameras 120 includes an image sensor such as a CCD (Charge Coupled Device) or a CMOS (Complementary Metal Oxide Semiconductor), for example. In addition, each camera 120 may include an optical system including one or more lenses and a signal processing circuit. During travel of the work vehicle 100, the cameras 120 image the surrounding environment of the work vehicle 100, and generate image data (e.g., motion picture data). The cameras 120 are able to capture motion pictures at a frame rate of 3 frames/second (fps: frames per second) or greater, for example. The images generated by the cameras 120 may be used by a remote supervisor to check the surrounding environment of the work vehicle 100 with the terminal device 400, for example. The images generated by the cameras 120 may also be used for the purpose of positioning and/or detection of obstacles. As shown in FIG. 2, the plurality of cameras 120 may be provided at different positions on the work vehicle 100, or a single camera 120 may be provided. A visible camera(s) to generate visible light images and an infrared camera(s) to generate infrared images may be separately provided. Both of a visible camera(s) and an infrared camera(s) may be provided as cameras for generating images for monitoring purposes. The infrared camera(s) may also be used for detection of obstacles at nighttime.

The obstacle sensors 130 detect objects existing in the surroundings of the work vehicle 100. Each of the obstacle sensors 130 may include a laser scanner or an ultrasonic sonar, for example. When an object exists at a position within a predetermined distance from one of the obstacle sensors 130, the obstacle sensor 130 outputs a signal indicating the presence of the obstacle. The plurality of obstacle sensors 130 may be provided at different positions on the work vehicle 100. For example, a plurality of laser scanners and a plurality of ultrasonic sonars may be disposed at different positions on the work vehicle 100. Providing such a great number of obstacle sensors 130 can reduce blind spots in monitoring obstacles in the surroundings of the work vehicle 100.

The steering wheel sensor 152 measures the angle of rotation of the steering wheel of the work vehicle 100. The angle-of-turn sensor 154 measures the angle of turn of the front wheels 104F, which are the steered wheels. Measurement values by the steering wheel sensor 152 and the angle-of-turn sensor 154 are used for steering control by the controller 180.

The axle sensor 156 measures the rotational speed, i.e., the number of revolutions per unit time, of an axle that is connected to the wheels 104. The axle sensor 156 may be a sensor including a magnetoresistive element (MR), a Hall generator, or an electromagnetic pickup, for example. The axle sensor 156 outputs a numerical value indicating the number of revolutions per minute (unit: rpm) of the axle, for example. The axle sensor 156 is used to measure the speed of the work vehicle 100.

The drive device 240 includes various types of devices required to cause the work vehicle 100 to travel and to drive the implement 300; for example, the prime mover 102, the transmission 103, the steering device 106, the linkage device 108 and the like described above. The prime mover 102 may include an internal combustion engine such as, for example, a diesel engine. The drive device 240 may include an electric motor for traction instead of, or in addition to, the internal combustion engine.

The buzzer 220 is an audio output device to present an alarm sound to alert the user of an abnormality. For example, the buzzer 220 may present an alarm sound when an obstacle is detected during self-driving. The buzzer 220 is controlled by the controller 180.

The storage 170 includes one or more storage mediums such as a flash memory or a magnetic disc. The storage 170 stores various data that is generated by the GNSS unit 110, the cameras 120, the obstacle sensors 130, the LiDAR sensor 140, the sensors 150, and the controller 180. The data that is stored by the storage 170 may include map data on the environment where the work vehicle 100 travels (environment map) and data on a global path (target path) for self-driving. The environment map includes information on a plurality of fields where the work vehicle 100 performs agricultural work and roads around the fields. The environment map and the target path may be generated by a processor in the management device 600. The controller 180 according to the present example embodiment may have a function of generating or editing an environment map and a target path. The controller 180 can edit the environment map and the target path, acquired from the management device 160, in accordance with the environment where the work vehicle 100 travels. The storage 170 also stores data on a work plan received by the communication device 190 from the management device 600. The work plan includes information on a plurality of tasks of agricultural work to be performed by the work vehicle 100 over a plurality of working days. The work plan may be, for example, data on a work schedule including information on the time when the work vehicle 100 is scheduled to perform each task of agricultural work on each of the working days. The storage 170 also stores a computer program(s) to cause each of the ECUs in the controller 180 to perform various operations described below. Such a computer program(s) may be provided to the work vehicle 100 via a storage medium (e.g., a semiconductor memory, an optical disc, etc.) or through telecommunication lines (e.g., the Internet). Such a computer program(s) may be marketed as commercial software.

The controller 180 includes the plurality of ECUs. The plurality of ECUs include, for example, the ECU 181 for speed control, the ECU 182 for steering control, the ECU 183 for implement control, the ECU 184 for self-driving control, the ECU 185 for path generation, and the ECU 186 for map generation.

The ECU 181 controls the prime mover 102, the transmission 103 and brakes included in the drive device 240, thus controlling the speed of the work vehicle 100.

The ECU 182 controls the hydraulic device or the electric motor included in the steering device 106 based on a measurement value of the steering wheel sensor 152, thus controlling the steering of the work vehicle 100.

In order to cause the implement 300 to perform a desired operation, the ECU 183 controls the operations of the three-point link, the PTO shaft and the like that are included in the linkage device 108. Also, the ECU 183 generates a signal to control the operation of the implement 300, and transmits this signal from the communication device 190 to the implement 300.

Based on data output from the GNSS unit 110, the cameras 120, the obstacle sensors 130, the LiDAR sensor 140 and the sensors 150, the ECU 184 performs computation and control for achieving self-driving. For example, the ECU 184 specifies the position of the work vehicle 100 based on the data output from at least one of the GNSS unit 110, the cameras 120, or the LiDAR sensor 140. Inside the field, the ECU 184 may determine the position of the work vehicle 100 based only on the data output from the GNSS unit 110. The ECU 184 may estimate or correct the position of the work vehicle 100 based on the data acquired by the cameras 120 or the LiDAR sensor 140. Use of the data acquired by the cameras 120 or the LiDAR sensor 140 allows the accuracy of the positioning to be further improved. Outside the field, the ECU 184 estimates the position of the work vehicle 100 by use of the data output from the LiDAR sensor 140 or the cameras 120. For example, the ECU 184 may estimate the position of the work vehicle 100 by matching the data output from the LiDAR sensor 140 or the cameras 120 against the environment map. During self-driving, the ECU 184 performs computation necessary for the work vehicle 100 to travel along a target path or a local path, based on the estimated position of the work vehicle 100. The ECU 184 sends the ECU 181 a command to change the speed, and sends the ECU 182 a command to change the steering angle. In response to the command to change the speed, the ECU 181 controls the prime mover 102, the transmission 103 or the brakes to change the speed of the work vehicle 100. In response to the command to change the steering angle, the ECU 182 controls the steering device 106 to change the steering angle.

While the work vehicle 100 is traveling along the target path, the ECU 185 consecutively generates a local path along which the work vehicle 100 can avoid an obstacle. During travel of the work vehicle 100, the ECU 185 recognizes an obstacle existing in the surroundings of the work vehicle 100 based on the data output from the cameras 120, the obstacle sensors 130 and the LiDAR sensor 140. The ECU 185 generates a local path such that the work vehicle 100 avoids the recognized obstacle.

The ECU 185 may have a function of performing global path planning instead of the management device 160. In this case, the ECU 185 determines a destination of the work vehicle 100 based on the work plan stored in the storage 170, and determines a target path from a beginning point to a target point of the movement of the work vehicle 100. For example, the ECU 185 can generate, as the target path, a path by which the work vehicle 100 can arrive at the destination within the shortest time period, based on the environment map stored in the storage 170 and including information on the roads. Alternatively, the ECU 185 may generate a path including, with priority, a a specific type of road (e.g., an agricultural road, a road along a specific feature such as a waterway, a road where satellite signals from GNSS satellites are receivable in a satisfactory manner, or the like), as the target path based on the attribute information on each of the roads included in the environment map.

The ECU 186 generates or edits a map of the environment where the work vehicle 100 travels. In the present example embodiment, an environment map generated by an external device such as the management device 600 is transmitted to the work vehicle 100 and recorded in the storage 170. Instead, the ECU 186 can generate or edit an environment map. Hereinafter, an operation in a case where the ECU 186 generates an environment map will be described. An environment map may be generated based on sensor data output from the LiDAR sensor 140. For generating an environment map, the ECU 186 consecutively generates three-dimensional point cloud data based on the sensor data output from the LiDAR sensor 140 while the work vehicle 100 is traveling. The ECU 186 can generate an environment map by connecting the point cloud data consecutively generated by use of an algorithm such as, for example, SLAM. The environment map generated in this manner is a highly accurate three-dimensional map, and may be used for localization performed by the ECU 184. Based on this three-dimensional map, a two-dimensional map usable for the global path planning may be generated. In this specification, the three-dimensional map that is used for the localization and the two-dimensional map that is used for the global path planning will be both referred to as an "environment map". The ECU 186 can further edit the map by adding, to the map, various types of attribute information on a feature (e.g., a waterway, a river, grass, a tree, etc.), the type of the road (e.g., whether the road is an agricultural road), the state of the road surface, how easily the road is passable, or the like that is recognized based on the data output from the cameras 120 or the LiDAR sensor 140.

Through the actions of these ECUs, the controller 180 realizes self-driving. During self-driving, the controller 180 controls the drive device 240 based on the measured or estimated position of the work vehicle 100 and on the generated path. As a result, the controller 180 can cause the work vehicle 100 to travel along the target path.

The plurality of ECUs included in the controller 180 can communicate with each other in accordance with a vehicle bus standard such as, for example, a CAN (Controller Area Network). Instead of the CAN, faster communication methods such as Automotive Ethernet (registered trademark) may be used. Although the ECUs 181 to 186 are illustrated as individual blocks in FIG. 3, the function of each of the ECU 181 to 186 may be implemented by a plurality of ECUs. Alternatively, an onboard computer that integrates the functions of at least some of the ECUs 181 to 186 may be provided. The controller 180 may include ECUs other than the ECUs 181 to 186, and any number of ECUs may be provided in accordance with functionality. Each ECU includes a processing circuit including one or more processors.

The communication device 190 is a device including a circuit communicating with the implement 300, the terminal device 400 and the management device 600. The communication device 190 includes circuitry to perform exchanges of signals complying with an ISOBUS standard such as ISOBUS-TIM, for example, between itself and the communication device 390 of the implement 300. This allows the implement 300 to perform a desired operation, or allows information to be acquired from the implement 300. The communication device 190 may further include an antenna and a communication circuit to exchange signals via the network 80 with communication devices of the terminal device 400 and the management device 600. The network 80 may include a 3G, 4G, 5G, or any other cellular mobile communications network and the Internet, for example. The communication device 190 may have a function of communicating with a mobile terminal that is used by a supervisor who is situated near the work vehicle 100. With such a mobile terminal, communication may be performed based on any arbitrary wireless communication standard, e.g., Wi-Fi (registered trademark), 3G, 4G, 5G or any other cellular mobile communication standard, or Bluetooth (registered trademark).

The operational terminal 200 is a terminal for the user to perform a manipulation related to the travel of the work vehicle 100 and the operation of the implement 300, and is also referred to as a virtual terminal (VT). The operational terminal 200 may include a display device such as a touch screen panel, and/or one or more buttons. The display device may be a display such as a liquid crystal display or an organic light-emitting diode (OLED) display, for example. By manipulating the operational terminal 200, the user can perform various manipulations, such as, for example, switching ON/OFF the self-driving mode, recording or editing an environment map, setting a target path, and switching ON/OFF the implement 300. At least a portion of these manipulations may also be realized by manipulating the operation switches 210. The operational terminal 200 may be configured so as to be detachable from the work vehicle 100. A user who is at a remote place from the work vehicle 100 may manipulate the detached operational terminal 200 to control the operation of the work vehicle 100. Instead of the operational terminal 200, the user may manipulate a computer on which necessary application software is installed, for example, the terminal device 400, to control the operation of the work vehicle 100.

Figure 5:
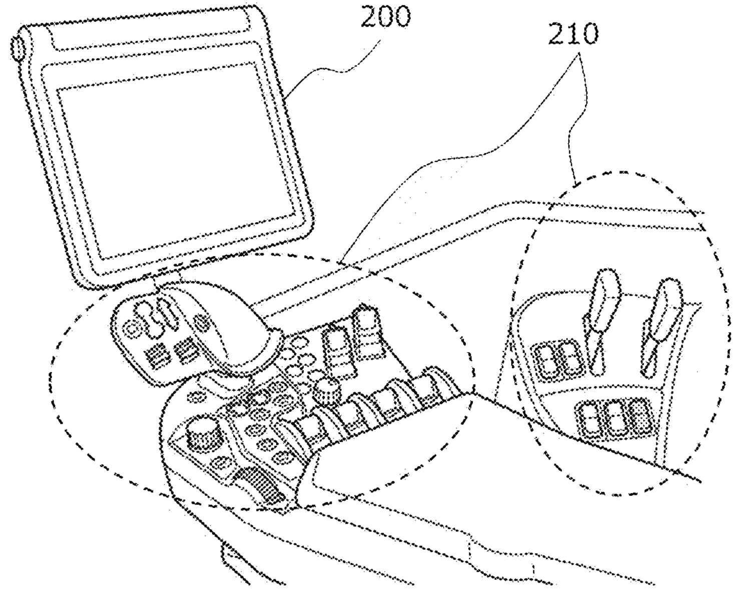
FIG. 5 is a diagram showing an example of operational terminal and an example of operation switches disposed in a cabin.

FIG. 5 is a diagram showing an example of the operational terminal 200 and an example of the operation switches 210 both provided in the cabin 105. In the cabin 105, the switches 210, including a plurality of switches that are manipulable to the user, are disposed. The operation switches 210 may include, for example, a switch to select the gear shift as to a main gear shift or a range gear shift, a switch to switch between a self-driving mode and a manual driving mode, a switch to switch between forward travel and backward travel, a switch to raise or lower the implement 300, and the like. In the case where the work vehicle 100 only performs unmanned driving and lacks human driving functionality, the work vehicle 100 does not need to include the operation switches 210.

The drive device 340 in the implement 300 shown in FIG. 3 performs operations necessary for the implement 300 to perform predetermined work. The drive device 340 includes a device suitable for uses of the implement 300, for example, a hydraulic device, an electric motor, a pump or the like. The controller 380 controls the operation of the drive device 340. In response to a signal that is transmitted from the work vehicle 100 via the communication device 390, the controller 380 causes the drive device 340 to perform various operations. Moreover, a signal that is in accordance with the state of the implement 300 can be transmitted from the communication device 390 to the work vehicle 100.

Figure 6:
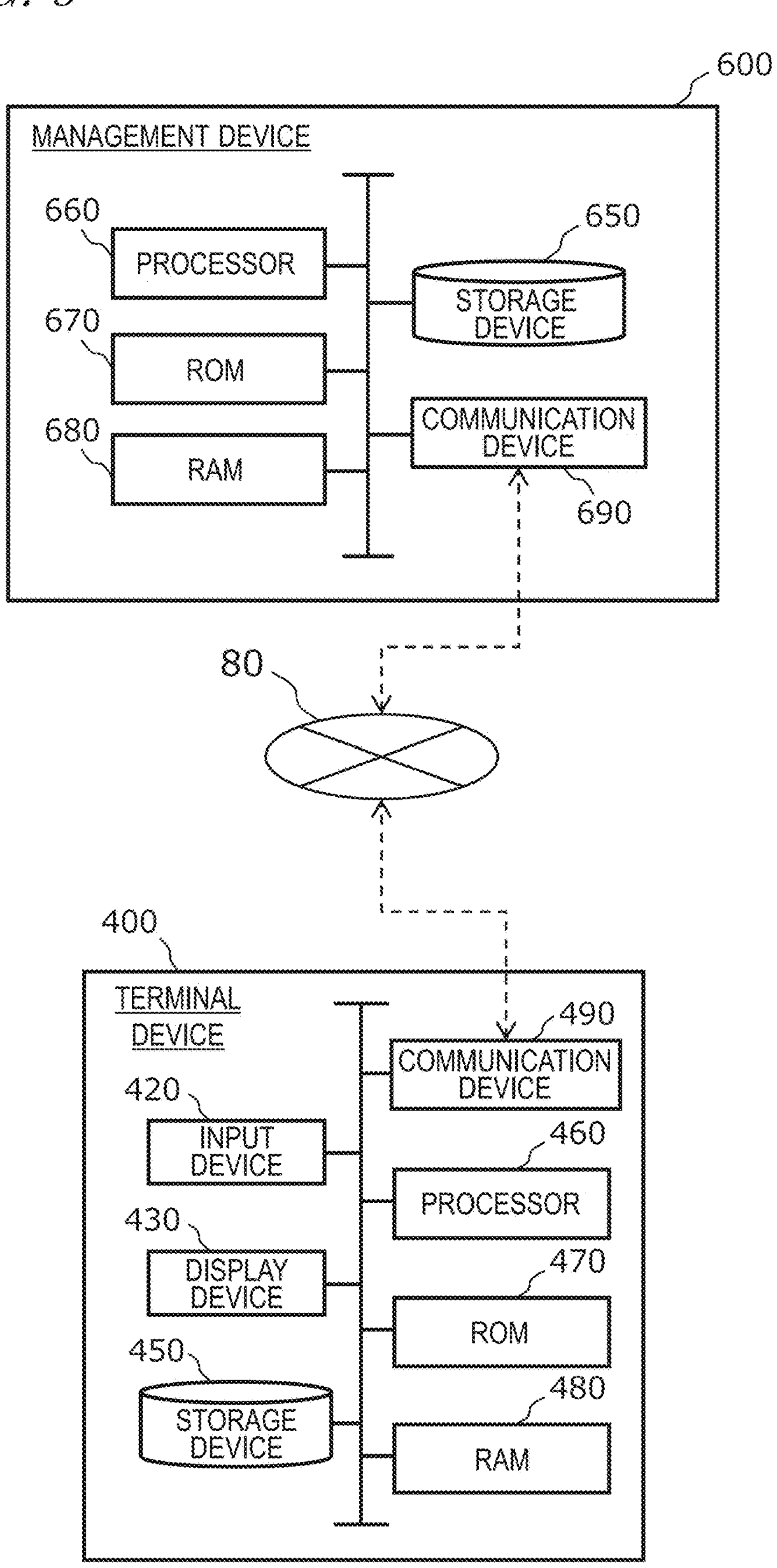
FIG. 6 is a block diagram showing an example of hardware configuration of a management device and a terminal device.

Now, a configuration of the management device 600 and the terminal device 400 will be described with reference to FIG. 6. FIG. 6 is a block diagram showing an example of schematic hardware configuration of the management device 600 and the terminal device 400.

The management device 600 includes a storage 650, a processor 660, a ROM (Read Only Memory) 670, a RAM (Random Access Memory) 680, and a communication device 690. These component elements are communicably connected to each other via a bus. The management device 600 may function as a cloud server to manage the schedule of the agricultural work to be performed by the work vehicle 100 in a field and support agriculture by use of the data managed by the management device 600 itself. The user can input information necessary to create a work plan by use of the terminal device 400 and upload the information to the management device 600 via the network 80. The management device 600 can create a schedule of agricultural work, that is, a work plan based on the information. The management device 600 can further generate or edit an environment map and perform global path planning for the work vehicle 100. The environment map may be distributed from a computer external to the management device 600.

The communication device 690 is a communication module to communicate with the work vehicle 100 and the terminal device 400 via the network 80. The communication device 690 can perform wired communication in compliance with communication standards such as, for example, IEEE1394 (registered trademark) or Ethernet (registered trademark). The communication device 690 may perform wireless communication in compliance with Bluetooth (registered trademark) or Wi-Fi, or cellular mobile communication based on 3G, 4G, 5G or any other cellular mobile communication standard.

The processor 660 include, may for example, a semiconductor integrated circuit including a central processing unit (CPU). The processor 660 may be realized by a microprocessor or a microcontroller. Alternatively, the processor 660 may be realized by an FPGA (Field Programmable Gate Array), a GPU (Graphics Processing Unit), an ASIC (Application Specific Integrated Circuit) or an ASSP (Application Specific Standard Product) each including a CPU, or a combination of two or more selected from these circuits. The processor 660 consecutively executes a computer program, describing commands to execute at least one process, stored in the ROM 670 and thus realizes a desired process.

The ROM 670 is, for example, a writable memory (e.g., PROM), a rewritable memory (e.g., flash memory) or a memory which can only be read from but cannot be written to. The ROM 670 stores a program to control operations of the processor 660. The ROM 670 does not need to be a single storage medium, and may be an assembly of a plurality of storage mediums. A portion of the assembly of the plurality of storage memories may be a detachable memory.

The RAM 680 provides a work area in which the control program stored in the ROM 670 is once developed at the time of boot. The RAM 680 does not need to be a single storage medium, and may be an assembly of a plurality of storage mediums.

The storage 650 mainly functions as a storage for a database. The storage 650 may be, for example, a magnetic storage or a semiconductor storage. An example of the magnetic storage is a hard disc drive (HDD). An example of the semiconductor storage is a solid state drive (SSD). The storage 650 may be a device independent from the management device 600. For example, the storage 650 may be a storage connected to the management device 600 via the network 80, for example, a cloud storage.

The terminal device 400 includes an input device 420, a display device 430, a storage 450, a processor 460, a ROM 470, a RAM 480, and a communication device 490. These component elements are communicably connected to each other via a bus. The input device 420 is a device to convert an instruction from the user into data and input the data to a computer. The input device 420 may be, for example, a keyboard, a mouse or a touch panel. The display device 430 may be, for example, a liquid crystal display or an organic EL display. The processor 460, the ROM 470, the RAM 480, the storage 450 and the communication device 490 are substantially the same as the corresponding component elements described above regarding the example of the hardware configuration of the management device 600, and will not be described in repetition.

Now, an operation of the work vehicle 100, the terminal device 400 and the management device 600 will be described.

First, an example operation of self-traveling of the work vehicle 100 will be described. The work vehicle 100 according to the present example embodiment can automatically travel both inside and outside a field. Inside the field, the work vehicle 100 drives the implement 300 to perform predetermined agricultural work while traveling along a preset target path. When detecting an obstacle by the obstacle sensors 130 thereof while traveling inside the field, the work vehicle 100 halts traveling and performs operations of presenting an alarm sound from the buzzer 220, transmitting an alert signal to the terminal device 400 and the Inside the field, the positioning of the work vehicle 100 like. Inside the field, the positioning of the work vehicle 100 is performed based mainly on data output from the GNSS unit 110. Meanwhile, outside the field, the work vehicle 100 automatically travels along a target path set for an agricultural road or a general road outside the field. While traveling outside the field, the work vehicle 100 performs local path planning based on data acquired by the cameras 120 or the LiDAR 140. When an obstacle is detected outside the field, the work vehicle 100 avoids the obstacle or halts at the point. Outside the field, the position of the work vehicle 100 is estimated based on data output from the LIDAR sensor 140 or the cameras 120 in addition to positioning data output from the GNSS unit 110.

Hereinafter, an operation of the work vehicle 100 performing self-traveling inside the field will be described. An operation of the work vehicle 100 performing self-traveling outside the field and a process of global path planning and local path planning outside the field will be described later.

Figure 7:
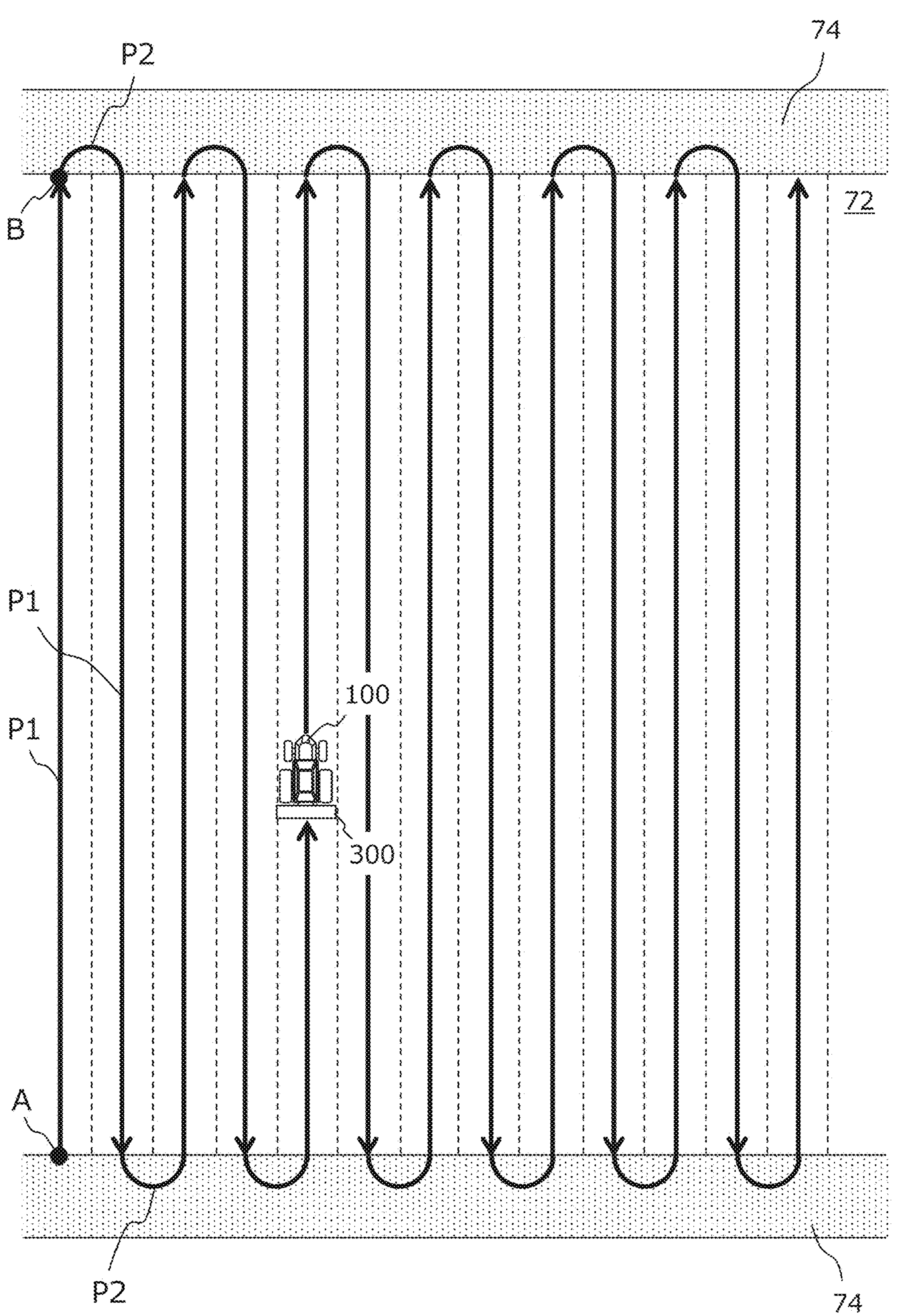
FIG. 7 is a diagram schematically showing an example of the work vehicle automatically traveling along a target path inside a field.

FIG. 7 is a diagram schematically showing an example of the work vehicle 100 automatically traveling along a target path in a field. In this example, the field includes a work area 72, in which the work vehicle 100 performs work by using the implement 300, and headlands 74, which are located near outer edges of the field. The user may previously specify which regions of the field on the map would correspond to the work area 72 and the headlands 74. The target path in this example includes a plurality of main paths P1 parallel to each other and a plurality of turning paths P2 interconnecting the plurality of main paths P1. The main paths P1 are located in the work area 72, whereas the turning paths P2 are located in the headlands 74. Although each of the main paths P1 in FIG. 7 is illustrated as a linear path, each main path P1 may also include a curved portion(s). The main paths P1 may be automatically generated by, for example, the user performing a manipulation of designating two points in the vicinity of ends of the field (points A and B in FIG. 7) while looking at the map of the field displayed on the operational terminal 200 or the terminal device 400. In this case, the plurality of main paths P1 are set to be parallel to a line segment connecting the point A and the point B designated by the user, the main paths P1 are connected to each other with the turning paths P2, and thus the target path inside the field is generated. Broken lines in FIG. 7 depict the working breadth of the implement 300. The working breadth is previously set and recorded in the storage 170. The working breadth may be set and recorded by the user manipulating the operational terminal 200 or the terminal device 400. Alternatively, the working breadth may be automatically recognized and recorded when the implement 300 is connected to the work vehicle 100. The interval between the plurality of main paths P1 may be set so as to be matched to the working breadth. The target path may be generated based on the manipulation made by the user, before self-driving is begun. The target path may be generated so as to cover the entire work area 72 in the field, for example. Along the target path shown in FIG. 7, the work vehicle 100 automatically travels while repeating a reciprocating motion from a beginning point of work to an ending point of work. Note that the target path shown in FIG. 7 is merely an example, and the target path may be arbitrarily determined.

Now, an example control by the controller 180 during self-driving inside the field will be described.

Figure 8:
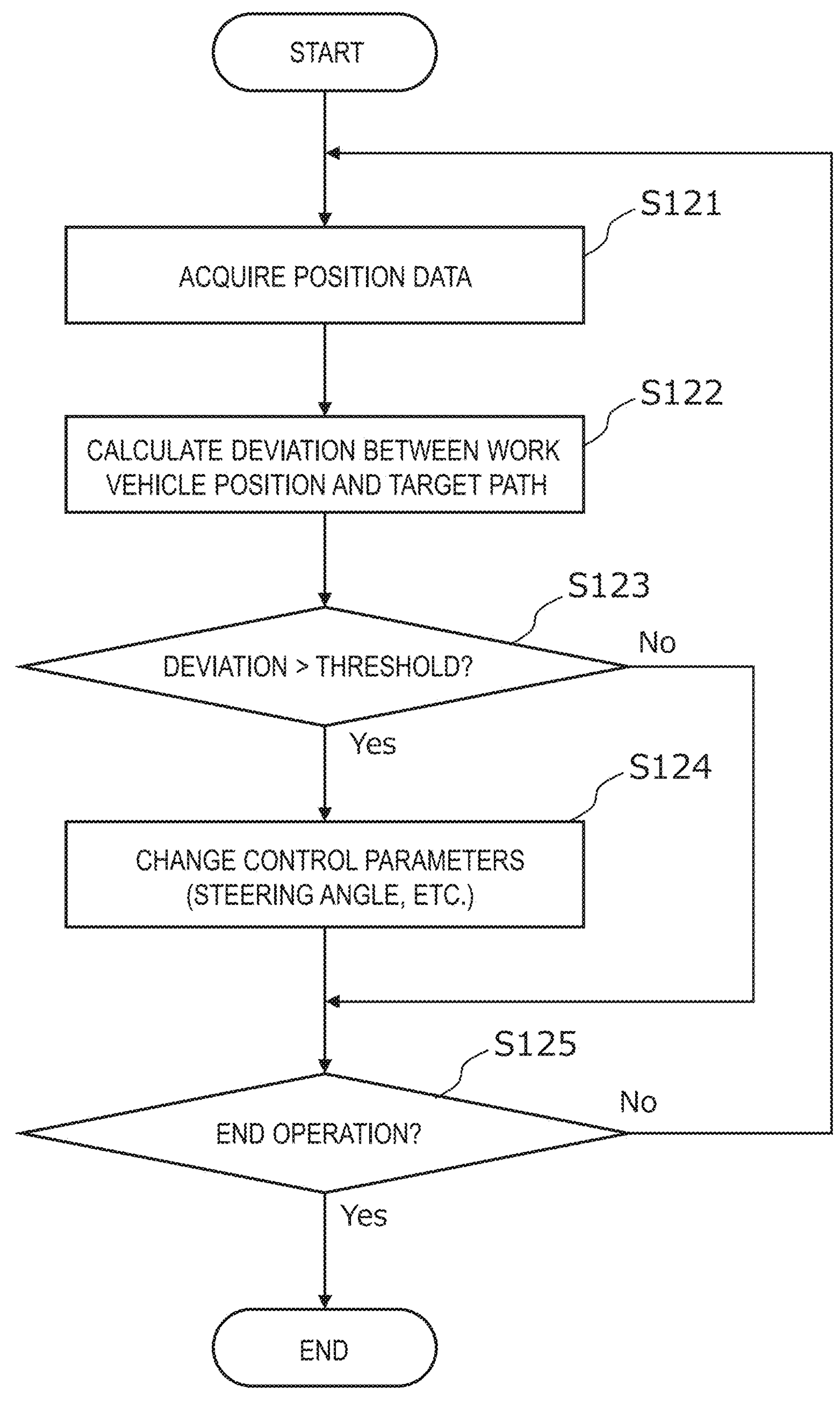
FIG. 8 is a flowchart showing an example operation of steering control during self-driving.

FIG. 8 is a flowchart showing an example operation of steering control to be performed by the controller 180 during self-driving. During travel of the work vehicle 100, the controller 180 performs automatic steering by performing the operation from steps S121 to S125 shown in FIG. 8. The speed of the work vehicle 100 will be maintained at a previously-set speed, for example. First, during travel of the work vehicle 100, the controller 180 acquires data representing the position of the work vehicle 100 that is generated by the GNSS unit 110 (step S121). Next, the controller 180 calculates a deviation between the position of the work vehicle 100 and the target path (step S122). The deviation represents the distance between the position of the work vehicle 100 and the target path at that moment. The controller 180 determines whether the calculated deviation in position exceeds the previously-set threshold or not (step S123). If the deviation exceeds the threshold, the controller 180 changes a control parameter of the steering device included in the drive device 240 so as to reduce the deviation, thus changing the steering angle (step S124). If the deviation does not exceed the threshold at step S123, the operation of step S124 is omitted. At the following step S125, the controller 180 determines whether a command to end the operation has been received or not. The command to end the operation may be given when the user has instructed that self-driving be suspended through remote operations, or when the work vehicle 100 has arrived at the destination, for example. If the command to end the operation has not been given, the control returns to step S121 and the controller 180 performs substantially the same operation based on a newly measured position of the work vehicle 100. The controller 180 repeats the operation from steps S121 to S125 until a command to end the operation is given. The aforementioned operation is executed by the ECUs 182 and 184 in the controller 180.

In the example shown in FIG. 8, the controller 180 controls the drive device 240 based only on the deviation between the position of the work vehicle 100 as identified by the GNSS unit 110 and the target path. Alternatively, a deviation in terms of directions may further be considered in the control. For example, when a directional deviation exceeds a previously-set threshold, where the directional deviation is an angle difference between the orientation of the work vehicle 100 as identified by the GNSS unit 110 and the direction of the target path, the controller 180 may change the control parameter of the steering device of the drive device 240 (e.g., steering angle) in accordance with the deviation.

Hereinafter, with reference to FIGS. 9A to 9D, an example of steering control by the controller 180 will be described more specifically.

Figure 9A:
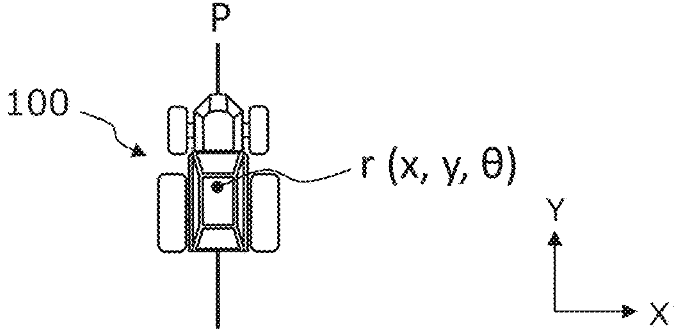
FIG. 9A is a diagram showing an example of the work vehicle traveling along a target path P.
Figure 9B:
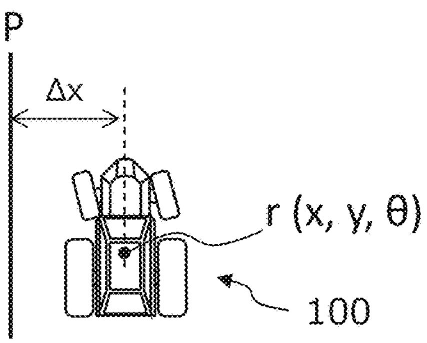
FIG. 9B is a diagram showing an example of the work vehicle at a position which is shifted rightward from the target path P.
Figure 9C:
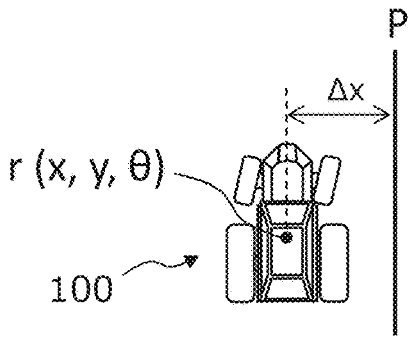
FIG. 9C is a diagram showing an example of the work vehicle at a position which is shifted leftward from the target path P.
Figure 9D:
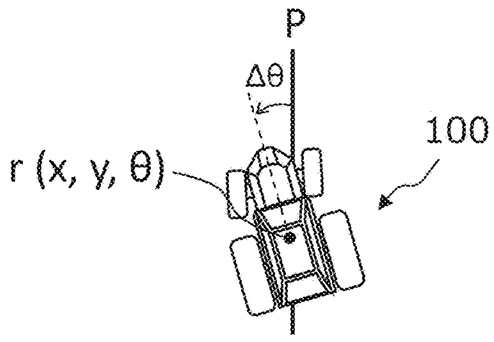
FIG. 9D is a diagram showing an example of the work vehicle oriented in an inclined direction with respect to the target path P.

FIG. 9A is a diagram showing an example of the work vehicle 100 traveling along a target path P. FIG. 9B is a diagram showing an example of the work vehicle 100 at a position which is shifted rightward from the target path P. FIG. 9C is a diagram showing an example of the work vehicle 100 at a position which is shifted leftward from the target path P. FIG. 9D is a diagram showing an example of the work vehicle 100 oriented in an inclined direction with respect to the target path P. In these figures, the pose, i.e., the position and orientation, of the work vehicle 100 as measured by the GNSS unit 110 is expressed as r (x, y, θ). Herein, (x, y) are coordinates representing the position of a reference point on the work vehicle 100 in an XY coordinate system, which is a two-dimensional coordinate system fixed to the globe. In the examples shown in FIGS. 9A to 9D, the reference point on the work vehicle 100 is at a position, on the cabin, where a GNSS antenna is disposed, but the reference point may be at any arbitrary position. θ is an angle representing the measured orientation of the work vehicle 100. Although the target path P is shown parallel to the Y axis in the examples illustrated in these figures, the target path P may not necessarily be parallel to the Y axis, in general.

As shown in FIG. 9A, in the case where the position and orientation of the work vehicle 100 are not deviated from the target path P, the controller 180 maintains the steering angle and speed of the work vehicle 100 without changing them.

As shown in FIG. 9B, when the position of the work vehicle 100 is shifted rightward from the target path P, the controller 180 changes the steering angle so that the traveling direction of the work vehicle 100 will be inclined leftward, thus bringing the work vehicle 100 closer to the path P. At this point, not only the steering angle but also the speed may be changed. The magnitude of the steering angle may be adjusted in accordance with the magnitude of a positional deviation Δx, for example.

As shown in FIG. 9C, when the position of the work vehicle 100 is shifted leftward from the target path P, the controller 180 changes the steering angle so that the traveling direction of the work vehicle 100 will be inclined rightward, thus bringing the work vehicle 100 closer to the path P. In this case, too, not only the steering angle but also the speed may be changed. The amount of change of the steering angle may be adjusted in accordance with the magnitude of the positional deviation Δx, for example.

As shown in FIG. 9D, in the case where the position of the work vehicle 100 is not considerably deviated from the target path P but its orientation is nonetheless different from the direction of the target path P, the controller 180 changes the steering angle so that the directional deviation Δθ will become smaller. In this case, too, not only the steering angle but also the speed may be changed. The magnitude of the steering angle may be adjusted in accordance with the magnitudes of the positional deviation Δx and the directional deviation Δθ, for example. For instance, the amount of change of the steering angle (which is in accordance with the directional deviation Δθ) may be increased as the absolute value of the positional deviation Δx decreases. When the positional deviation Δx has a large absolute value, the steering angle will be changed greatly in order for the work vehicle 100 to return to the path P, so that the directional deviation Δθ will inevitably have a large absolute value. Conversely, when the positional deviation Δx has a small absolute value, the directional deviation Δθ needs to become closer to zero. Therefore, it may be advantageous to introduce a relatively large weight (i.e., control gain) for the directional deviation Δθ in determining the steering angle.

For the steering control and speed control of the work vehicle 100, control techniques such as PID control or MPC (Model Predictive Control) may be applied. Applying these control techniques will make for smoothness of the control of bringing the work vehicle 100 closer to the target path P.

Note that, when an obstacle is detected by one or more obstacle sensors 130 during travel, the controller 180 halts the work vehicle 100. At this point, the controller 180 may cause the buzzer 220 to present an alarm sound or may transmit an alert signal to the terminal device 400. In the case where the obstacle is avoidable, the controller 180 may control the drive device 240 such that the obstacle is avoided.

The work vehicle 100 according to the present example embodiment can perform self-traveling outside a field as well as inside the field. Outside the field, the controller 180 is able to detect an object located at a relatively distant position from the work vehicle 100 (e.g., another vehicle, a pedestrian, etc.) based on data output from the cameras 120 or the LiDAR sensor 140. The controller 180 generates a local path such that the local path avoids the detected object, and performs speed control and steering control along the local path. In this manner, self-traveling on a road outside the field can be realized.

Figure 10:
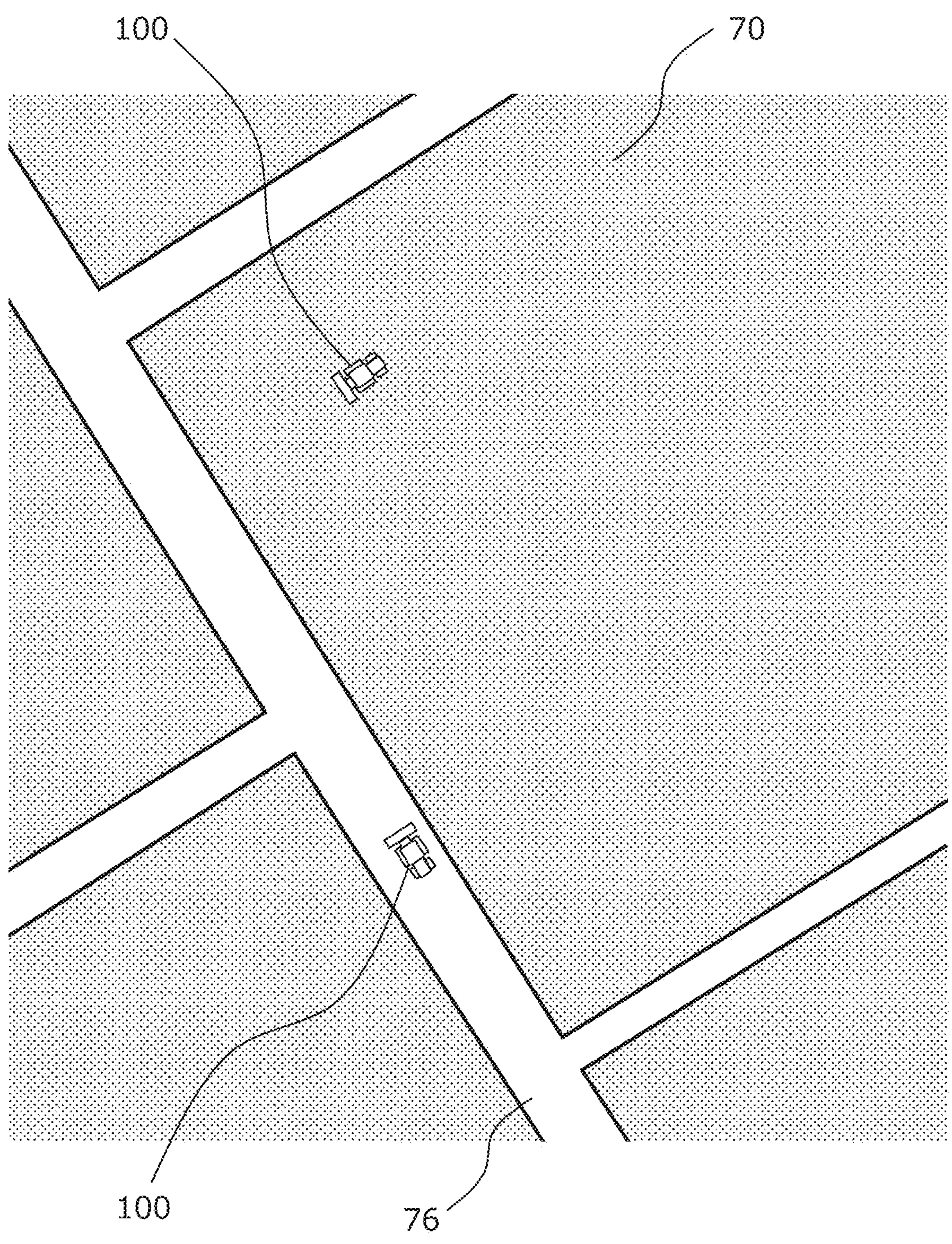
FIG. 10 is a diagram schematically showing an example of state where a plurality of the work vehicles perform self-traveling inside a field and on a road outside the field.

As described above, the work vehicle 100 according to the present example embodiment can automatically travel inside the field and outside the field in an unmanned manner. FIG. 10 is a diagram schematically showing an example of state where a plurality of the work vehicles 100 are performing self-traveling inside a field 70 and on a road 76 outside the field 70. In the storage 170, an environment map of a region including a plurality of fields and roads around the fields, and a target path, are recorded. The environment map and the target path may be generated by the management device 600 or the ECU 185. In the case of traveling on a road, the work vehicle 100 travels along the target path while sensing the surroundings thereof by use of the sensing devices such as the cameras 120 and the LiDAR sensor 140, with the implement 300 being raised. During travel, the controller 180 consecutively generates a local path and causes the work vehicle 100 to travel along the local path. This allows the work vehicle 100 to perform self-traveling while avoiding obstacles. During travel, the target path may be changed in accordance with the state.

The work vehicle 100 according to the present example embodiment automatically moves between the fields and performs agricultural work in each of the fields in accordance with a work plan and a target path created by the management device 600. The work plan includes information on one or more tasks of agricultural work to be performed by the work vehicle 100. For example, the work plan includes information on one or more tasks of agricultural work to be performed by the work vehicle 100 and on the field where each task is to be performed. The work plan may include information on a plurality of tasks of agricultural work to be performed by the work vehicle 100 over a plurality of working days and on the field where each task of agricultural work is to be performed. More specifically, the work plan may be a database including information on a work schedule indicating which agricultural machine is to perform which task of agricultural work in which field at which point of time for each working day. Hereinafter, an example case where the work plan is data of such a work schedule will be described. The work plan may be created by the processor 660 of the management device 600 based on information input by the user to the terminal device 400. Hereinafter, an example of method for creating the work schedule will be described.

Figure 11:
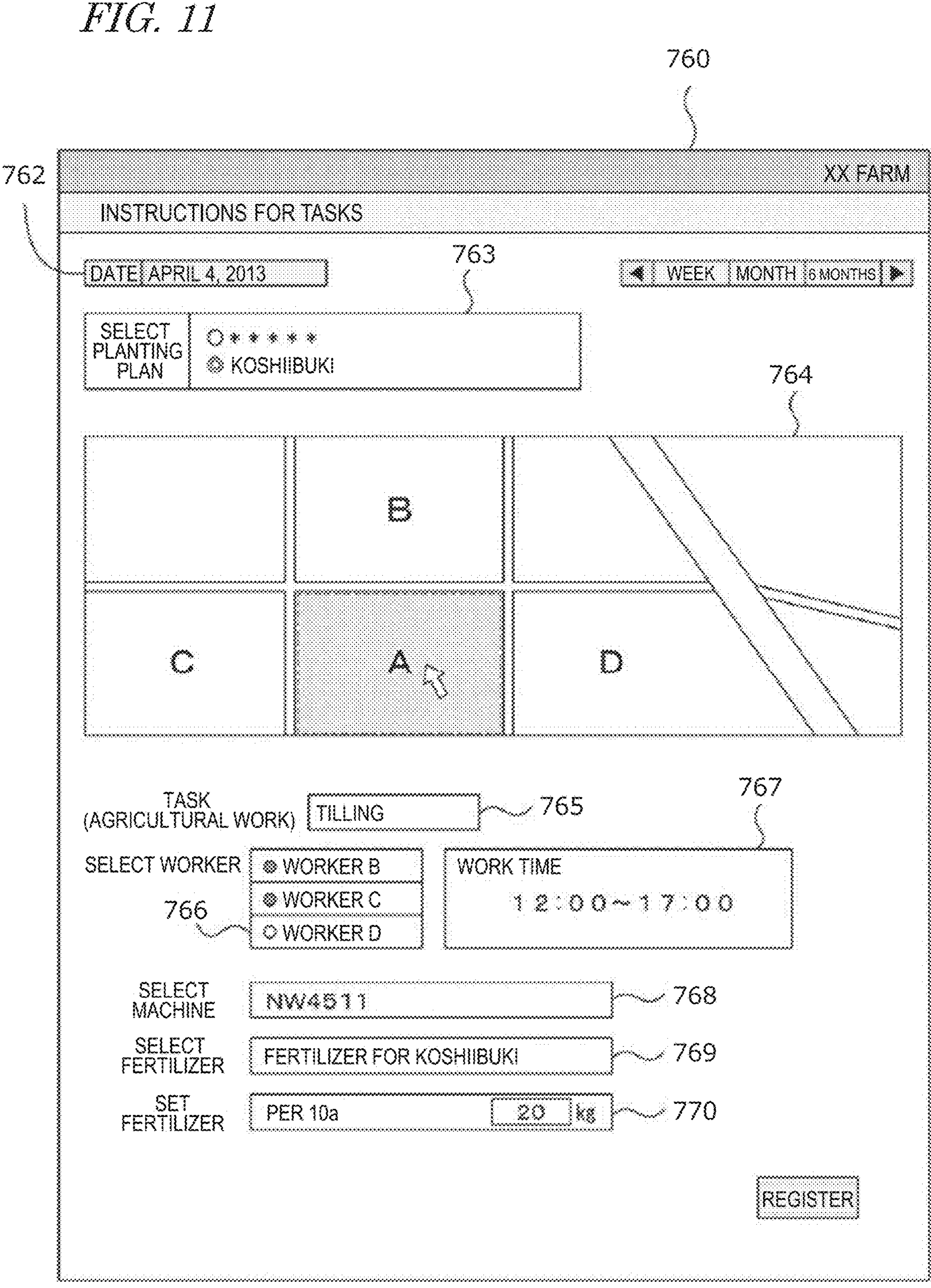
FIG. 11 is a diagram showing an example of setting screen displayed on the terminal device.

FIG. 11 is a diagram showing an example of setting screen 760 displayed on the display device 430 of the terminal device 400. In response to a manipulation performed by the user by use of the input device 420, the processor 460 of the terminal device 400 activates application software for schedule creation to cause the display device 430 to display the setting screen 760 as shown in FIG. 11. The user can input information necessary to create a work schedule on the setting screen 760.

FIG. 11 shows an example of the setting screen 760 in the case where tilling accompanied by spraying of a fertilizer is to be performed as the agricultural work in a field for rice farming. The setting screen 760 is not limited to the one shown in the figure, and may be changed when necessary. The setting screen 760 in the example of FIG. 11 includes a date setter 762, a planting plan selector 763, a field selector 764, a work selector 765, a worker selector 766, a time setter 767, a machine selector 768, a fertilizer selector 769, and a spray amount setter 770. The date setter 762 displays a date input by the input device 420. The input date is set as the day when the agricultural work is to be performed.

The planting plan selector 763 displays a list of names of planting plans created previously. The user can select a desired planting plan from the list. The planting plan is created previously for each of types or each of breeds of the crop, and is recorded in the storage 650 of the management device 600. The planting plan is a plan regarding which crop is to be planted (seeded) in which field. The planting plan is created by, for example, a manager managing a plurality of fields before the crop is planted in one of the fields. In the example of FIG. 11, a planting plan for rice breed "KOSHIIBUKI" is selected. In this case, the contents set by the setting screen 760 are associated with the planting plan of "KOSHIIBUKI".

The field selector 764 displays the fields in the map. The user can select any field from the fields displayed. In the example of FIG. 11, an area indicating "field A" is selected. In this case, the selected "field A" is set as the field where the agricultural work is to be performed.

The work selector 765 displays a plurality of types of agricultural work necessary to grow the selected crop. The user can select one type of agricultural work from the plurality of types of agricultural work. In the example of FIG. 11, "tilling" is selected from the plurality of types of agricultural work. In this case, the selected "tilling" is set as the agricultural work to be performed.

The worker selector 766 displays workers registered previously. The user can select one or more workers from the plurality of workers displayed. In the example of FIG. 11, "worker B" and "worker C" are selected from the plurality of workers. In this case the "worker B" and the "worker C" selected are set as the workers in charge of performing or managing the agricultural work. In the present example embodiment, the agricultural machine performs agricultural work automatically. Therefore, the workers do not need to actually perform the agricultural work, and may merely remotely monitor the agricultural work performed by the agricultural machine.

The time setter 767 displays a work time period input by the input device 420. The work time period is specified by a point of time to begin the agricultural work and a point of time to end the agricultural work. The input work time period is set as the time period in which the agricultural work is scheduled to be performed.

The machine selector 768 is used to set the agricultural machine to be used for the agricultural work. The machine selector 768 may display, for example, the types of models of the agricultural machines previously registered by the management device 600 and the types, models, etc., of usable implements. The user can select a specific machine from the machines displayed. In the example of FIG. 11, the implement of model "NW4511" is selected. In this case, this implement is set as the machine to be used for the agricultural work.

The fertilizer selector 769 displays names of a plurality of fertilizers registered by the management device 600 previously. The user can select a specific fertilizer from the plurality of fertilizers displayed. The selected fertilizer is set as the fertilizer to be used for the agricultural work.

The spray amount setter 770 displays a numerical value input by the input device 420. The input numerical value is set as the spray amount.

When the planting plan, the field, the agricultural work, the worker, the work time period, the fertilizer and the spray amount are input to the setting screen 760 and "register" is selected, the communication device 490 of the terminal device 400 transmits the input information to the management device 600. The processor 660 of the management device 600 causes the storage 650 to store the received information. Based on the received information, the processor 660 creates a schedule of the agricultural work to be performed by each agricultural machine and causes the storage 650 to store the schedule.

Note that the information on the agricultural work to be managed by the managing device 600 is not limited to the above-described information. For example, the type and the spray amount of the agricultural chemical to be used in the field may be set by the setting screen 760. Information on agricultural work other than the types of agricultural work shown in FIG. 11 may be set by the setting screen 760.

Figures 12, 13:
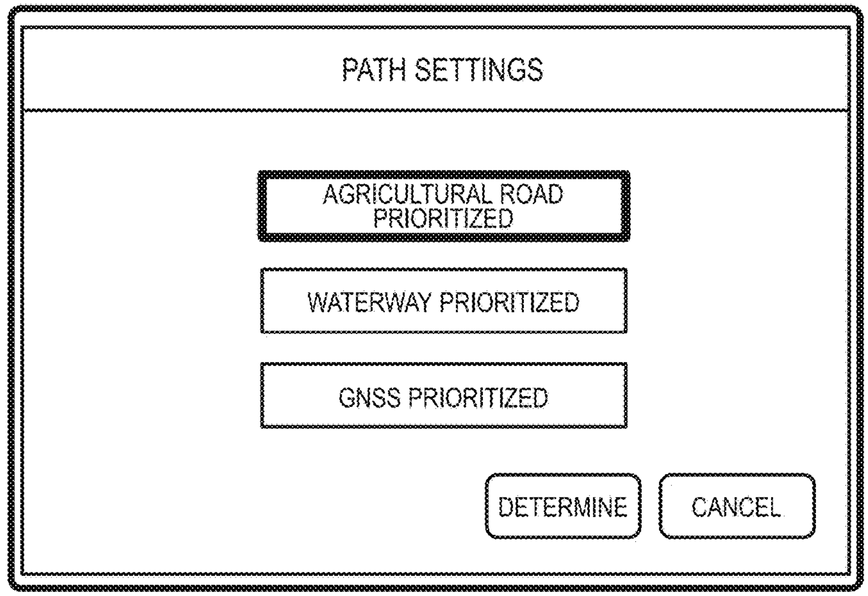
FIG. 12 is a table showing an example of schedule of agricultural work created by the management device.
FIG. 13 is a diagram showing an example of GUI displayed on a display device.

FIG. 12 is a table showing an example of schedule (i.e., work plan) of agricultural work created by the management device 600. The schedule in this example includes information representing the date and time of the agricultural work, the field for the agricultural work, the contents of the work, and the implement to be used, for each of the registered agricultural machines. The schedule may include, in addition to the information shown in FIG. 12, other information in accordance with the contents of work, for example, information on the types of agricultural chemicals or the spray amounts of the agricultural chemicals. The processor 660 of the management device 600 instructs the work vehicle 100 to perform the agricultural work in accordance with such a schedule. The schedule may be downloaded by the controller 180 of the work vehicle 100 and may also stored in the storage 170. In this case, the controller 180 may spontaneously begin the operation in accordance with the schedule stored in the storage 170.

In the present example embodiment, the work plan is created by the management device 600. The work plan may be created by another device. For example, the processor 460 of the terminal device 400 or the controller 180 of the work vehicle 100 may have a function of creating or updating the work plan.

Now, an operation of path planning according to the present example embodiment will be described in more detail.

The management device 600 and the control system 160 of the work vehicle 100 according to the present example embodiment cooperate with each other to function as a path planning system for the work vehicle 100. The storage 650 stores a map including a plurality of fields and roads around the fields. The map includes attribute information representing, for each of the roads, at least one of whether the road is an agricultural road, whether the road is a road along a specific feature such as a waterway, or whether the road is a road where satellite signals from GNSS satellites can be properly received. The processor 660 of the management device 600 is configured or programmed to generate a path for the work vehicle 100 on the map. The processor 660 may be configured or programmed to generate a path for the work vehicle 100 outside the fields in accordance with the schedule of the agricultural work previously created. For generation of a path toward a field or a path from a field toward another site, the processor 660 generates at least one of a path including an agricultural road with priority, a path including a road along a specific feature with priority, or a path including, with priority, a road where satellite signals can be properly received. The processor generates at least one of these paths as the path for the work vehicle 100 based on the attribute information on each road. As a result, a path suitable to self-traveling of the work vehicle 100 can be generated. Note that a portion of, or the entirety of, a path generation process, which is to be performed by the management device 600, may be performed by the ECU 185 of the controller 180 of the work vehicle 100. In this case, a combination of the ECU 185 and the management device 600 functions as a processor that generates a path for the work vehicle 100. Alternatively, a portion of, or the entirety of, the path generation process, which is to be performed by the management device 600, may be performed by the operational terminal 200 of the work vehicle 100. In this case, a combination of the operational terminal 200 and the management device 600 functions as a processor that generates a path for the work vehicle 100.

It is preferred that the work vehicle 100 performing self-traveling travels on an agricultural road where the amount of traffic is small with priority over a general road where many general vehicles and many people come and go. For performing self-traveling outside the fields, the work vehicle 100 may be configured or programmed to travel while performing localization based on the data output from at least either one of the LiDAR sensor 140 or the cameras 120. In this case, it is preferred that the work vehicle 100 travels, with priority, on a road along a specific feature (e.g., a waterway, a river, a row of trees, a building or the like) which may be a landmark for the localization. In addition, in the case where the work vehicle 100 also uses the data output from the GNSS unit 110 for the localization, it is preferred that the work vehicle 100 travels, with priority, on a road where satellite signals from GNSS satellites can be properly received.

For the above-described reason, in the present example embodiment, the management device 600 generates at least one of a path including an agricultural road with priority, a path including a road along a specific feature with priority, or a path including, with priority, a road where satellite signals can be properly received. The management device 600 generates at least one of these paths as the path for the work vehicle 100 based on the attribute information on each of the roads on the map. As a result, a path more suitable to self-traveling can be generated than in the case where merely a path providing a minimum moving distance or moving time is selected.

The management device 600 may have a function of generating all of a path including an agricultural road with priority, a path including a road along a specific feature with priority, and a path including, with priority, a road where satellite signals can be properly received, or may generate only one or two among these paths. Alternatively, the management device 600 may be configured or programmed to generate a path including, with priority, all of an agricultural road, a road along a specific feature and a road where satellite signals can be properly received. The management device 600 may determine one path selected based on a predetermined criterion from a plurality of generated paths, as the path for the work vehicle 100. For example, the management device 600 may cause the display device 430 of the terminal device 400 to display the plurality of the generated paths and determine a path selected from these paths by the user as the path for the work vehicle 100.

The management device 600 may generate a path in a mode selected by the user from a plurality of modes including at least one of a first mode to select an agricultural road with priority to generate a path, a second mode to select a road along a specific feature with priority to generate a path, or a third mode to select a road where satellite signals can be properly received to generate a path. The plurality of modes may further include a fourth mode to generate a path such that the moving time or the moving distance of the work vehicle 100 is shortest. The management device 600 may cause the display device 430 of the terminal device 400 to display a graphical user interface (GUI) to allow the user to select one mode from the plurality of modes, and generate a path in the selected mode.

FIG. 13 is a diagram showing an example of GUI displayed on the display device 430. The GUI in this example allows the user to select one of three modes of "agricultural road prioritized", "waterway prioritized" and "GNSS prioritized". In the example shown in FIG. 13, "agricultural road prioritized" corresponds to the first mode, "waterway prioritized" corresponds to the second mode, and "GNSS prioritized" corresponds to the third mode. FIG. 13 shows a state where "agricultural road prioritized" is selected as an example.

The management device 600 automatically generates a path from a departure point to a target point of self-traveling of the work vehicle 100. The departure point and the target point may be set by the user previously, or may be set by the management device 600 in accordance with a work plan created previously. The management device 600 generates a path from the departure point to the target point at a predetermined timing after the departure point and the target point are set but before the self-traveling begins.

In the case where "agricultural road prioritized" is selected on the GUI shown in FIG. 13, the management device 600 selects an agricultural road with priority to generate a path. By contrast, in the case where "waterway prioritized" is selected, the management device 600 selects a road along a waterway with priority to generate a path. The waterway is an example of specific feature that functions as a landmark for localization performed by use of the LiDAR sensor 140 or the cameras 120. A mode to generate a path with priority being put on a road along another type of feature, in addition to the waterway or instead of the waterway, may be provided. In the case where "GNSS prioritized" is selected, the management device 600 generates a path with propriety being put on a road where satellite signals from GNSS satellites can be properly received.

Hereinafter, an example of path generation process performed by the management device 600 will be described with reference to FIG. 14. It is assumed that the departure point and the target point of self-traveling of the work vehicle 100 are already set.

Figure 14:
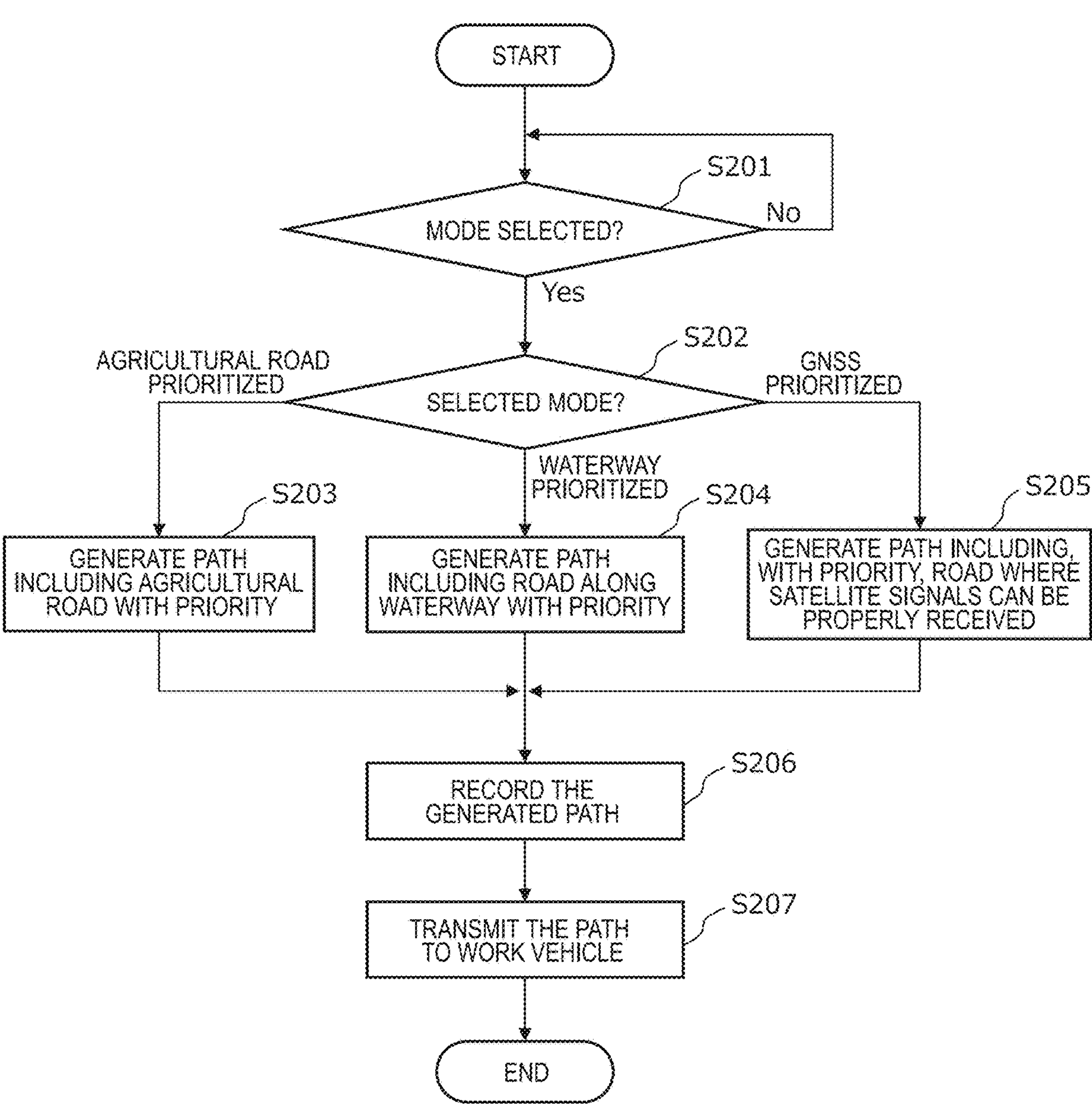
FIG. 14 is a flowchart showing a path generation process in the example shown in FIG. 13.

FIG. 14 is a flowchart showing a path generation process performed by the management device 600 in the example shown in FIG. 13. In this example, first, in step S201, the management device 600 determines whether either one of the modes has been selected by the user. When the user selects either one of "agricultural road prioritized", "waterway prioritized" or "GNSS prioritized" shown in FIG. 13 and presses "determine", the process advances to step S202. In step S202, the management device 600 identifies the selected mode. In the case where "agricultural road prioritized" is selected, the process advances to step S203. In the case where "waterway prioritized" is selected, the process advances to step S204. In the case where "GNSS prioritized" is selected, the process advances to step S205. In step S203, the management device 600 generates a path including an agricultural road with priority, as the path for the work vehicle 100. In step S204, the management device 600 generates a path including a road along a waterway with priority, as the path for the work vehicle 100. In step S205, the management device 600 generates a path including, with priority, a road where satellite signals can be properly received, as the path for the work vehicle 100. Specific examples of the processes of steps S203, S204 and S205 will be described below. Upon generation of the path, the management device 600 advances to step S206 to cause the storage 650 to store the generated path. In step S207, the management device 600 transmits the generated path to the work vehicle 100 at a predetermined timing. The work vehicle 100 performs self-traveling in accordance with the generated path and the work schedule previously acquired.

In the example shown in FIG. 13 and FIG. 14, the management device 600 generates a path in one mode selected by the user from the three modes of "agricultural road prioritized", "waterway prioritized" and "GNSS prioritized". Alternatively, the system may be configured or programmed to allow the user to select a mode for a desired priority item from a larger number of modes.

Figure 15:
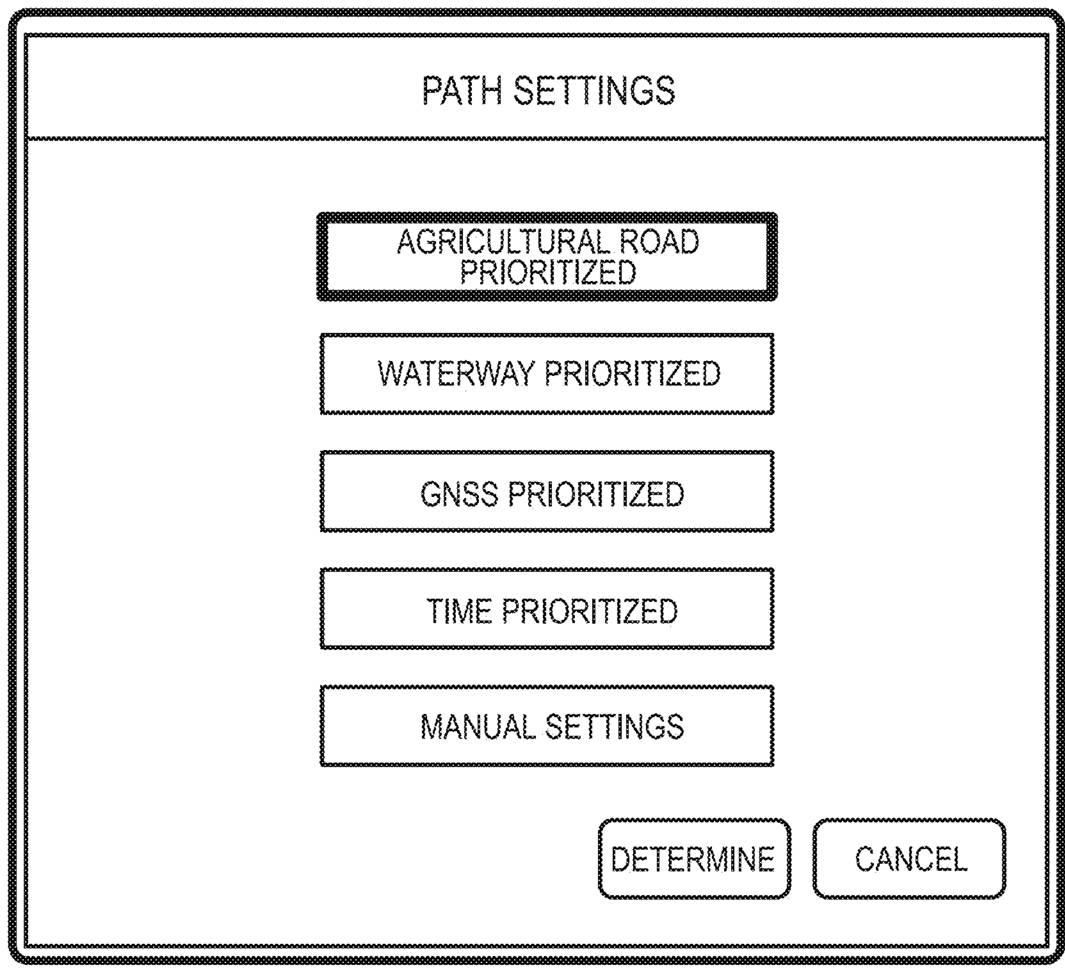
FIG. 15 is a diagram showing another example of GUI displayed on the display device.

FIG. 15 is a diagram showing another example of GUI displayed on the display device 430. In this example, the modes of "time prioritized" and "manual settings" are added to "agricultural road prioritized", "waterway prioritized" and "GNSS prioritized". The user can select one mode from these five modes. In this example, "agricultural road prioritized" corresponds to the first mode, "waterway prioritized" corresponds to the second mode, "GNSS prioritized" corresponds to the third mode, and "time prioritized" corresponds to a fourth mode. "Manual settings" is a mode in which the user sets a path manually while looking at the map displayed.

The path generation process in the case where "agricultural road prioritized", "waterway prioritized" or "GNSS prioritized" is selected is as described above. In the case where "time prioritized" is selected, the management device 600 generates a path connecting the departure point and the target point to each other such that the moving time of the work vehicle 100 is shortest. In the case where "manual settings" is selected, the management device 600 causes the display device 430 to display a map of a region where the work vehicle 100 is to travel, and allows the user to select a path. Hereinafter, a specific example of the operation in each of the modes will be described.

Figure 16:
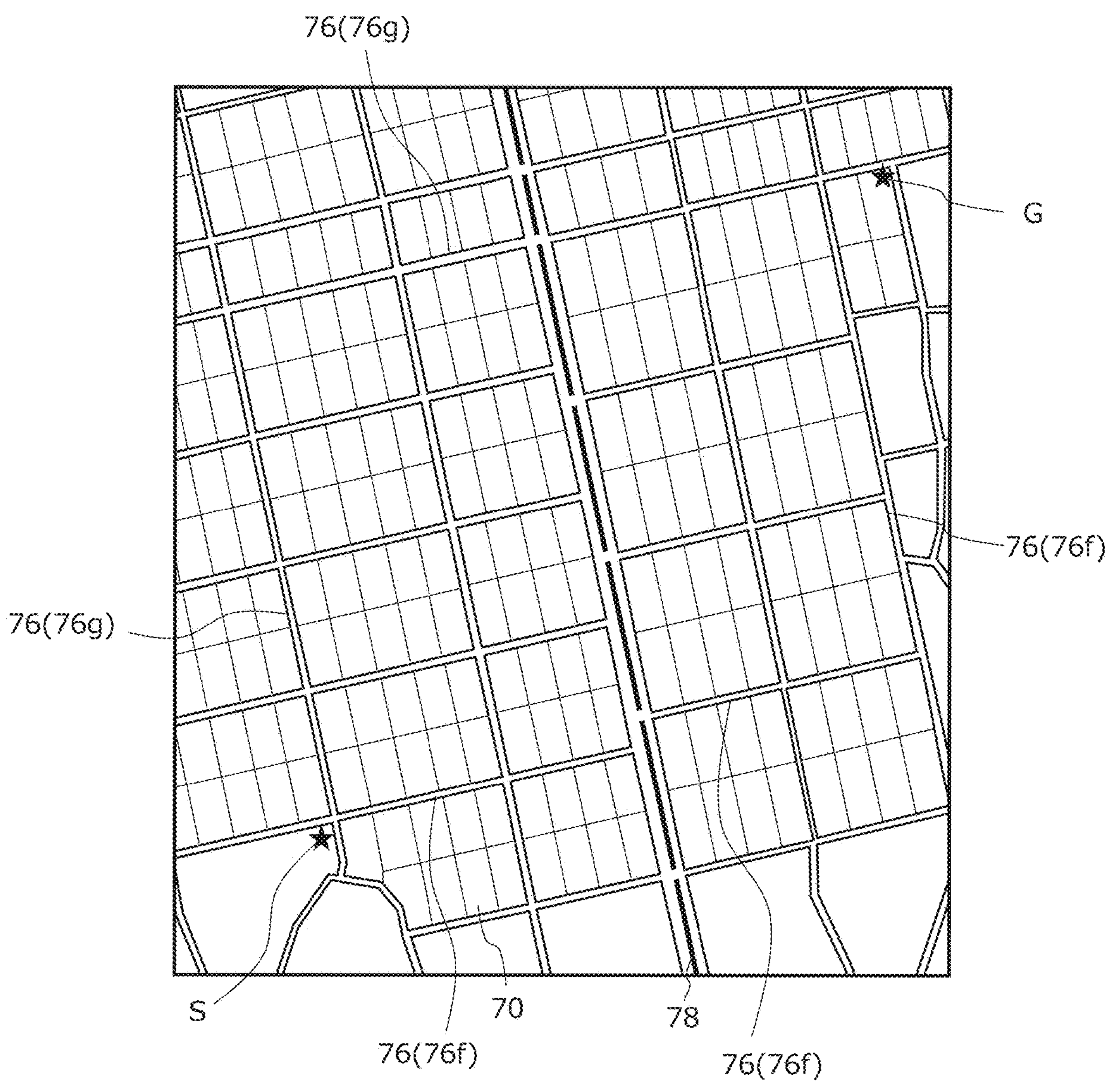
FIG. 16 is a diagram showing an example of map of a region where the work vehicle is to travel.

FIG. 16 is a diagram showing an example of map of the region where the work vehicle 100 is to travel. Such a map may be displayed on the display device 430. This map is a two-dimensional digital map, and is generated by the management device 600 or another device. The map as shown in FIG. 16 may be created for the entirety of the region where the work vehicle 100 may travel. Note that the map shown in FIG. 16 is a two-dimensional map, but a three-dimensional map may be used for the path planning.

The map shown in FIG. 16 includes information on a position (e.g., the latitude and the longitude) of each of various points in a plurality of fields 70 where the work vehicle 100 is to perform agricultural work, in roads 76 around the fields 70, and in a feature such as a waterway 78 or the like. The map further includes attribute information representing, for each of the roads, at least one of whether the road 76 is an agricultural road, whether the road 76 is a road along a specific feature such as the waterway 78, or whether the road 76 is a road where satellite signals from GNSS satellites can be properly received. In addition to such attribute information, attribute information representing the width of each road 76 at each of various points may be included in the map. Based on the width of each road 76 at each point, the management device 600 can determine whether the work vehicle 100 can pass along the road 76. The map may include attribute information representing whether the road 76 is a general road instead of the agricultural road. Based on such attribute information, the management device 600 can generate a path along which a general road is avoided.

The map shown in FIG. 16 shows a departure point S and a target point G of self-traveling of the work vehicle 100 with star marks "★". The departure point S and the target point G may be set by, for example, the user. Alternatively, the management device 600 may set the departure point S and the target point G in accordance the work schedule on each of working days. The work schedule on each working day is previously generated by the management device 600 as described above with reference to FIG. 12, and stored in the storage 650. In addition to the departure point S and the target point G, one or more waypoints may be set. For the departure point s, for the target point G and for each of the waypoints, both of, or one of, the time when the work vehicle 100 is scheduled to arrive and the time when work vehicle 100 is scheduled to depart may be recorded.

In the case "manual settings" is selected, the user can designate a desired path by, for example, a manipulation of designating a plurality a of waypoints on, for example, intersection on the displayed map. In the case where a mode other than "manual settings" is selected, the management device 600 automatically generates a path reaching the target point G from the departure point S by a predetermined algorithm corresponding to the selected mode.

Figure 17:
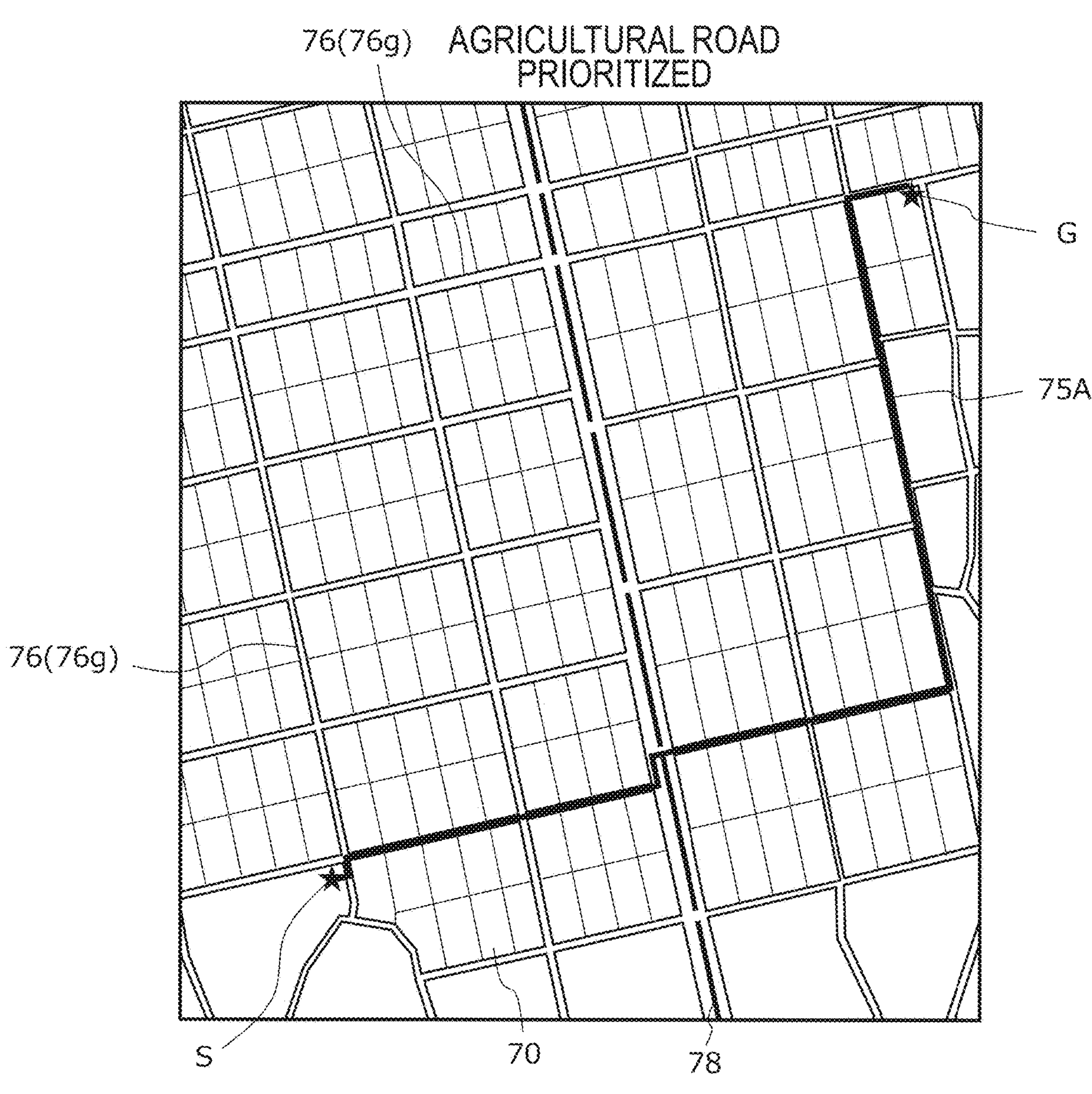
FIG. 17 is a diagram showing an example of path generated in the case where an "agricultural road prioritized" mode is selected.

FIG. 17 is a diagram showing an example of path generated in the case where the "agricultural road prioritized" mode is selected. In this mode, the management device 600 determines, as the path for the work vehicle 100, a path 75A having a relatively high ratio of agricultural roads and providing a relatively short moving distance or moving time, among a plurality of paths reaching the target point G from the departure point S. For example, the management device 600 may determine, as the path for the work vehicle 100, a path of which the ratio of the agricultural roads with respect to the entirety of the path is higher than a predetermined value (e.g., about 80%, about 90%, or the like) and by which the moving distance or moving time is shortest. In the "agricultural road prioritized" mode, in the case where, as in the example of FIG. 16, a plurality of path candidates reaching the target point G from the departure point S include a path candidate passing along an agricultural road 76*f* and a path candidate passing along a general road 76*g*, the management device 600 selects the path candidate passing along the agricultural road 76*f* with priority over the path candidate passing along the general road 76*g*. Alternatively, the management device 600 may determine, as the path for the work vehicle 100, a path of which the ratio of the agricultural roads with respect to the entirety of the path is higher than a predetermined value and which matches the schedule of the agricultural work on that working day. For example, the management device 600 may determine, as the path for the work vehicle 100, a path of which the ratio of the agricultural roads with respect to the entirety of the path is higher than a predetermined value and by which a final task of agricultural work on that working day is completed before the time when the agricultural work is to end, in accordance with the schedule. Alternatively, in the case where the work vehicle 100 is to perform the agricultural work in a plurality of fields after departing from the departure point S before reaching the target point G, the management device 600 may generate, based on the schedule, a path of which the ratio of the agricultural roads is higher than a predetermined value and by which the work vehicle 100 can arrive at each of the fields before the time when the respective task of agricultural work is to begin. In addition to the condition that the ratio of the agricultural roads is higher than a predetermined value, a condition that the ratio of the general roads is no higher than a reference value may be provided.

Figure 18:
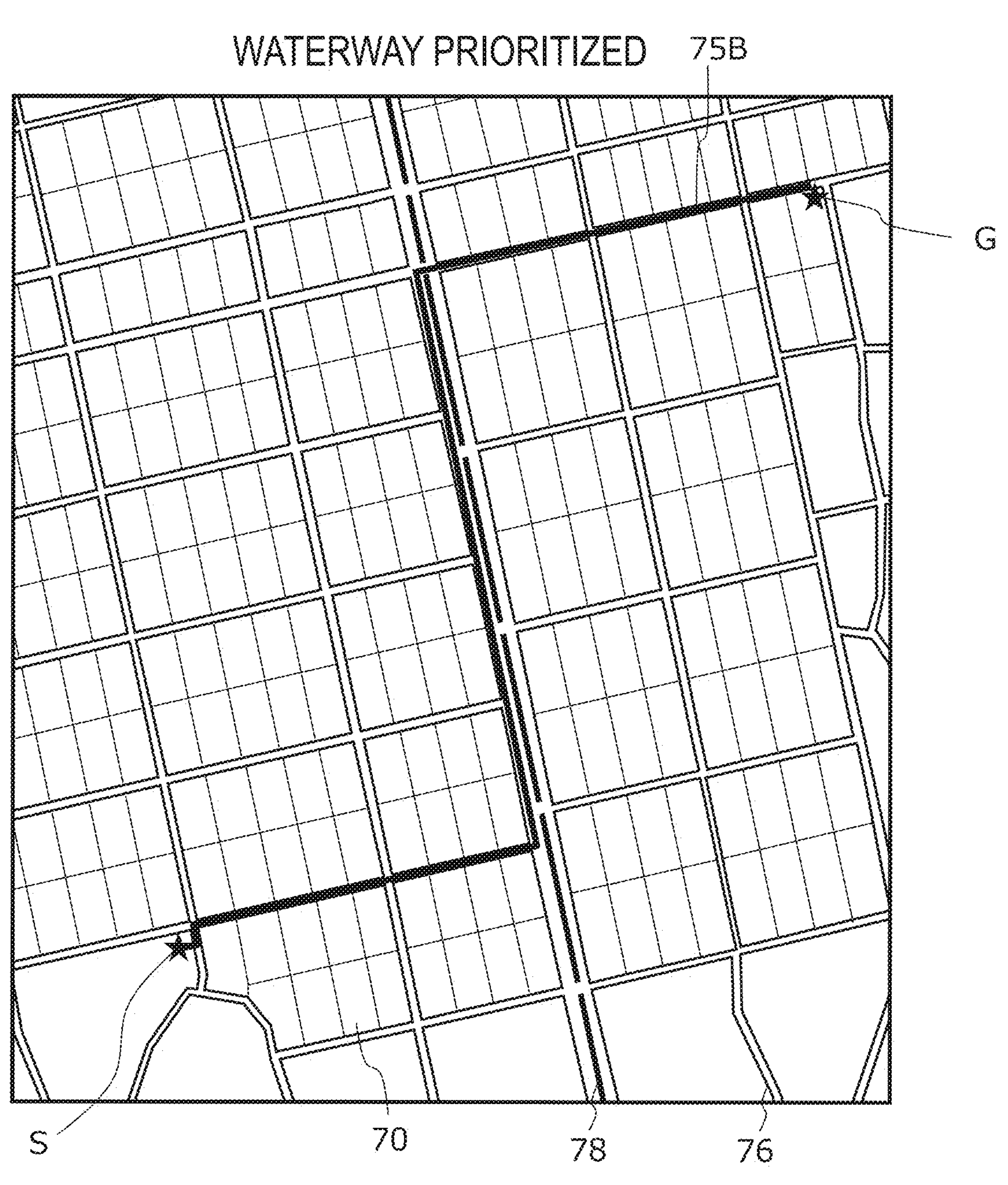
FIG. 18 is a diagram showing an example of path generated in the case where a "waterway prioritized" mode is selected.

FIG. 18 is a diagram showing an example of path generated in the case where the "waterway prioritized" mode is selected. In this mode, the management device 600 determines, as the path for the work vehicle 100, a path 75B having a relatively high ratio of roads along the waterway 78 and providing a relatively short moving distance or moving time, among a plurality of paths reaching the target point G from the departure point S. The waterway 78 may function as a landmark for localization performed by use of the LiDAR sensor 140 or the cameras 120. The road along the waterway 78 is prioritized, so that a path by which the error for the localization is small can be generated. Note that a feature other than the waterway 78 (e.g., a river, a row of trees, grass, a building or the like) may be used as a landmark for the localization. In this case, the management device 600 may determine a path with priority being put on roads along one or more types of features that may function as landmarks. The landmark is not limited to the waterway 78. In this mode, for example, the management device 600 may determine, as the path for the work vehicle 100, a path of which the ratio of the roads along a specific feature with respect to the entirety of the path is higher than a predetermined value (e.g., about 30%, about 50%, or the like) and by which the moving distance or moving time is shortest. Alternatively, the management device 600 may determine, as the path for the work vehicle 100, a path of which the ratio of the roads along a specific feature with respect to the entirety of the path is higher than a predetermined value and which matches the schedule of the agricultural work on that working day. For example, the management device 600 may determine, as the path for the work vehicle 100, a path of which the ratio of the roads along a specific feature is higher than a predetermined value and by which a final task of agricultural work on that working day is completed before the time when the agricultural work is to end, in accordance with the schedule. Alternatively, in the case where the work vehicle 100 is to perform the agricultural work in a plurality of fields after departing from the departure point S before reaching the target point G, the management device 600 may generate, as the path for the work vehicle 100, a path of which the ratio of the roads along a specific feature is higher than a predetermined value and by which the work vehicle 100 can arrive at each of the fields before the time when the respective task of agricultural work is to begin, based on the schedule.

Figure 19:
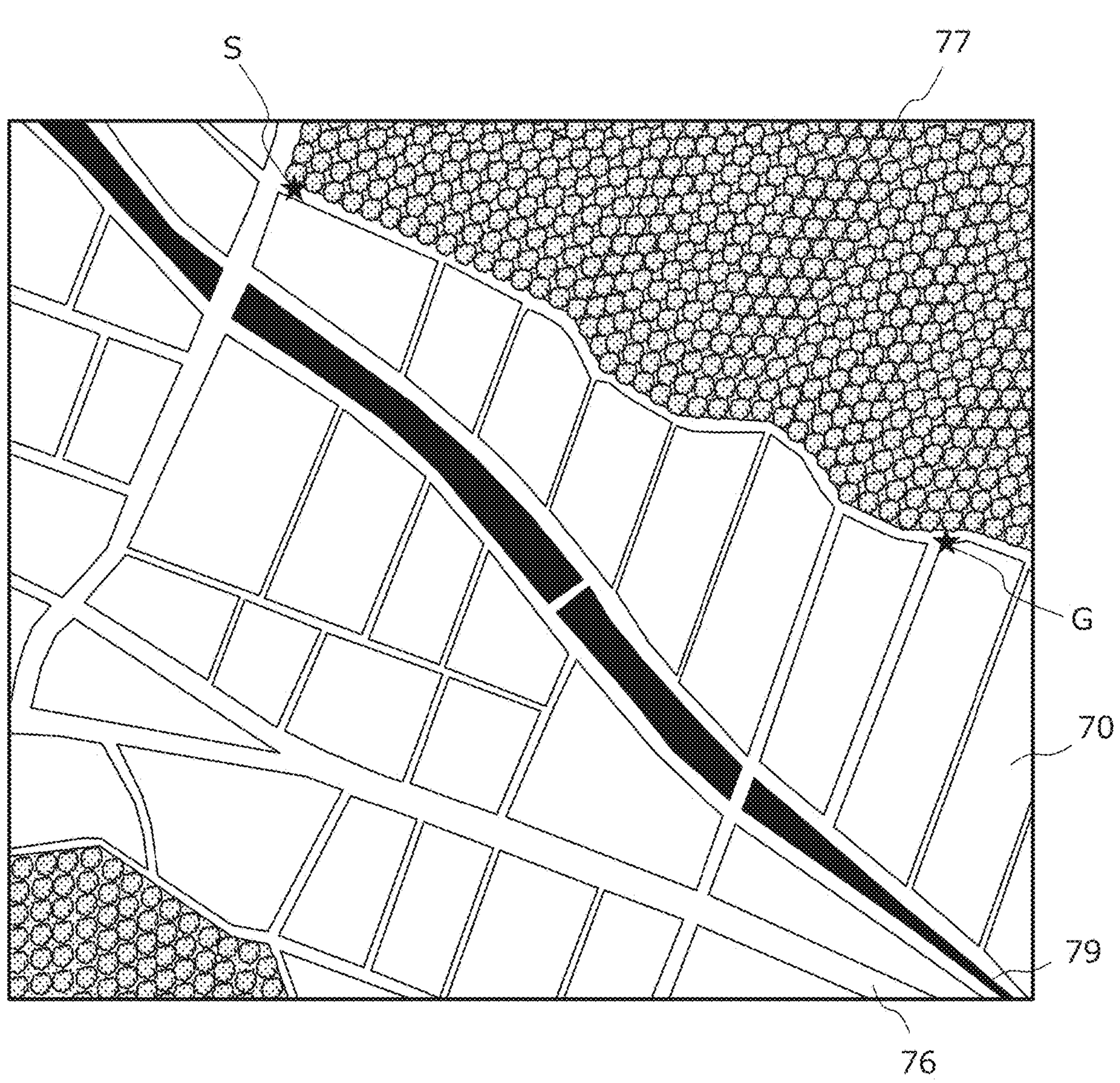
FIG. 19 is a diagram showing another example of map of a region where the work vehicle is to travel.

FIG. 19 is a diagram showing another example of map of a region where the work vehicle 100 is to travel. The map shown in FIG. 19 includes a forest or mountain including a plurality of trees 77 and a river 79 in addition to the plurality of fields 70 and the roads 76 around the fields 70. In this example, the departure point S and the target point G are set on a road adjacent to rows of the trees 77.

Figure 20:
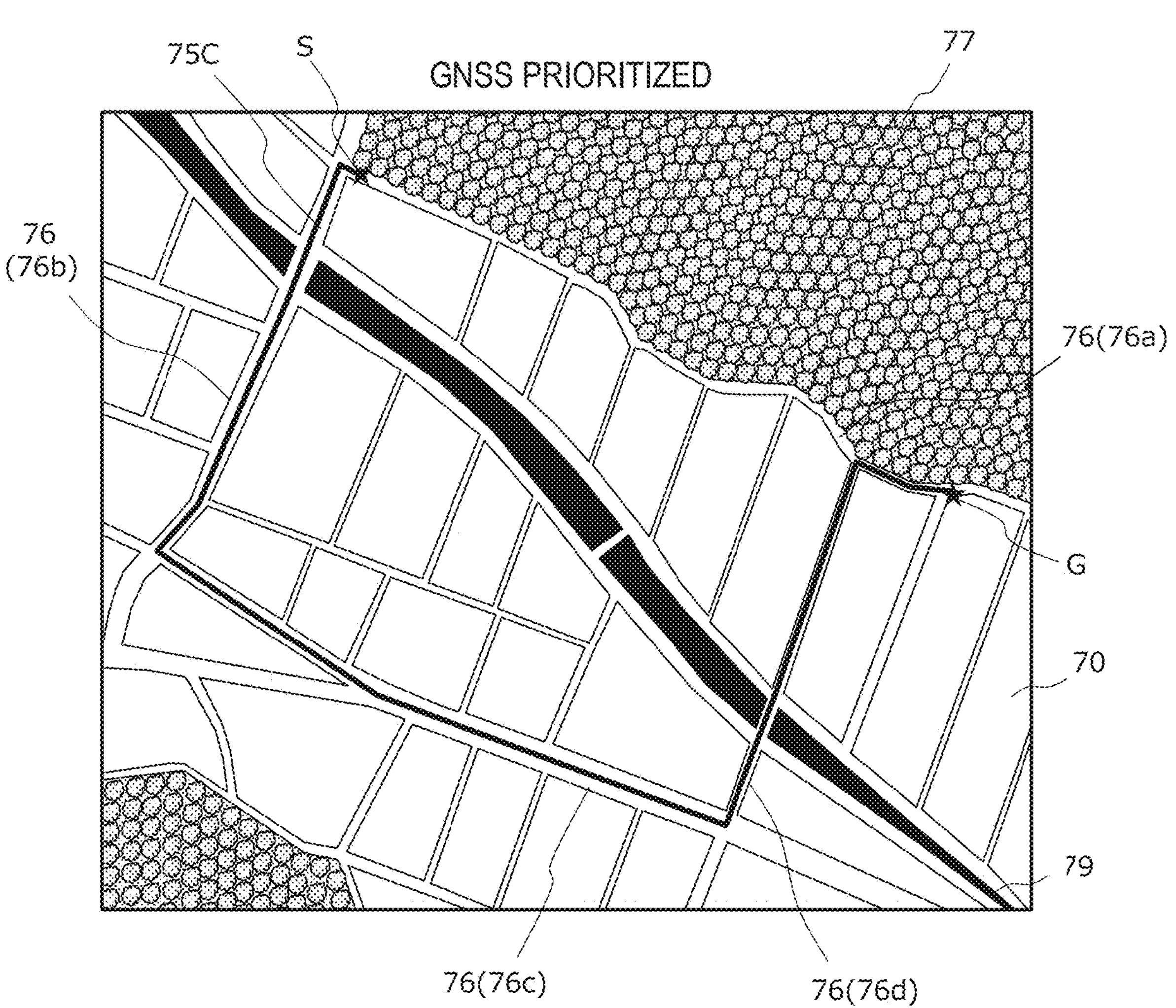
FIG. 20 is a diagram showing an example of path generated in the case where a "GNSS prioritized" mode is selected.

FIG. 20 is a diagram showing an example of path generated in the case where the "GNSS prioritized" mode is selected in the example shown in FIG. 19. In this mode, the management device 600 selects, with priority, a path 75C having a relatively high ratio of roads where satellite signals from GNSS satellites can be properly received, from a plurality of paths reaching the target point G from the departure point S. In the example shown in FIG. 20, on a path by which the work vehicle 100 can reach the target point G from the departure point S within the shortest time, radio waves from the GNSS satellites are partially blocked by the rows of trees growing thick in the vicinity of the work vehicle 100, the mountain and the like. This easily causes a reception failure of the satellite signals. Therefore, instead of such a path, the path 75C, where the reception strength of the satellite signals is stably high, is determined as the path for the work vehicle 100. Note that in the example shown in FIG. 20, it is assumed that the work vehicle 100 is not allowed to pass along a road on either side of the river 79. Therefore, the path 75C, which causes the work vehicle 100 to travel from the departure point S toward the target point G while crossing the river 79 and thus is relatively long, is generated. In the case where the work vehicle 100 is allowed to pass along the roads along the river 79, the management device 600 may generate a path to reach the target path G via these roads. Alternatively, the management device 600 may generate a path including, with priority, both of a road where satellite signals can be properly received and a road along a specific feature such as the river 79 or the waterway.

In the example shown in FIG. 20, the management device 600 may determine, as the path for the work vehicle 100, a path of which the ratio of the roads where satellite signals can be properly received is high and by which the moving distance is relatively short, among a plurality of paths reaching the target point G from the departure point S. For example, the management device 600 may determine, as the path for the work vehicle 100, a path of which the ratio of the roads where satellite signals can be properly received, with respect to the entirety of the path, is higher than a predetermined value (e.g., about 80%, about 90%, or the like) and by which the moving time is shortest. In the "GNSS prioritized" mode, for generation of a path reaching the target point G from the departure point s, the management device 600 generates a path with priority being put on a road extending to be away from the rows of trees, the mountain or the like by a predetermined distance or longer or a road located away from the rows of trees, the mountain or the like by the predetermined distance or longer, over another road located away from the rows of trees, the mountain or the like by a distance shorter than the predetermined distance. In the case of, for example, FIG. 20, from a plurality of roads 76*a*, 76*b*, 76*c* and 76*d*, the management device 600 selects, with priority, the roads 76*b* and 76*d* extending to be away from the rows of trees, the mountain or the like by the predetermined distance or longer and the road 76*c* located away from the rows of trees, the mountain or the like by the predetermined distance or longer. The management device 600 generates a path continuous along these roads, and also generate a path along a portion of the road 76*a* connected to the target point G. Alternatively, the management device 600 may determine, as the path for the work vehicle 100, a path of which the ratio of the roads where satellite signals can be properly received, with respect to the entirety of the path, is higher than a predetermined value and which matches the schedule of the agricultural work on that working day. For example, the management device 600 may determine, as the path for the work vehicle 100, a path of which the ratio of the roads where satellite signals can be properly received is higher than a predetermined value and by which a final task of agricultural work on that working day is completed before the time when the agricultural work is to end, in accordance with the schedule. Alternatively, in the case where the work vehicle 100 is to perform agricultural work in a plurality of fields after departing from the departure point S before reaching the target point G, the management device 600 may generate, as the path for the work vehicle 100, a path of which the ratio of the roads where satellite signals can be properly received is higher than a predetermined value and by which the work vehicle 100 can arrive at each of the fields before the time when the respective task of agricultural work is to begin, based on the schedule.

Figure 21:
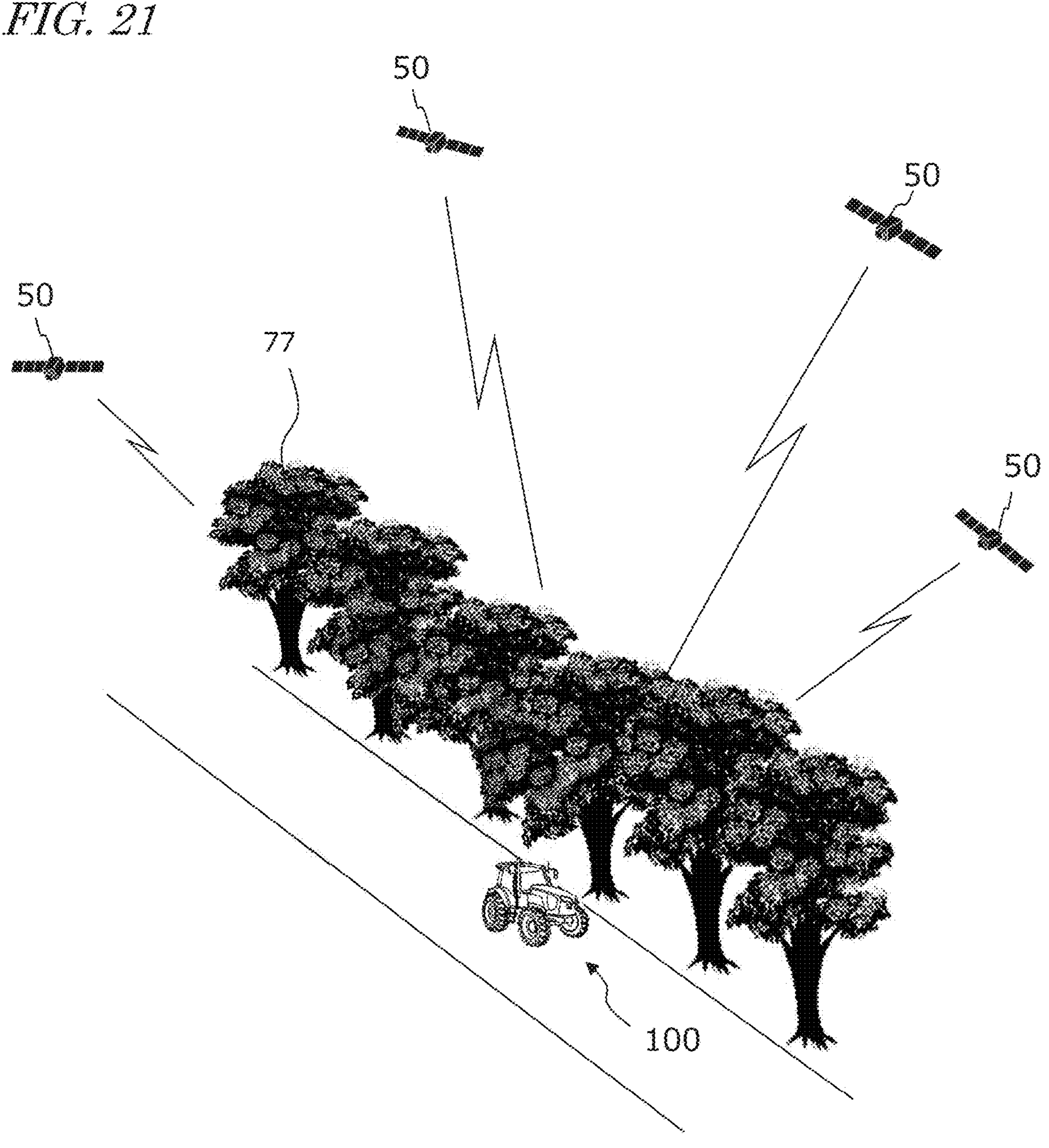
FIG. 21 is a diagram schematically showing an example of state where the work vehicle is traveling in the vicinity of a row of trees.

FIG. 21 is a diagram schematically showing an example of state where the work vehicle 100 is traveling in the vicinity of a row of trees. In this example, a plurality of trees 77 grow in the vicinity of the path along which the work vehicle 100 is traveling. A portion of branches of the trees 77 covers the work vehicle 100 and blocks reception of the satellite signals. In such an environment, many of the signals transmitted from the satellites 50 are blocked by the branches of the trees 77. As a result, the reception strength of the satellite signals is significantly decreased, and the reliability of positioning is lowered. In the "GNSS prioritized" mode, a path for the work vehicle 100 is determined so as to avoid such a road to a maximum possible degree. As a result, the reduction in the reliability of the positioning performed based on the GNSS data can be avoided, and the self-traveling can be stabilized.

In the case where the "GNSS prioritized" mode is selected, the management device 600 determines whether the road is a road where satellite signals can be properly received, based on the attribute information on each road included in the map. The attribute information may be generated based on the GNSS data output from the GNSS receiver mounted on the work vehicle 100 or another movable body. The another movable body may be a movable body of a different type from that of the work vehicle 100 such as an automobile or a drone (i.e., an unmanned aerial vehicle (UAV)). The work vehicle 100 or the another movable body collect the GNSS data while moving along the road along which the work vehicle 100 is to perform self-traveling. The GNSS data is collected a plurality of times at different times of the year for each road. A reason for this is that the positional arrangement of the plurality of GNSS satellites is different at different times of the year. The degree by which the branches and leaves of the trees block the reception of the satellite signals may be different season by season, and therefore, the GNSS data on each road may be collected in a plurality of different seasons. Based on the GNSS data collected a plurality of times for each road, attribute information representing whether the road is a road where the satellite signals can be properly received may be generated. The attribute information may be generated by, for example, the management device 600.

Figure 22A:
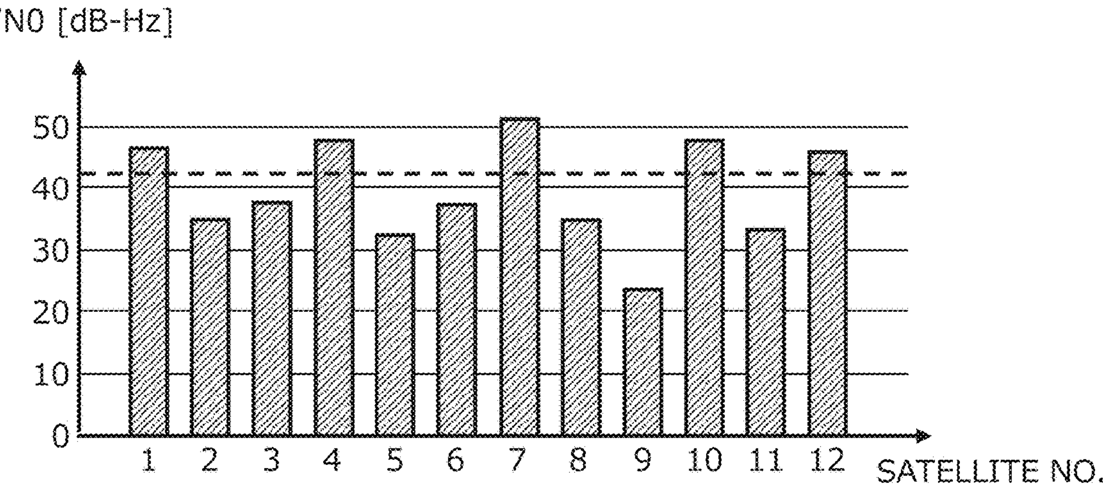
FIG. 22A is a graph showing an example of reception strength of satellite signals.
Figure 22B:
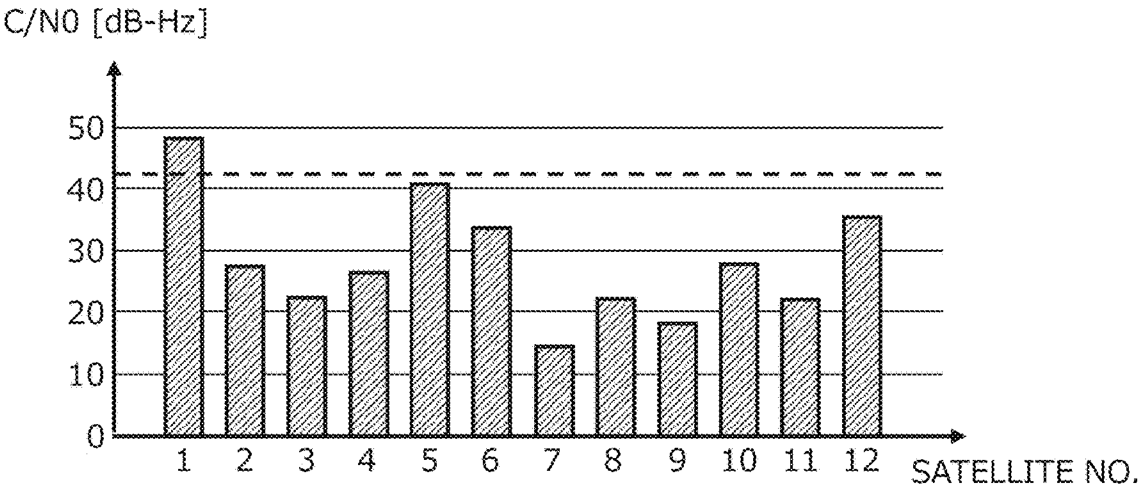
FIG. 22B is a graph showing another example of reception strength of satellite signals.

FIGS. 22A and 22B each show an example of reception strength of the satellite signals. FIG. 22A shows an example of reception strength of each satellite signal on a road where the satellite signals can be properly received. FIG. 22B shows an example of reception strength of each satellite signal on a road where the satellite signals cannot be received in a normal state (i.e., where a reception failure may occur). In these examples, satellite signals 2 satellites are received, and the reception strength is expressed by the value of the carrier to noise density ratio (C/NO). Note that this is merely an example, and the number of the satellites from which the satellite signals may be received, and how the reception strength is expressed, depend on the system. In one example, presence/absence of a reception failure can be determined based on whether the number of satellites, the satellite signals from which are received at a reception strength exceeding a preset reference value, is no lower than a threshold value (e.g., 4). In FIGS. 22A and 22B, an example of reference value for the reception strength is shown by the broken line. In the case where the threshold value is, for example, four, in the example shown in FIG. 22A, the reception strength of the satellite signals from five satellites exceed the reference value, which is not lower than the threshold value. In this case, it may be determined that the reception failure is not occurring. By contrast, in the example shown in FIG. 22B, the reception strength of the satellite signals from one satellite exceeds the reference value, which is lower than the threshold value. In this case, it may be determined that the reception failure is occurring. A road where it is determined that, for example, the reception failure is not occurring in any time of the year based on the GNSS data collected at a plurality of different times of the year for each road can be determined as a "road where satellite signals can be properly received". Note that ease of reception of the satellite signals may be different in different sites of the same road. Therefore, attribute information representing whether satellite signals can be properly received may be recorded for each pair of coordinate values (e.g., the latitude and the longitude) on the road. The above-described method is merely an example, and another method may be used to determine whether satellite signals can be properly received regarding each road. For example, in the case where the GNSS data includes a value representing the reliability of positioning, it may be determined, based on the value of the reliability, whether satellite signals can be properly received.

Figure 23:
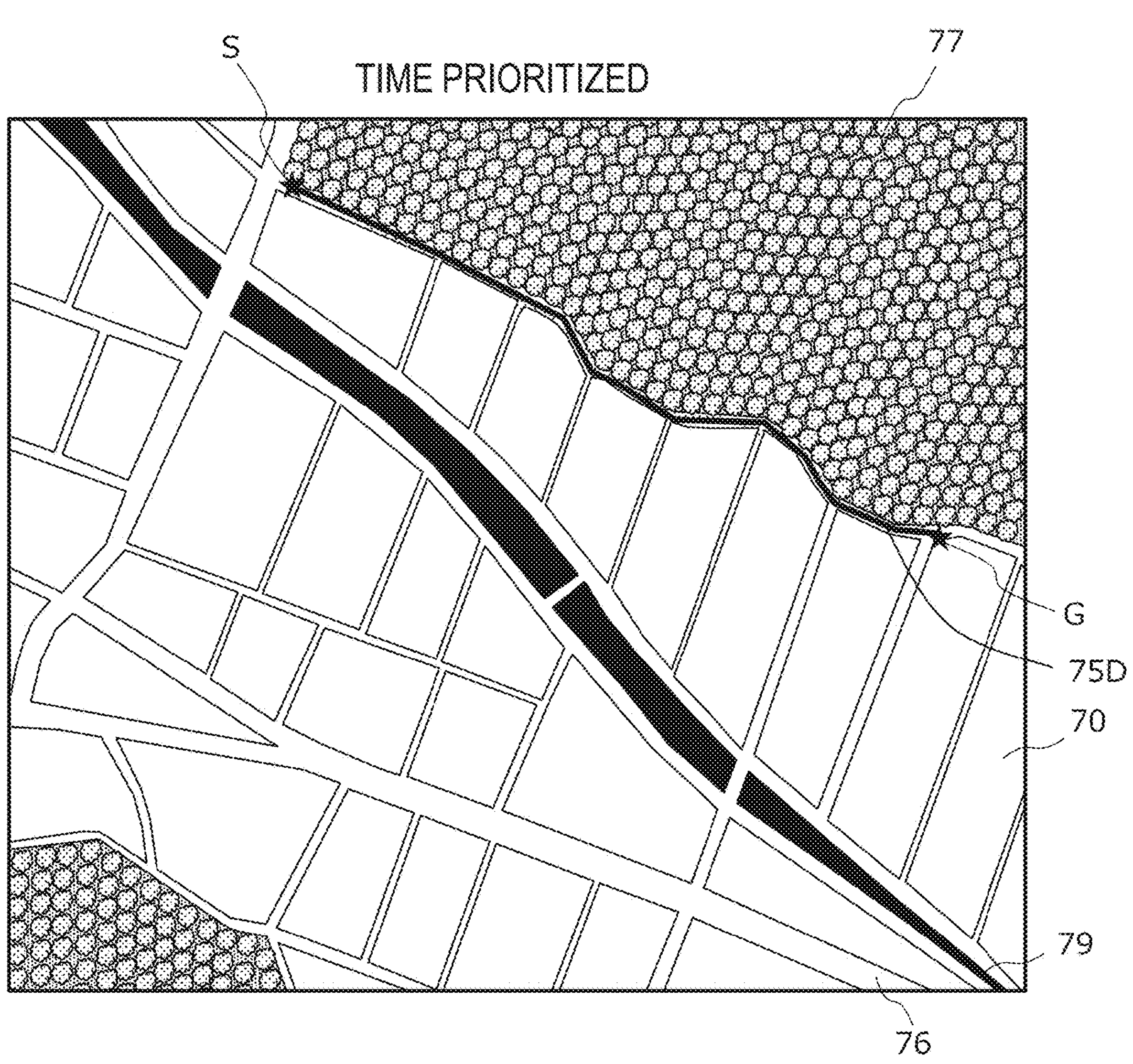
FIG. 23 is a diagram showing an example of path generated by the management device in the case where a "time prioritized" mode is selected.

FIG. 23 is a diagram showing an example of path generated by the management device 600 in the case where the "time prioritized" mode is selected. In this example, the management device 600 generates, as the path for the work vehicle 100, a path 75D, by which the work vehicle 100 can reach the target point G from the departure point S within the shortest time. The path 75D is generated on a road along the row of the trees 77. Such a path is effective in the case where, for example, the work vehicle 100 performs localization based on the data acquired by the LiDAR sensor 140 or the cameras 120 with no use of the GNSS data. In the case where the localization is performed based on the data acquired by the LiDAR sensor 140 or the cameras 120, the management device 600 may determine, as the path for the work vehicle 100, a path including a road where satellite signals cannot be received in a normal state.

In the above-described examples, the management device 600 performs global path planning for the work vehicle 100 in a mode selected by the user from the plurality of modes. As a result, a path reflecting the user's intention can be generated. In the above-described examples, five modes of "agricultural road prioritized", "waterway prioritized", "GNSS prioritized", "time prioritized" and "manual settings" are provided as examples. These are merely examples. The management device 600 may generate a path in, for example, at least one mode among "agricultural road prioritized", "waterway prioritized", "GNSS prioritized", "time prioritized" and "manual settings". Instead of a function of allowing the user to select the mode being provided, the management device 600 may generate a path including, with priority, at least one of an agricultural road, a road along a specific feature such as a waterway, or a road where satellite signals can be properly received, as the path for the work vehicle 100 in accordance with a predetermined algorithm.

For example, the management device 600 may calculate an evaluation value for each of a plurality of paths reaching the target point from the departure point of the work vehicle 100 based on the attribute information on each of roads along which the work vehicle 100 is to pass and on a predetermined evaluation function, and determine one path selected based on the evaluation value as the path for the work vehicle 100. Specifically, an evaluation function as follows is used. Among a plurality of paths reaching the target point from the departure point, a path of which the ratio of the agricultural roads, the ratio of the roads along a specific feature, or the ratio of the roads where satellite signals can be properly received is higher is given a smaller evaluation value, whereas a path by which the moving distance or moving time is longer is given a larger evaluation value. The management device 600 may determine a path by which such an evaluation function is minimum, as the path for the work vehicle 100. For example, it is assumed that the ratio of the length of the agricultural roads with respect to the entirety of the path is $r_1$, the ratio of the length of the roads along a specific feature with respect to the entirety of the path is $r_2$, the ratio of the length of the roads where satellite signals can be properly received, with respect to the entirety of the path, is $r_3$, and the total length of the path is d. The evaluation function may be expressed by, for example, the following function f:

$$f(r_1, r_2, r_3, d) = \frac{k_3 d}{k_1 r_1 + k_2 r_2 + k_3 r_3} \quad \text{Expression 1}$$

In the above expression, $k_1$, $k_2$, $k_3$ and $k_4$ are each a coefficient of 0 or greater, and respectively represent weights for $r_1$, $r_2$, $r_3$ and $r_4$. Coefficients $k_1$, $k_2$, $k_3$ and $k_4$ are appropriately set, so that the evaluation value can be made smaller as the ratio $r_1$ of the agricultural roads, the ratio $r_2$ of the roads along a specific feature, or the ratio $r_3$ of the roads where satellite signals can be properly received is higher, whereas the evaluation value can be made larger as the total length d of the path is longer. One or two among $k_1$, $k_2$ and $k_3$ may be zero (0). For example, in the case where $k_2=0$ and $k_3=0$, the management device 600 generates a path with only the agricultural roads being prioritized. The management device 600 may change the type of roads to be prioritized by adjusting the values of coefficients $k_1$, $k_2$, $k_3$ and $k_4$ in accordance with the mode selected by the user. Note that the evaluation function f is not limited to the above function, and any other evaluation function may be used.

Oppositely to the above-described example, among a plurality of paths reaching the target point from the departure point, a path of which the ratio of the agricultural roads, the ratio of the roads along a specific feature, or the ratio of the roads where satellite signals can be properly received is higher may be given a larger evaluation value, whereas a path by which the moving distance or moving time is longer may be given a smaller evaluation value. The management device 600 may determine a path by which such an evaluation function is maximum, as the path for the work vehicle 100.

Now, a specific example of path planning method based on a work plan will be described.

Before the agricultural work begins on each of working days, the management device 600 reads, from the storage 650, a map of a region including the field(s) where the agricultural work is to be scheduled on that working day, and generates a path for the work vehicle 100 based on the map. More specifically, the management device 600 generates a first path, along which the work vehicle 100 is to travel while performing the agricultural work inside a field 70 (the first path is also referred to as a "tasked travel path"), on the field on the map, and generates a second path, along which the work vehicle 100 is to travel toward the field 70, on a road on the map. After generating the first path and the second path, the management device 600 connects the first path and the second path to each other to generate a global path for the work vehicle 100. As described above, the second path may be generated such that at least one of an agricultural road, a road along a specific feature, or a road where satellite signals can be properly received is prioritized.

Figure 24:
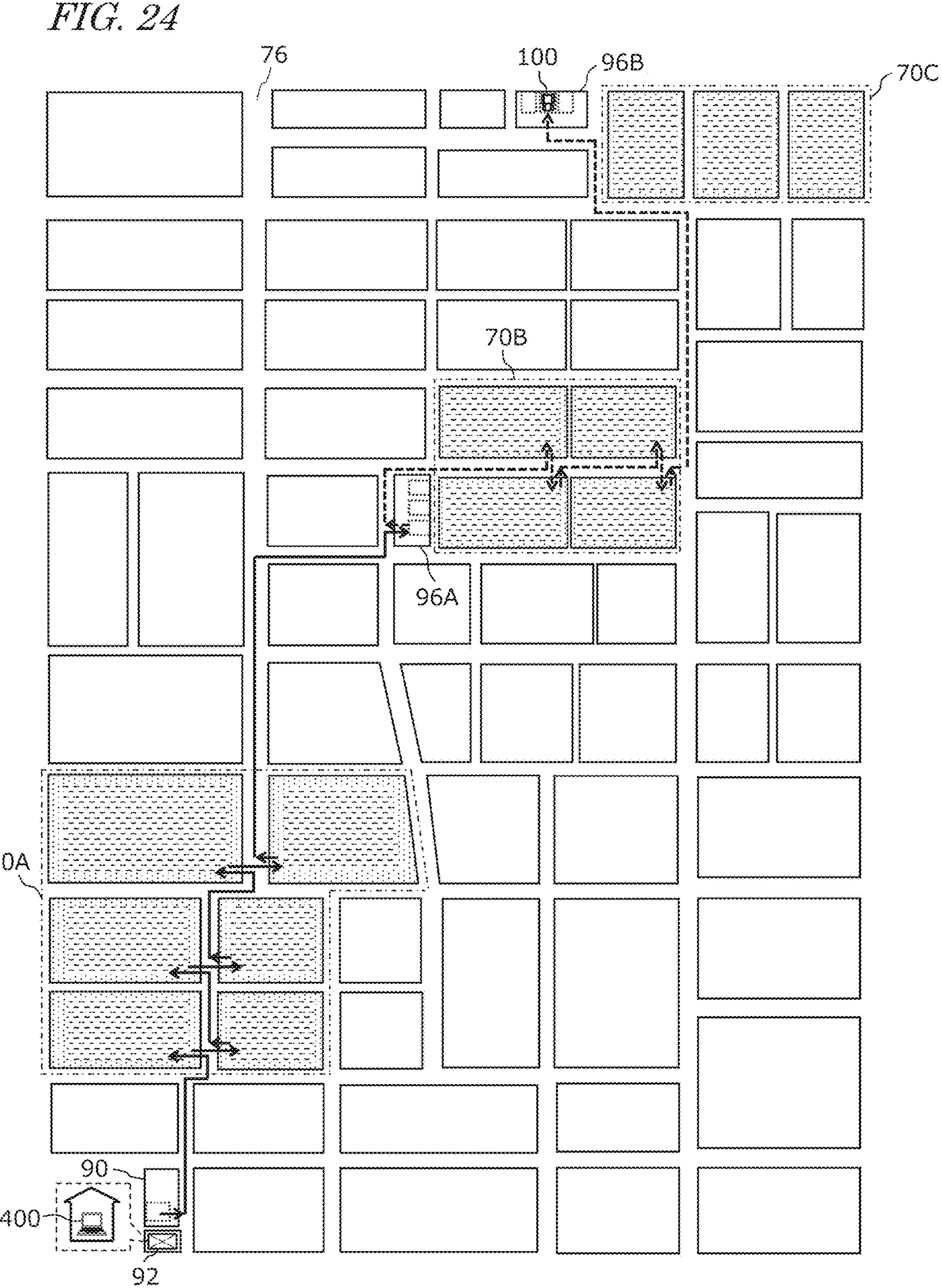
FIG. 24 is a diagram showing an example of global path.

FIG. 24 is a diagram showing an example of global path to be generated. FIG. 24 shows, as an example, a field group 70A, where the agricultural work is to be performed on one working day, a field group 70B, where the agricultural work is to be performed on the next day, and a field group 70C, where the agricultural work is to be performed on the day after the next day. FIG. 24 also shows, as an example, a repository 90 for the work vehicle 100, a house 92 of the user performing remote monitoring of the work vehicle 100, and two waiting areas 96A and 96B, where the work vehicle 100 is to wait. In FIG. 24, the field group 70A, the field group 70B, the field group 70C, the repository 90, the waiting area 96A and the waiting area 96B are shown as being relatively close to each other for the sake of convenience. In actuality, the distances between the field group 70A, the field group 70B, the field group 70C, the repository 90, the waiting area 96A and the waiting area 96B may be long, for example, 500 m to 1 km or even longer.

A repository may be, for example, a garage, a barn or a parking area adjacent to a house or an office of the user. A waiting area may be, for example, a site that is managed or used jointly by a plurality of users. The waiting area may be a facility such as a parking area or a garage managed or run by a regional government of a city, a town or a village, an agricultural cooperative or a corporation. In the case where the waiting area is a facility locked at nighttime, the work vehicle 100 in the waiting area can be prevented from being robbed. FIG. 24 shows two waiting areas 96A and 96B as examples, but any number of waiting areas may be provided. In the case where the work vehicle 100 moves around within a relatively small range, there is no need to provide the waiting area 96 separately from the repository 90. The repository 90 and the waiting area 96 may be registered by a manipulation performed by the user by use of the terminal device 400.

In FIG. 24, paths, of the paths generated by the management device 600, which are generated on the roads 76 are represented by arrows. The tasked travel paths generated inside the fields are omitted. Solid line arrows represent an example of paths for the work vehicle 100 on one working day, and broken line arrows represent an example of paths for the work vehicle 100 on the next working day.

In the example shown in FIG. 24, the management device 600 generates, as a path for one working day, a path along which the work vehicle 100 departs from the repository 90, sequentially passes the fields in the field group 70A and reaches the waiting area 96A. This is because the waiting area 96A is the waiting area closest to the field group 70B, where the agricultural work is scheduled to be performed on the next working day. The management device 600 generates, as a path for the next working day, a path along which the work vehicle 100 departs from the waiting area 96A, sequentially passes the fields in the field group 70B and reaches the waiting area 96B. This is because the waiting area 96B is the waiting area closest to the field group 70C, where the agricultural work is scheduled to be performed on the day after the next working day. In this manner, the management device 600 generates a path from the field where the final task of agricultural work is to be performed on each working day, to the waiting area located at the shortest average distance from the group of fields where the agricultural work is to be performed on the next working day. As described above, the management device 600 can generate a path with priority being put on an agricultural road, a road along a specific feature, or a road where satellite signals can be properly received, in accordance with the selection of the user. The work vehicle 100 travels along the generated path.

In the example shown in FIG. 24, on one working day, the work vehicle 100 departs from the repository 90, and sequentially visits the fields in the field group 70A, where the agricultural work is scheduled to be performed on the day, and performs the agricultural work indicated by the schedule in each field. In each field, the work vehicle 100 performs the agricultural work while performing self-traveling along the tasked travel path by, for example, the method described above with reference to FIG. 7 to FIG. 9D. When the agricultural work ends in one field, the work vehicle 100 enters the next field, and performs the agricultural work in substantially the same manner. The work vehicle 100 operates in this manner, and when the agricultural work ends in the field assigned to the final task of agricultural work for the day, the work vehicle 100 moves to the waiting area 96A. The work vehicle 100 waits at the waiting area 96A until the next working day. On the next working day, the work vehicle 100 departs from the waiting area 96A and sequentially visits the fields in the field group 70B, where the agricultural work is scheduled to be performed on the day, and performs the agricultural work indicated by the schedule in each field. When the agricultural work ends in the field assigned to the final task of agricultural work for the day, the work vehicle 100 moves to the waiting area 96B. The work vehicle 100 waits at the waiting area 96B until the day after the next working day. On the day after the next working day, the work vehicle 100 departs from the waiting area 96B, sequentially performs the agricultural work in the fields in the field group 70C, and then moves to a predetermined waiting area in substantially the same manner. With such an operation, the work vehicle 100 is moved efficiently along an optimal path in accordance with the schedule, so that the scheduled agricultural work can be completed.

In the case where a plurality of waiting areas (including the repository 90) are provided in the environment where the work vehicle 100 travels as in the present example embodiment, data indicating the correspondence between the plurality of waiting areas and the plurality of fields (e.g., a table) may be previously recorded in the storage 650. FIG. 25 is a table showing an example of the correspondence between the waiting areas and the fields. The correspondence between the waiting areas and the fields may be determined based on, for example, a moving distance from each of the waiting areas to each of the fields. In the example shown in FIG. 25, the waiting area closest to the fields #1 to #30 is the waiting area A, the waiting area closest to the fields #31 to #60 is the waiting area B, and the waiting area closest to the fields #61 to #100 is the waiting area C. Referring to such a table, the management device 600 can determine the waiting area closest to the field where the agricultural work is scheduled to be performed on the next working day. One or more waiting areas 96 are provided in addition to the repository 90 as in this example, so that the time and the amount of consumption of the fuel required to move the work vehicle 100 can be decreased as compared with in the case where the work vehicle 100 returns to the repository 90 each day. As a result, a series of tasks of agricultural work over a plurality of working days can be performed more efficiently.

Figure 26:
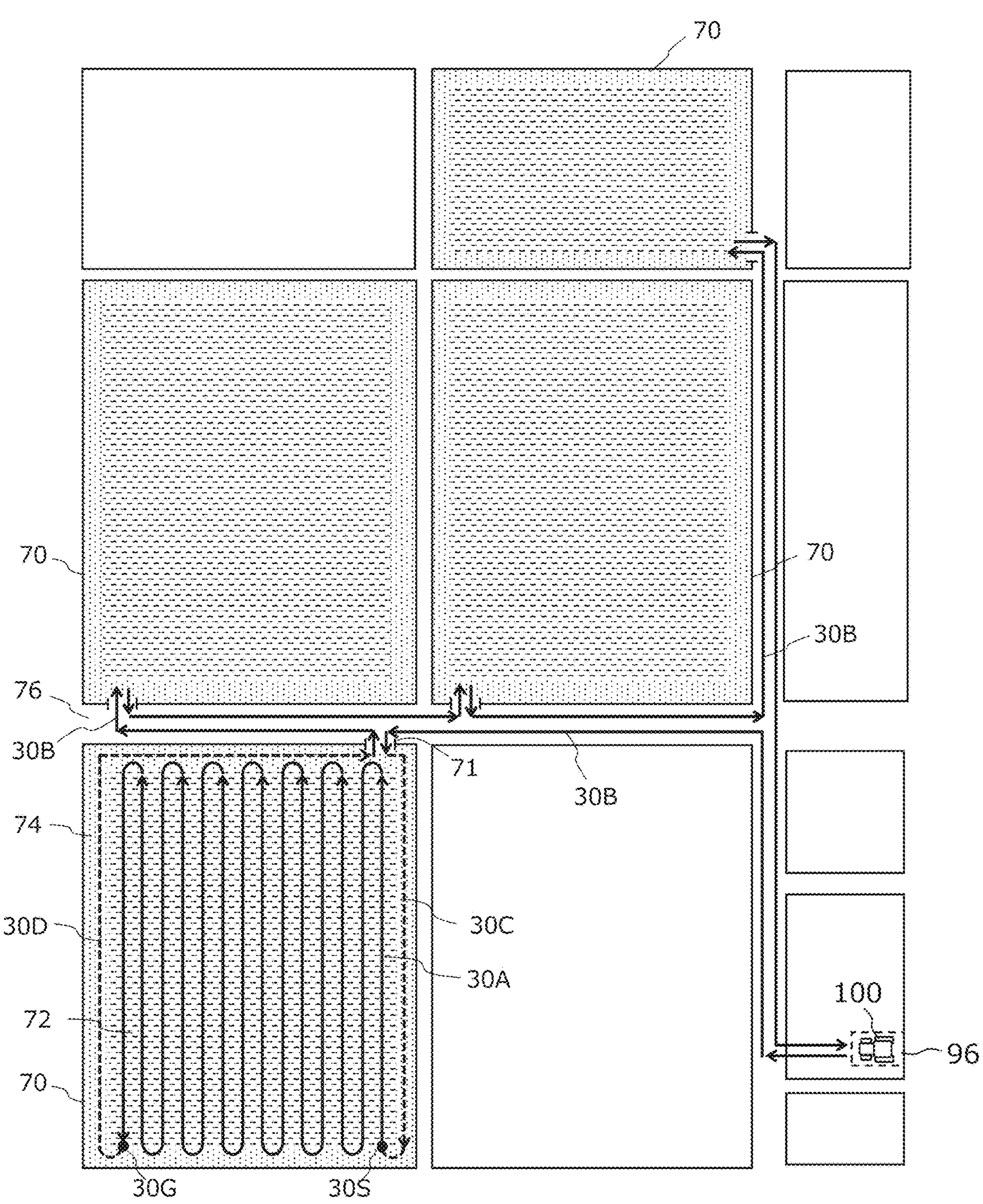
FIG. 26 is a diagram showing an example of global path generated on one working day.

Now, with reference to FIG. 26, an example of method for generating a global path will be described in more detail. FIG. 26 is a diagram showing an example of global path generated on one working day. In this example, the management device 600 generates a path along which the work vehicle 100 departs from the waiting area 96, passes four fields 70, and returns to the waiting area 96. The management device 600 generates a first path (tasked travel path) 30A inside each of the fields 70, and generates second paths 30B on the roads 76 around the fields 70. In FIG. 26, the first path 30A is shown only inside the left bottom field 70, and the first paths inside the other fields 70 are omitted.

The management device 600 generates the first path 30A as represented by the solid line arrows in FIG. 26, inside each of the fields 70 on the map. The management device 600 generates the first path 30A based on the settings previously made by the user as described above with reference to FIG. 7. The first path 30A may be generated so as to cover the entirety of the work area 72 by repeating a reciprocating motion from a beginning point 30S to an ending point 30G. The interval between rows of the first path 30A may be determined in consideration of the width and the turning performance of each of the work vehicle 100 and the implement 300.

The management device 600 further generates a path from the waiting area 96 to each of the fields 70 and paths connecting such a plurality of fields 70 as second paths 30B. In the example shown in FIG. 26, the management device 600 generates a second path 30B at an entrance of each field 70 in addition to the second paths 30B on the roads 76, and generates a third path 30C connecting the second path 30B generated at each entrance and the beginning point 30S of the corresponding first path 30A to each other. The management device 600 further generates a second path 30B at an exit of each field 70 in addition to the second paths 30B on the roads 76, and generates a fourth path 30D connecting the second path 30B generated at each exit and the ending point 30G of the corresponding first path 30A to each other. In the example shown in FIG. 26, the entrance and the exit of each field 70 are common to each other, and will be expressed as an "entrance/exit 71", hereinafter. Each field 70 may have a plurality of entrances/exits 71, or the entrance and the exit may be provided at different positions. The environment map includes positional information on the entrance/exit 71 (or the entrance and the exit) of each field 70 in addition to the positional information on each field 70. The management device 600 can generate the second paths 30B based on the positional information on the entrance/exit 71.

The management device 600 according to the present example embodiment generates the third path 30C and the fourth path 30D in a region other than a region, of the field 70, where the agricultural work has been performed. In the example of FIG. 26, it is assumed that a previous task of agricultural work has already been performed in the work area 72. Therefore, the management device 600 generates the third path 30C and the fourth path 30D in the headland 74 while avoiding the work area 72. This can prevent the work area 72, where the agricultural work has already been performed, from being trampled by the work vehicle 100. In the case where no agricultural work has been performed in the field 70 in this season (that is, in the case where the current task of agricultural work is the first task in this season), the third path 30C may overlap the work area 72. Meanwhile, the fourth path 30D is a path that is set after the current task of agricultural work is completed, and therefore is set so as not to overlap the work area 72.

In the word area 72, a plurality of types of agricultural work are performed at different times. For example, agricultural work such as tilling, planting, manure spreading, preventive pest control, and harvesting may be performed at different times. In the case where a certain type of agricultural work has already been performed in the work area 72, if the work vehicle 100 tramples the work area 72, the effect of the agricultural work already performed is spoiled. Therefore, in the case where a certain type of agricultural work has already been performed in the work area 72, the management device 600 according to the present example embodiment avoids the work area 72 to generate the third path 30C and the fourth path 30D. In which region the agricultural work has already been performed can be determined based on the work plan. The management device 600 can generate the third path 30C and the fourth path 30D in a region other than the region where the agricultural work has already been performed, based on the work plan.

The management device 600 can perform the above-described path generation process for each of the fields 70 and each of the roads 76 around the fields 70 to generate all the paths for a predetermined time period (e.g., half a day, one day, three days, etc.). For example, before the work vehicle 100 begins traveling on each working day, the management device 600 may generate all the paths necessary to complete all the tasks of agricultural work scheduled for that working day. Alternatively, the management device 600 may first generate a path necessary to perform a portion of the agricultural work scheduled for each working day, and then, after the portion of the agricultural work ends, may generate a path necessary to perform the remaining portion of the agricultural work for that working day. Still alternatively, the management device 600 may generate, all at once, all the paths necessary to complete all the tasks of agricultural work scheduled over a plurality of working days. The management device 600 may change the path, once generated, in accordance with various states such as the state of progress of the agricultural work, the state of weather, the traffic state, or the state of the agricultural road.

In the example shown in FIG. 26, the work plan indicates that the agricultural work is performed in a plurality of fields 70 in a predetermined time period (e.g., on one working day). Therefore, the management device 600 generates a path from the waiting area 96 to one field 70 and a path between the fields 70, along the roads 76. A portion from such an example, there is a case where the work plan indicates that the agricultural work is performed in one field 70 in a predetermined time period. In this case, the management device 600 generates a path from the waiting area 96 to one field 70, along the roads 76 leading to the field 70. The management device 600 further generates a path from the field 70 where the final task of agricultural work is to be performed in the predetermined time period, as indicated by the work plan, to a return site to which the work vehicle 100 is to return, along the roads 76. In the example shown in FIG. 26, the waiting area 96 corresponds to the return site. The return site may be a site different from the waiting area 96 (e.g., the repository 90 shown in FIG. 24).

As a result of the above-described operation, the management device 600 can generate a global path from the departure point of the work vehicle 100 to the target point via one or more fields 70 for every predetermined time period (e.g., every working day). The management device 600 can generate a global path for the work vehicle 100 such that the work vehicle 100 performs the agricultural work in the specified field 70 at the specified point of time in accordance with the schedule previously created. Information on the generated global path is transmitted to the work vehicle 100 and stored in the storage 170. The ECU 184, performing self-driving control, controls the ECUs 181 and 182 such that the work vehicle 100 travels along the global path. This allows the work vehicle 100 to begin traveling along the global path.

There may be a case where while the work vehicle 100 is traveling outside the field, there is an obstacle such as a pedestrian or another vehicle on the global path or in the vicinity thereof. In order to avoid the work vehicle 100 colliding against the obstacle, while the work vehicle 100 is traveling, the ECU 185 of the controller 180 consecutively generates a local path along which the work vehicle 100 can avoid the obstacle. While the work vehicle 100 is traveling, the ECU 185 generates a local path based on sensing data acquired by the sensing device included in the work vehicle 100 (the obstacle sensors 130, the LiDAR sensor 140, the cameras 120, etc.). The local path is defined by a plurality of waypoints along a portion of the second path 30B. Based on the sensing data, the ECU 185 determines whether there is an obstacle existing on the road on which the work vehicle 100 is proceeding or in the vicinity thereof. In the case where there is such an obstacle, the ECU 185 sets a plurality of waypoints such that the obstacle is avoided, and thus generates a local path. In the case where there is no such obstacle, the ECU 185 generates a local path substantially parallel to the second path 30B. Information representing the generated local path is transmitted to the ECU 184 responsible for self-driving control. The ECU 184 controls the ECU 181 and the ECU 182 such that the work vehicle 100 travels along the local path. This allows the work vehicle 100 to travel while avoiding the obstacle. In the case where there is a traffic signal on the road on which the work vehicle 100 is traveling, the work vehicle 100 may recognize the traffic signal based on, for example, an image captured by the cameras 120 and perform an operation of halting at a red light and moving forward at a green light.

Figure 27:
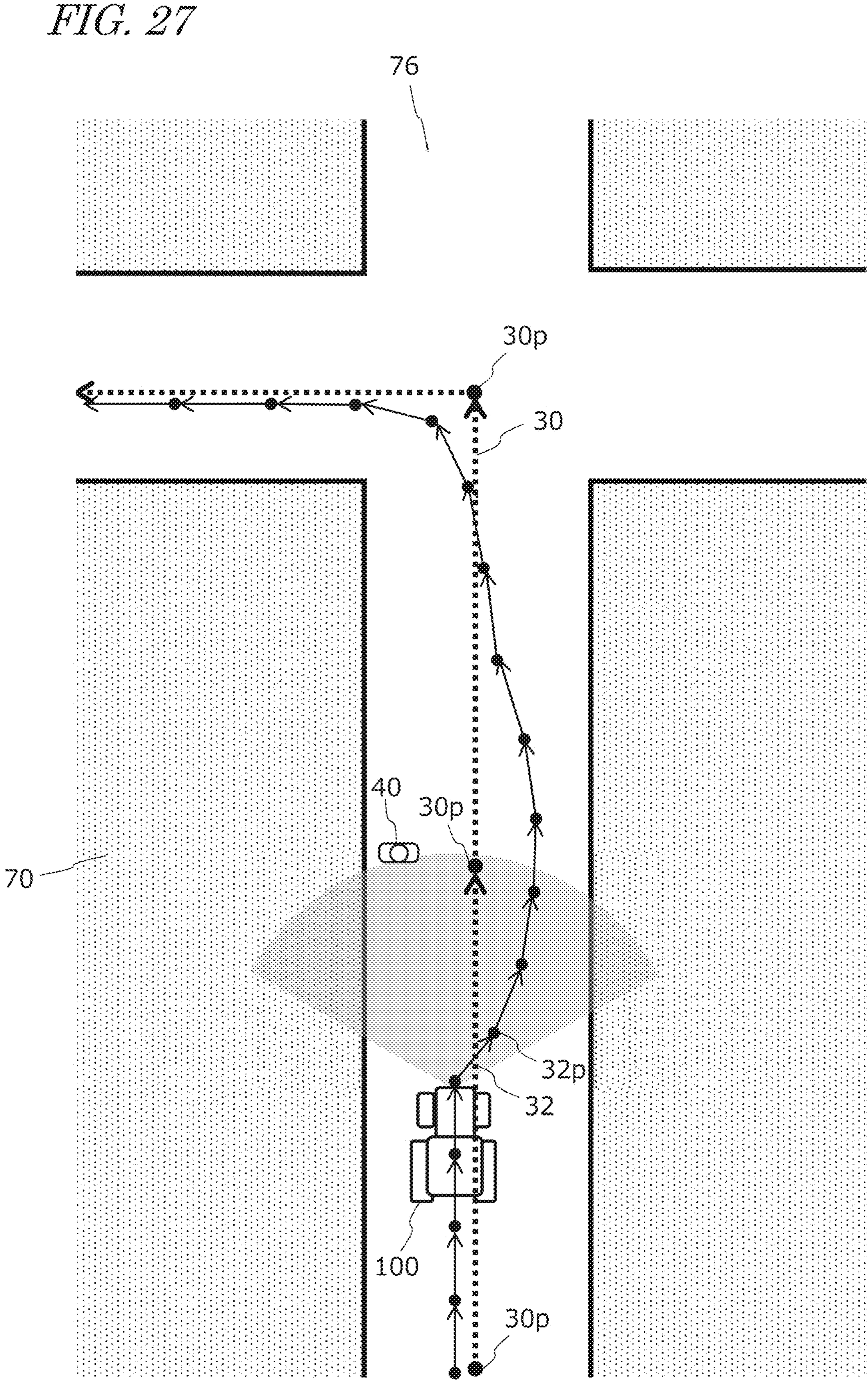
FIG. 27 is a diagram showing an example of global path and an example of local path generated in an environment where there is an obstacle.

FIG. 27 is a diagram showing an example of global path and an example of local path generated in an environment where there is an obstacle. FIG. 27 represents, as an example, a global path 30 by the broken line arrows, and represents, as an example, local paths 32 consecutively generated during travel of the work vehicle 100 by the solid line arrows. The global path 30 is defined by a plurality of waypoints 30*p*. The local paths 32 are defined by a plurality of waypoints 32*p* set at a shorter interval than the waypoints 30*p*. The waypoints each have information on, for example, the position and the orientation. The management device 600 sets the plurality of waypoints 30*p* at a plurality of points including an intersection of the roads 76 to generate the global path 30. The interval between the waypoints 30*p* is relatively long, and may be, for example, about several meters to about several tens of meters. The ECU 185 sets the plurality of waypoints 32*p* based on the sensing data output from the sensing device during travel of the work vehicle 100 to generate the local paths 32. The interval between the waypoints 32*p* of the local paths 32 is shorter than the interval between the waypoints 30*p* of the global path 30. The interval between the waypoints 32*p* may be, for example, about several tens of centimeters (cm) to about several meters (m). The local paths 32 are generated in a relatively small range (e.g., a range of about several meters) from the position of the work vehicle 100. FIG. 27 shows, as an example, a series of local paths 32 generated while the work vehicle 100 travels along the road 76 between the fields 70 and turns left at the intersection. While the work vehicle 100 is moving, the ECU 185 repeats an operation of generating a local path from the position of the work vehicle 100 estimated by the ECU 184 to, for example, a point frontward of the work vehicle 100 by several meters. The work vehicle 100 travels along the local paths consecutively generated.

In the example shown in FIG. 27, there is an obstacle 40 (e.g., a human) frontward of the work vehicle 100. FIG. 27 shows a fan-shaped region as an example of range sensed by the sensing devices such as the cameras 120, the obstacle sensors 130 or the LiDAR sensor 140 mounted on the work vehicle 100. In such a state, the ECU 185 generates the local paths 32 such that the obstacle 40 detected based on the sensing data is avoided. The ECU 185 determines whether there is a possibility that the work vehicle 100 will collide against the obstacle 40, based on, for example, the sensing data and the width of the work vehicle 100 (including the width of the implement in the case where the implement is attached). In the case where there is a possibility that the work vehicle 100 will collide against the obstacle 40, the ECU 185 sets the plurality of waypoints 32*p* such that the obstacle 40 is avoided, and generates the local paths 32. Note that the ECU 185 may recognize the state of the road surface (e.g., being muddy, having a cave-in, etc.) based on the sensing data, in addition to the presence/absence of the obstacle 40, and in the case where a site on which it is difficult to walk is detected, may generate the local paths 32 such that the local path 32 avoids such a site. The work vehicle 100 travels along the local paths 32. In the case where the obstacle 40 cannot be avoided in whichever manner the local paths 32 may be set, the controller 180 may halt the work vehicle 100. At this point, the controller 180 may transmit an alert signal to the terminal device 400 to warn a supervisor. In the case where after the work vehicle 100 halts, the obstacle 40 is moved and it is recognized that there is no risk of collision, the controller 180 may restart the travel of the work vehicle 100.

Figure 28:
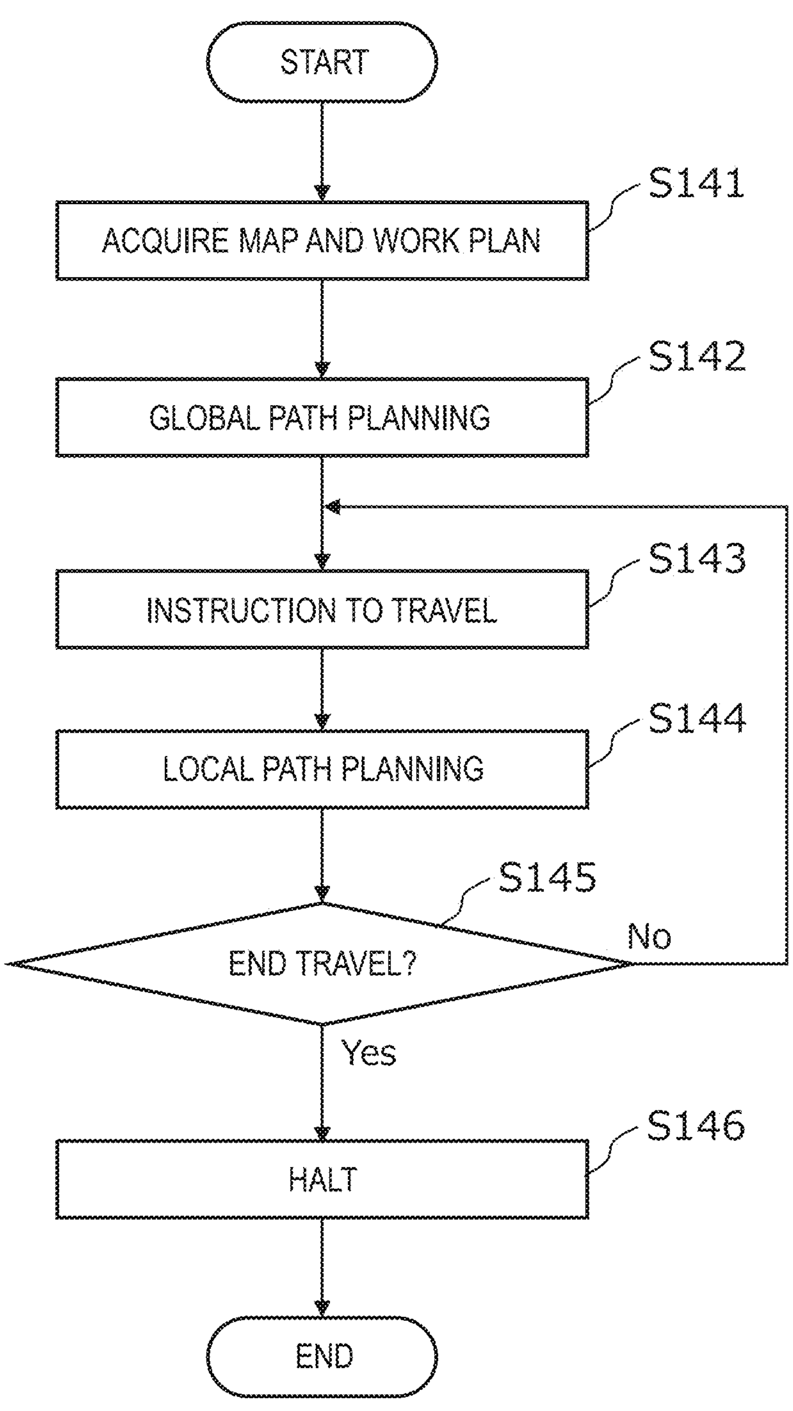
FIG. 28 is a flowchart showing a method for path planning and travel control.

FIG. 28 is a flowchart showing an operation of path planning and travel control according to the present example embodiment. An operations of steps S141 to S146 shown in FIG. 28 is performed, so that the path planning can be performed and the self-traveling of the work vehicle 100 can be controlled.

In the example shown in FIG. 28, the management device 600 first acquires a map and a work plan from the storage 650 (step S141). Next, the management device 600 performs global path planning for the work vehicle 100 based on the map and the work plan by the above-described method (step S142). The global path planning may be performed at any timing before the work vehicle 100 begins to travel. The global path planning may be performed immediately before the work vehicle 100 begins to travel, or the day before the work vehicle 100 begins to travel or even earlier. The global path may be generated based on information input by the user by use of the terminal device 400 (e.g., based on the departure point, the target point, the waypoints, etc.). As described above, for generation of a path toward a field or a path from a field toward another site (e.g., the repository or the waiting area for the work vehicle 100), the management device 600 generates at least one of a path including an agricultural road with priority, a path including a road along a specific feature with priority, or a path including, with priority, a road where satellite signals can be properly received. The management device 600 generates at least one of these paths as the path for the work vehicle 100 based on the attribute information on each road on the map. The management device 600 transmits the data representing the generated global path to the work vehicle 100. After this, the management device 600 gives the work vehicle 100 a command to travel, at a predetermined timing. Upon receipt of the command, the controller 180 of the work vehicle 100 controls the drive device 240 to begin the travel of the work vehicle 100 (step S143). This causes the work vehicle 100 to begin traveling. The timing when the work vehicle 100 begins traveling may set to, for example, such an appropriate timing as to allow the work vehicle 100 to arrive at the field before the time when the first task of agricultural work is to begin on each working day indicated by the work plan. While the work vehicle 100 is traveling, the ECU 185 of the controller 180 performs local path planning in order to avoid the collision of the work vehicle 100 and the obstacle by the above-described method (step S144). In the case where no obstacle is detected, the ECU 185 generates the local paths substantially parallel to the global path. In the case where an obstacle is detected, the ECU 185 generates local paths along which the obstacle is avoidable. Next, the ECU 184 determines whether to end the travel of the work vehicle 100 (step S145). In the case where, for example, the local paths along which the obstacle is avoidable cannot be generated, or in the case where the work vehicle 100 has arrived at the target point, the ECU 184 halts the work vehicle 100 (step S146). In the case where no obstacle is detected, or in the case where the local paths along which the obstacle is avoidable is generated, the operation returns to step S143, where the ECU 184 causes the work vehicle 100 to travel along the generated local paths. After this, the operation in steps S143 to S145 is repeated until it is determined in step S145 to end the travel.

With the above-described operation, the work vehicle 100 can automatically travel along the generated paths without colliding against any obstacle.

In the example shown in FIG. 28, the global path, once generated, is not changed until the work vehicle 100 arrives at the target point. The global path is not limited to this, and may be modified while the work vehicle 100 is traveling. For example, the ECU 185 may recognize at least one of the state of the road on which the work vehicle 100 is traveling, the state of the plants in the surroundings of the work vehicle 100, or the state of weather, based on the sensing data acquired by the sensing devices such as the cameras 120 or the LiDAR sensor 140 while the work vehicle 100 is traveling, and in the case where the recognized state fulfills a predetermined condition, may change the global path. There is a case where while the work vehicle 100 is traveling along the global path, a portion of the road along the global path is difficult to pass along. For example, there is a case where the road is muddy due to a heavy rain, the road surface has a cave-in, or it is impossible to pass along the road due to an accident or any other reason. Alternatively, there is a case where a satellite signal from a GNSS satellite is difficult to be received for the reason that the plants around the agricultural road have grown more than expected or that a new building has been built. In consideration of such a situation, the ECU 185 may detect a road that is difficult to pass along, based on the sensing data acquired during travel of the work vehicle 100 and may change the path such that the post-change path avoids such a road. In the case where the path is changed, the ECU 185 may cause the storage 170 to store the post-change path and may transmit information on the post-change path to the management device 600. In this case, the next time a path to the same field is to be generated, the management device 600 may adopt the post-change path. This allows the path planning to be performed flexibly in accordance with a change in the environment.

The configurations and operations in the above-described example embodiments are merely examples, and the present disclosure is not limited to the above-described example embodiments. Hereinafter, other example embodiments will be described.

In the above-described example embodiments, the processor 660 of the management device 600 creates a work plan, generates an environment map, and performs global path planning for the work vehicle 100, whereas the controller 180 disposed inside the work vehicle 100 performs local path planning and travel control for the work vehicle 100. Instead of such an example embodiment, a portion of the operations assigned to the management device 600 may be performed by the controller 180, the operational terminal 200 or the terminal device 400. For example, the generation of the environment map and the generation of the global path may be performed by the controller 180, the operational terminal 200 or the terminal device 400.

The management device 600 may manage the operations of a plurality of agricultural machines including the work vehicle 100. In this case, the management device 600 may perform global path planning and issue travel instructions for each of the agricultural machines based on the schedule of the agricultural work to be performed by each agricultural machine.

A system performing the path planning or self-driving control according to the above-described example embodiments can be mounted on an agricultural machine lacking such functions, as an add-on. Such a system may be manufactured and marketed independently from the agricultural machine. A computer program for use in such a system may also be manufactured and marketed independently from the agricultural machine. The computer program may be provided in a form stored in a non-transitory computer-readable storage medium, for example. The computer program may also be provided through downloading via telecommunication lines (e.g., the Internet).

As described above, a path planning system according to an example embodiment of the present disclosure is for an agricultural machine to automatically travel inside and outside a field. The path planning system includes a storage to store a map of a region including a plurality of fields and roads around the plurality of fields, and a processor configured or programmed to generate a path for the agricultural machine on the map. The map includes attribute information representing, for each of the roads, at least one of whether the road is an agricultural road, whether the road is a road along a specific feature, or whether the road is a road where satellite signals from GNSS satellites can be properly received. For generation of a path toward a field or a path from a field toward another site, the processor is configured or programmed to generate at least one of a path including an agricultural road with priority, a path including a road along the specific feature with priority, or a path including, with priority, a road where the satellite signals can be properly received, as the path for the agricultural machine based on the attribute information. With this configuration, a path preferred for self-traveling of the agricultural machine can be generated.

The map may include attribute information representing, for each road, whether the road is a road along a waterway as the specific feature. The processor may generate a path including a road along the waterway with priority, as the path for the agricultural machine based on the attribute information. With this configuration, a path including many roads along a waterway, which is preferred as a landmark usable for localization performed by use of a LiDAR sensor or a camera, can be generated.

The processor may be configured or programmed to determine a path by which an evaluation function is minimum, as the path for the agricultural machine among a plurality of paths reaching a target point from a departure point, the evaluation function being such that a path having a higher ratio of agricultural roads, a higher ratio of roads along the specific feature, or a higher ratio of roads where the satellite signals can be properly received is given a smaller evaluation value and a path providing a longer moving distance or a longer moving time is given a larger evaluation value. With this configuration, a path having a high ratio of agricultural roads, a high ratio of roads along the specific feature or a high ratio of roads where the satellite signals can be properly received can be generated stably.

The processor may be configured or programmed to generate the path in a mode selected by a user from a plurality of modes including at least one of a first mode to generate the path with an agricultural road being selected with priority, a second mode to generate the path with a road along the specific feature being selected with priority, or a third mode to generate the path with a road where the satellite signals can be properly received being selected with priority. With this configuration, a path reflecting a priority item considered to be important by the user can be generated.

The processor may be configured or programmed to generate the path in a mode selected by the user from a plurality of modes including all of the first mode, the second mode and the third mode. With this configuration, a path reflecting a priority item considered to be important by the user can be generated among a path including an agricultural road with priority, a path including a road along the specific feature with priority, and a path including, with priority, a road where the satellite signals can be properly received.

The processor may be configured or programmed to generate the path in a mode selected by the user from the plurality of modes further including a fourth mode to generate the path such that the moving distance or the moving time of the agricultural machine is shortest. With this configuration, a path by which the moving time or the moving distance is shortest can be generated.

The processor may be configured or programmed to cause a display device to display a graphical user interface (GUI) to allow the user to select one mode from the plurality of modes. With this configuration, the user can select, on the GUI, the mode corresponding to the priority item that he/she considers to be important.

The storage may further store a schedule of at least one task of agricultural work to be performed by the agricultural machine on each of working days. The processor may be configured or programmed to generate, based on the schedule, the path such that a final task of agricultural work on each working day is completed before the time when the agricultural work is to end. With this configuration, a path by which the agricultural work can be completed before the time when the agricultural work is to end as indicated by the schedule can be generated.

The processor may be configured or programmed to generate, based on the schedule, the path such that the agricultural machine arrives at a field where each of tasks of agricultural work is to be performed before the time when the agricultural work is to begin. With this configuration, a path by which the agricultural machine can arrive at each of the fields before the time when the agricultural work is to begin as indicated by the schedule can be generated.

While the agricultural machine is traveling along the path, the processor may be configured or programmed to repeat an operation of generating a local path which is defined by a plurality of waypoints along a portion of the path and along which an obstacle is avoidable, based on data acquired by a sensing device included in the agricultural machine, and of outputting information representing the local path to a controller controlling the traveling of the agricultural machine. With this configuration, the agricultural machine can travel along the local path along which an obstacle is avoided.

A control system according to another example embodiment of the present disclosure includes the path planning system in any one of the above-described example embodiments, and a controller configured or programmed to cause the agricultural machine to travel along the path generated by the processor.

An agricultural machine according to still another example embodiment of the present disclosure includes the control system in any one of the above-described example embodiments, and a sensor to perform sensing on a surrounding environment of the agricultural machine. The controller is configured or programmed to cause the agricultural machine to travel along the path generated by the processor based on a signal output from the sensing device.

A path planning method according to still another example embodiment of the present disclosure is for an agricultural machine to automatically travel inside and outside a field. The path planning method includes acquiring, from a storage, a map of a region including a plurality of fields and roads around the plurality of fields, the map including attribute information representing, for each of the roads, at least one of whether the road is an agricultural road, whether the road is a road along a specific feature, or whether the road is a road where satellite signals from GNSS satellites can be properly received, and generating, as a path toward a field or a path from a field toward another site for the agricultural machine on the map, at least one of a path including an agricultural road with priority, a path including a road along the specific feature with priority, or a path including, with priority, a road where the satellite signals can be properly received, based on the attribute information.

A computer program according to still another example embodiment of the present disclosure is to perform path planning for an agricultural machine automatically traveling inside and outside a field. The program may be stored in a computer-readable non-transitory storage medium. The program causes a computer to execute, acquiring, from a storage, a map of a region including a plurality of fields and roads around the plurality of fields, the map including attribute information representing, for each of the roads, at least one of whether the road is an agricultural road, whether the road is a road along a specific feature, or whether the road is a road where satellite signals from GNSS satellites can be properly received, and generating, as a path toward a field or a path from a field toward another site for the agricultural machine on the map, at least one of a path including an agricultural road with priority, a path including a road along the specific feature with priority, or a path including, with priority, a road where the satellite signals can be properly received, based on the attribute information.

The techniques and example embodiments according to the present disclosure are applicable to path planning systems for agricultural machines performing self-driving, such as tractors, harvesters, rice transplanters, vehicles for crop management, vegetable transplanters, mowers, seeders, spreaders, or agricultural robots, for example.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A path planning system for an agricultural machine to automatically travel inside and outside a field, the path planning system comprising:

a storage to store a map of a region including a plurality of fields and roads around the plurality of fields;

a processor to generate a path for the agricultural machine on the map; and a controller configured or programmed to cause the agricultural machine to travel along the path generated by the processor, wherein the map includes attribute information representing, for each of the roads, whether the road is an agricultural road, and whether the road is a road along a specific feature; and for generation of a path toward a field or a path from a field toward another site, the processor is configured or programmed to generate the path based on the attribute information in a mode selected by a user from a plurality of modes including:

a first mode to generate the path by selecting agricultural roads with priority, and a second mode to generate the path by selecting roads along the specific feature with priority.

2. The path planning system of claim 1, wherein the map includes attribute information representing, for each road, whether the road is a road along a waterway as the specific feature; and in the second mode, the processor is configured or programmed to generate a path including a road along the waterway with priority, as the path for the agricultural machine based on the attribute information.

3. The path planning system of claim 1, wherein the processor is configured or programmed to determine a path by which an evaluation function is minimum, as the path for the agricultural machine among a plurality of paths reaching a target point from a departure point, the evaluation function being such that a path having a higher ratio of agricultural roads, a higher ratio of roads along the specific feature, or a higher ratio of roads where the satellite signals are receivable is given a smaller evaluation value and a path providing a longer moving distance or a longer moving time is given a larger evaluation value.

4. The path planning system of claim 1, wherein the map includes attribute information representing, for each of the roads: whether the road is an agricultural road, whether the road is a road along a specific feature, and whether the road is a road where satellite signals from Global Navigation Satellite System (GNSS) satellites can be properly received, and the processor is configured or programmed to generate the path in a mode selected by a user from a plurality of modes including:

the first mode to generate the path by selecting agricultural roads with priority;

the second mode to generate the path by selecting roads along the specific feature with priority; and a third mode to generate the path by selecting roads where the satellite signals are receivable being selected with priority.

5. The path planning system of claim 4, wherein the processor is configured or programmed to generate the path in a mode selected by the user from the plurality of modes further including a fourth mode to generate the path such that the moving distance or the moving time of the agricultural machine is shortest.

6. The path planning system of claim 4, wherein the processor is configured or programmed to cause a display device to display a graphical user interface to allow the user to select one mode from the plurality of modes.

7. The path planning system of claim 1, wherein the storage is configured or programmed to store a schedule of at least one task of agricultural work to be performed by the agricultural machine on each of working days; and the processor is configured or programmed to generate, based on the schedule, the path such that a final task of agricultural work on each working day is completed before the time when the agricultural work is to end.

8. The path planning system of claim 7, wherein the processor is configured or programmed to generate, based on the schedule, the path such that the agricultural machine arrives at a field where each of tasks of agricultural work is to be performed before the time when the agricultural work is to begin.

9. The path planning system of claim 1, wherein while the agricultural machine is traveling along the path, the processor is configured or programmed to repeat an operation of generating a local path which is defined by a plurality of waypoints along a portion of the path and along which an obstacle is avoidable, based on data acquired by a sensor included in the agricultural machine, and of outputting information representing the local path to a controller controlling the traveling of the agricultural machine.

10. An agricultural machine, comprising:

the path planning system of claim 1; and a sensor to perform sensing on a surrounding environment of the agricultural machine; wherein the controller is configured or programmed to cause the agricultural machine to travel along the path generated by the processor based on a signal output from the sensor.

11. A path planning method for an agricultural machine to automatically travel inside and outside a field, the path planning method comprising:

acquiring, from a storage, a map of a region including a plurality of fields and roads around the plurality of fields, the map including attribute information representing, for each of the roads, whether the road is an agricultural road, and whether the road is a road along a specific feature;

generating, as a path toward a field or a path from a field toward another site for the agricultural machine on the map, a path based on the attribute information in a mode selected by a user from a plurality of modes including:

a first mode to generate the path by selecting agricultural roads with priority, and a second mode to generate the path by selecting roads along the specific feature with priority; and controlling the agricultural machine to travel along the generated path.

* * * * *